(12) United States Patent
Zhu et al.

(10) Patent No.: US 12,302,233 B2
(45) Date of Patent: May 13, 2025

(54) NETWORK SLICE SELECTION METHOD, DEVICE, AND SYSTEM

(71) Applicant: HUAWEI TECHNOLOGIES CO., LTD., Guangdong (CN)

(72) Inventors: Fangyuan Zhu, Beijing (CN); Yongcui Li, Beijing (CN); Yan Li, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 454 days.

(21) Appl. No.: 17/701,663

(22) Filed: Mar. 22, 2022

(65) Prior Publication Data

US 2022/0217625 A1 Jul. 7, 2022

Related U.S. Application Data

(63) Continuation of application No. PCT/CN2020/115959, filed on Sep. 17, 2020.

(30) Foreign Application Priority Data

Sep. 23, 2019 (CN) .......................... 201910900880.0
Jul. 24, 2020 (CN) .......................... 202010725203.2

(51) Int. Cl.
*H04W 48/18* (2009.01)
*H04W 36/00* (2009.01)
*H04W 36/32* (2009.01)

(52) U.S. Cl.
CPC ........ *H04W 48/18* (2013.01); *H04W 36/0011* (2013.01); *H04W 36/13* (2023.05); *H04W 36/322* (2023.05)

(58) Field of Classification Search
CPC ............. H04W 36/0011; H04W 36/13; H04W 36/322; H04W 48/18; H04W 8/02
See application file for complete search history.

(56) References Cited

U.S. PATENT DOCUMENTS

2018/0367980 A1* 12/2018 Lee ......................... H04L 67/51
2019/0124544 A1 4/2019 Shaw et al.
(Continued)

FOREIGN PATENT DOCUMENTS

CN 106982458 A 7/2017
CN 108029062 A 5/2018
(Continued)

OTHER PUBLICATIONS

3GPP TS 23.503 V16.1.0 (Jun. 2019), 3rd Generation Partnership Project; Technical Specification Group Services and System Aspects; Policy and Charging Control Framework for the 5G System; Stage 2(Release 16), 98 pages.
(Continued)

*Primary Examiner* — Awet Haile

(57) ABSTRACT

Embodiments of this application provide a network slice selection method, a device, and a system, to resolve a problem in a current technology after a terminal device moves out of a service area of a network slice. A method embodiment includes determining, by a mobility management network element, a first network slice information about a first network slice and a second network slice information about a second network slice, the second network slice having a mapping relationship with the first network slice; and sending, by the mobility management network element, a mapping information between the first network slice and the second network slice, the mobility management network element sending the mapping information to an access network device.

18 Claims, 24 Drawing Sheets

(56) References Cited

U.S. PATENT DOCUMENTS

| | | | |
|---|---|---|---|
| 2019/0261159 A1 | 8/2019 | Wang et al. | |
| 2020/0314740 A1* | 10/2020 | Lee ..................... | H04W 48/08 |
| 2020/0396648 A1* | 12/2020 | Watfa ................... | H04W 48/18 |
| 2022/0116908 A1* | 4/2022 | Chun .................... | H04W 76/27 |
| 2023/0016945 A1* | 1/2023 | Lee ..................... | H04W 48/18 |

FOREIGN PATENT DOCUMENTS

| | | |
|---|---|---|
| CN | 108323245 A | 7/2018 |
| CN | 108684073 A | 10/2018 |
| CN | 109587742 A | 4/2019 |
| CN | 110035423 A | 7/2019 |
| EP | 3537768 A1 | 9/2019 |
| EP | 3592035 A1 | 1/2020 |
| EP | 3709711 A1 | 9/2020 |
| WO | 2018171685 A1 | 9/2018 |
| WO | 2019137471 A1 | 7/2019 |
| WO | 2019174505 A1 | 9/2019 |

OTHER PUBLICATIONS

Itri, RAN Slicing in NR. 3GPP TSG RAN WG2 NR Ad Hoc, Spokane, USA, Jan. 17-19, 2017, R2-1700262, 5 pages.

Nokia, Nokia Shanghai Bell; Telecom Italia, ZTE, Ericsson, Clarification on S-NSSAI(s) for PDU session . SA WG2 Meeting #132 , May 13-17, 2019, Reno, Nevada, USA, S2-1904972, 5 pages.

Ericsson, Mobility procedures for Slicing. 3GPP TSG RAN WG3 NR AdHoc 1801, Sophia Antipolis, France, Jan. 22-26, 2018, R3-180386, 6 pages.

CMCC, Verizon, Study on enhancement of RAN Slicing. 3GPP TSG-RAN meeting #86, Sitges, Barcelona, Dec. 9-12, 2019, RP-193254, 4 pages.

3GPP TS 23.501 V16.1.0 (Jun. 2019), 3rd Generation Partnership Project; Technical Specification Group Services and System Aspects; System Architecture for the 5G System; Stage 2(Release 16), 367 pages.

3GPP TS 23.502 V16.1.1 (Jun. 2019), 3rd Generation Partnership Project; Technical Specification Group Services and System Aspects; Procedures for the 5G System; Stage 2(Release 16), 494 pages.

\* cited by examiner

NETWORK SLICE SELECTION METHOD, DEVICE, AND SYSTEM

CROSS-REFERENCE TO RELATED APPLICATIONS

This application is a continuation of International Application No. PCT/CN2020/115959, filed on Sep. 17, 2020, which claims priority to Chinese Patent Application No. 202010725203.2, filed on Jul. 24, 2020, and Chinese Patent Application No. 201910900880.0, filed on Sep. 23, 2019. All of the aforementioned patent applications are hereby incorporated by reference in their entireties.

TECHNICAL FIELD

This application relates to the field of communication technologies, and in particular, to a network slice selection method, a device, and a system.

BACKGROUND

A network slice is a logically isolated network used to support a specific network capability and a specific network feature, and may include an entire end to end (E2E) network, or some network functions may be shared in a plurality of network slices. The network slice is a key technology that meets a network differentiation requirement of a 5th generation (5G) mobile communication technology proposed by the 3rd generation partnership project (3GPP). Usually, network features of different network slices are different, and network slices need to be isolated from each other, so that the network slices do not affect each other. For example, a network slice of an augmented reality (AR) service or a virtual reality (VR) service requires a high-bandwidth and low-latency service; a network slice of an internet of things (IoT) service requires supporting access of a large quantity of terminals, but requires a low bandwidth and has no requirement on a latency.

Because network slices are deployed based on areas, when a terminal device moves, the terminal device may move out of a service area of a network slice. If the terminal device establishes a packet data unit (PDU) session associated with a network slice, when the terminal device moves out of a service area of the network slice, an access and mobility management function (AMF) network element triggers a session management function (SMF) network element corresponding to the PDU session to release the PDU session, and then the SMF network element performs a PDU session release procedure. Consequently, session continuity of the PDU session cannot be maintained.

SUMMARY

Embodiments of this application provide a network slice selection method, a device, and a system, to resolve a problem in a current technology that after a terminal device moves out of a service area of a network slice, if the terminal device has established a PDU session associated with the network slice, session continuity of the PDU session cannot be maintained.

To achieve the foregoing objective, the following technical solutions are used in embodiments of this application.

According to a first aspect, a network slice selection method is provided. The method includes: A mobility management network element determines that a first network slice in a visited network of a terminal device can serve a first session of the terminal device. The mobility management network element triggers migration of the first session from a second network slice to the first network slice, where the second network slice is a network slice currently associated with the first session in the visited network. Different from a current technology, when the terminal device moves out of a service range of the second network slice, the mobility management network element triggers a corresponding session management network element to perform a session release procedure. According to the network slice selection method provided in this embodiment of this application, for the established first session of the terminal device, when the terminal device moves out of the service range of the second network slice, if the mobility management network element determines that the first network slice in the visited network of the terminal device can serve the first session of the terminal device, the mobility management network element triggers migration of the first session from the second network slice to the first network slice, so that continuity of the session can be maintained.

In an embodiment, that a mobility management network element determines that a first network slice in a visited network of a terminal device can serve a first session of the terminal device includes: The mobility management network element determines that the terminal device moves out of a service range of the second network slice and the terminal device is currently located in a service range of the first network slice, where the first network slice has a mapping relationship with a third network slice, and the third network slice is a network slice associated with the first session in a home network of the terminal device. Certainly, that a mobility management network element determines that a first network slice in a visited network of a terminal device can serve a first session of the terminal device may also be understood as: The mobility management network element determines that the terminal device moves out of a service range of the second network slice, and the mobility management network element determines that the first session is associated with the first network slice other than the second network slice in the visited network. This is not specifically limited in this embodiment of this application. Based on this solution, the mobility management network element may determine that the first network slice in the visited network of the terminal device can serve the first session of the terminal device.

In an embodiment, the method further includes: The mobility management network element sends first indication information to a first session management network element, where the first indication information indicates the first session management network element to initiate a modification procedure of the first session. The mobility management network element receives first information and second information from the first session management network element, where the first information includes an identifier of the first session and single network slice selection assistance information S-NSSAI of the first network slice, and the second information includes the identifier of the first session, the S-NSSAI of the first network slice, and S-NSSAI of the third network slice. The mobility management network element sends the first information to a first access network device, and sends the second information to the terminal device, where the first information and the second information are for an update of S-NSSAI corresponding to the first session in the visited network. Based on this solution, the terminal device and the first access network device may update the S-NSSAI corresponding to the first session in the visited network in a timely manner.

In an embodiment, that a mobility management network element determines that a first network slice in a visited network of a terminal device can serve a first session of the terminal device includes: The mobility management network element receives second indication information from a first access network device, where the second indication information indicates that the first network slice supported by the first access network device can serve the first session. Based on this solution, the mobility management network element may determine that the first network slice in the visited network of the terminal device can serve the first session of the terminal device.

In an embodiment, before the mobility management network element receives the second indication information from the first access network device, the method further includes: The mobility management network element determines that the first session is associated with another network slice other than the second network slice in the visited network, where the another network slice has a mapping relationship with a third network slice, the another network slice includes the first network slice, and the third network slice is a network slice associated with the first session in a home network of the terminal device. The mobility management network element sends single network slice selection assistance information S-NSSAI of the another network slice to a second access network device, where the second access network device is an access network device that supports the second network slice. Based on this solution, the second access network device may learn of information about the another network slice, other than the second network slice, associated with the first session in the visited network.

In an embodiment, the method further includes: The mobility management network element sends third indication information to the terminal device, where the third indication information indicates the terminal device to initiate a service request procedure associated with the first session, the service request procedure is for establishment of an air interface resource of the first session, and the air interface resource is associated with the first network slice. Based on this solution, the air interface resource of the first session may be established.

In an embodiment, the method further includes: The mobility management network element sends a first message to a first session management network element, where the first message requests the first session management network element to establish an air interface resource of the first session, and the air interface resource is associated with the first network slice. Based on this solution, the air interface resource of the first session may be established.

In an embodiment, the method further includes: The mobility management network element sends, to the terminal device, S-NSSAI of the first network slice and S-NSSAI of the third network slice that correspond to an identifier of the first session, where the third network slice is a network slice associated with the first session in the home network of the terminal device. Based on this solution, the terminal device may update S-NSSAI corresponding to the first session in the visited network in a timely manner.

In an embodiment, that the mobility management network element triggers migration of the first session from a second network slice to the first network slice includes: The mobility management network element sends a second message to the first session management network element, where the second message requests to establish a user plane resource between a first user plane network element and a third user plane network element, the first session management network element is a session management network element that serves the first session in the first network slice, the first user plane network element is a user plane network element that serves the first session in the first network slice, the third user plane network element is a user plane network element that serves the first session in the third network slice, and the third network slice is a network slice associated with the first session in the home network of the terminal device. Based on this solution, the user plane resource between the first user plane network element and the third user plane network element may be established.

In an embodiment, that the mobility management network element triggers migration of the first session from a second network slice to the first network slice includes: The mobility management network element obtains context information of the first session in the third network slice, where the third network slice is a network slice associated with the first session in the home network of the terminal device. The mobility management network element sends a third message to the first session management network element, where the third message includes the context information of the first session in the third network slice, the third message requests to establish a user plane resource between a first user plane network element and a third user plane network element, the first session management network element is a session management network element that serves the first session in the first network slice, the first user plane network element is a user plane network element that serves the first session in the first network slice, and the third user plane network element is a user plane network element that serves the first session in the third network slice. Based on this solution, the user plane resource between the first user plane network element and the third user plane network element may be established.

In an embodiment, that the mobility management network element obtains context information of the first session in the third network slice includes: The mobility management network element sends a fourth message to a second session management network element, where the fourth message requests the context information of the first session in the third network slice, and the second session management network element is a session management network element that serves the first session in the second network slice. The mobility management network element receives the context information of the first session in the third network slice from the second session management network element.

In an embodiment, the method further includes: The mobility management network element sends, to the terminal device, updated allowed NSSAI and a mapping relationship between the S-NSSAI of the first network slice and the S-NSSAI of the third network slice, where the updated allowed NSSAI includes the S-NSSAI of the first network slice, and the third network slice is a network slice associated with the first session in the home network of the terminal device. Based on this solution, the terminal device may update allowed NSSAI in a timely manner and learn of information about another network slice, other than the second network slice, associated with the first session in the visited network.

According to a second aspect, a network slice selection method is provided. The method includes: A first access network device receives single network slice selection assistance information S-NSSAI of a first network slice and S-NSSAI of a second network slice from a second access network device, where the first network slice and the second network slice are network slices that are associated with a first session of a terminal device in a visited network of the terminal device and that each have a mapping relationship with a third network slice, the second network slice is a network slice currently associated with the first session in the visited network, and the third network slice is a network slice associated with the first session in a home network of the terminal device. The first access network device determines that the second network slice is not supported but the first network slice is supported. The first access network device sends second indication information to a mobility management network element, where the second indication information indicates that the first network slice can serve the first session. Different from a current technology, when the terminal device moves out of a service range of the second network slice, the mobility management network element triggers a corresponding session management network element to perform a session release procedure. According to the network slice selection method provided in this embodiment of this application, for the established first session of the terminal device, when the terminal device moves out of the service range of the second network slice, if the first access network device determines that the first network slice is supported, the first access network device may send, to the mobility management network element, the first indication information used to indicate that the first network slice can serve the first session, and the mobility management network element triggers migration of the first session from the second network slice to the first network slice, so that continuity of the session can be maintained.

According to a third aspect, a communication apparatus is provided, and is configured to implement the foregoing methods. The communication apparatus may be the mobility management network element in the first aspect or the following thirteenth aspect, or an apparatus including the mobility management network element. Alternatively, the communication apparatus may be the first access network device in the second aspect, the following tenth aspect, or the following twelfth aspect, or an apparatus including the first access network device. Alternatively, the communication apparatus may be the second access network device in the following eleventh aspect, or an apparatus including the second access network device. The communication apparatus includes a corresponding module, unit, or means for implementing the foregoing methods. The module, unit, or means may be implemented by hardware, software, or hardware executing corresponding software. The hardware or the software includes one or more modules or units corresponding to the foregoing functions.

According to a fourth aspect, a communication apparatus is provided. The apparatus includes a processor and a memory. The memory is configured to store computer instructions. When the processor executes the instructions, the communication apparatus is enabled to perform the method according to any one of the foregoing aspects. The communication apparatus may be the mobility management network element in the first aspect or the following thirteenth aspect, or an apparatus including the mobility management network element. Alternatively, the communication apparatus may be the first access network device in the second aspect, the following tenth aspect, or the following twelfth aspect, or an apparatus including the first access network device. Alternatively, the communication apparatus may be the second access network device in the following eleventh aspect, or an apparatus including the second access network device.

According to a fifth aspect, a communication apparatus is provided. The communication apparatus includes a processor. The processor is configured to: be coupled to a memory, and after reading instructions in the memory, perform the method according to any one of the foregoing aspects based on the instructions. The communication apparatus may be the mobility management network element in the first aspect or the following thirteenth aspect, or an apparatus including the mobility management network element. Alternatively, the communication apparatus may be the first access network device in the second aspect, the following tenth aspect, or the following twelfth aspect, or an apparatus including the first access network device. Alternatively, the communication apparatus may be the second access network device in the following eleventh aspect, or an apparatus including the second access network device.

According to a sixth aspect, a computer-readable storage medium is provided. The computer-readable storage medium stores instructions. When the instructions are run on a computer, the computer is enabled to perform the method according to any one of the foregoing or following aspects.

According to a seventh aspect, a computer program product including instructions is provided. When the computer program product runs on a computer, the computer is enabled to perform the method according to any one of the foregoing or following aspects.

According to an eighth aspect, a communication apparatus (for example, the communication apparatus may be a chip or a chip system) is provided. The communication apparatus includes a processor, configured to implement the function according to any one of the foregoing or following aspects. In an embodiment, the communication apparatus further includes a memory, and the memory is configured to store necessary program instructions and data. When the communication apparatus is the chip system, the communication apparatus may include a chip, or may include a chip and another discrete component.

For technical effects brought by any design of the third aspect to the eighth aspect, refer to technical effects brought by different designs of the first aspect, the second aspect, the third aspect, or the tenth aspect to the thirteenth aspect. Details are not described herein again.

According to a ninth aspect, a communication system is provided. The communication system includes a mobility management network element and a first access network device. The first access network device is configured to receive single network slice selection assistance information S-NSSAI of a first network slice and S-NSSAI of a second network slice from a second access network device, where the first network slice and the second network slice are network slices that are associated with a first session of a terminal device in a visited network of the terminal device and that each have a mapping relationship with a third network slice, the second network slice is a network slice currently associated with the first session in the visited network, and the third network slice is a network slice associated with the first session in a home network of the terminal device. The first access network device is further configured to determine that the second network slice is not supported but the first network slice is supported. The first access network device is further configured to send second indication information to the mobility management network element, where the second indication information indicates that the first network slice can serve the first session. The mobility management network element is configured to: receive the second indication information from the first access network device, and trigger migration of the first session from the second network slice to the first network slice.

For technical effects brought by the ninth aspect, refer to the technical effects brought by the first aspect or the second aspect. Details are not described herein again.

According to a tenth aspect, a network slice selection method is provided. The method includes: A first access network device receives information about a first network slice from a second access network device, where the first network slice is a network slice associated with a session of a terminal device. The first access network device determines that the first network slice is not supported. The first access network device determines a second network slice, where the first access network device supports the second network slice, and the second network slice has a mapping relationship with the first network slice. The first access network device sends indication information to a session management network element, where the indication information indicates that the second network slice can serve the session. In an existing Xn interface handover procedure, if the first access network device does not support the network slice associated with the session of the terminal device, the first access network device rejects handover of the session of the terminal device to a target side. As a result, session continuity of the session cannot be maintained on the target side, and service experience of the terminal device is affected. According to the network slice selection method provided in this embodiment of this application, even if the first access network device does not support the network slice associated with the session of the terminal device, because the first access network device may perform slice mapping to determine the second network slice that is supported by the first access network device and that has a mapping relationship with the first network slice, the first access network device may trigger migration of the session of the terminal device from the first network slice to the second network slice. Therefore, continuity of the session can be maintained.

In an embodiment, that the first access network device determines a second network slice includes: The first access network device determines the second network slice based on the information about the first network slice and mapping information between the second network slice and the first network slice.

In an embodiment, the network slice selection method provided in this embodiment of this application may further include: The first access network device sends information about the second network slice to a mobility management network element. The first access network device receives the mapping information between the second network slice and the first network slice from the mobility management network element. Based on this solution, the first access network device may obtain the mapping information between the second network slice and the first network slice.

According to an eleventh aspect, a network slice selection method is provided. The method includes: A second access network device determines information about a first network slice and information about a second network slice, where the first network slice is a network slice associated with a session of a terminal device, and the second network slice has a mapping relationship with the first network slice. The second access network device sends the information about the first network slice and the information about the second network slice to a first access network device. In an existing Xn interface handover procedure, if the first access network device does not support the network slice associated with the session of the terminal device, the first access network device rejects handover of the session of the terminal device to a target side. As a result, session continuity of the session cannot be maintained on the target side, and service experience of the terminal device is affected. According to the network slice selection method provided in this embodiment of this application, even if the first access network device does not support the network slice associated with the session of the terminal device, because the second access network device may send, to the first access network device, the information about the first network slice and the information about the second network slice that is supported by the first access network device and that has a mapping relationship with the first network slice, the first access network device may obtain the information about the first network slice and the information about the second network slice, and may further trigger migration of the session of the terminal device from the first network slice to the second network slice. Therefore, continuity of the session can be maintained.

In an embodiment, that a second access network device determines information about a first network slice and information about a second network slice includes: The second access network device receives the information about the second network slice and the information about the first network slice from a mobility management network element. In other words, in this solution, the mobility management network element determines the information about the second network slice and the information about the first network slice.

In an embodiment, that a second access network device determines information about a first network slice and information about a second network slice includes: The second access network device receives the information about the first network slice from a mobility management network element. The second access network device determines the information about the second network slice based on the information about the first network slice and mapping information between the second network slice and the first network slice. In other words, in this solution, the second access network device may learn of the mapping information between the second network slice and the first network slice in advance, and after receiving the information about the first network slice from the mobility management network element, the second access network device may determine the information about the second network slice based on the mapping information.

In an embodiment, the first network slice is a network slice in at least one network slice indicated by allowed network slice selection assistance information NSSAI of the terminal device, and the network slice selection method provided in this embodiment of this application may further include: The second access network device receives the mapping information from the mobility management network element. Based on this solution, the second access network device may learn of the mapping information between the second network slice and the first network slice.

According to a twelfth aspect, a network slice selection method is provided. The method includes: A first access network device receives information about a first network slice and information about a second network slice from a second access network device, where the first network slice is a network slice associated with a session of a terminal device, and the second network slice has a mapping relationship with the first network slice. The first access network device determines that the first network slice is not supported but the second network slice is supported. The first access network device sends indication information to a session management network element, where the indication information indicates that the second network slice can serve the session. In an existing Xn interface handover procedure, if the first access network device does not support the network slice associated with the session of the terminal device, the first access network device rejects handover of the session of the terminal device to a target side. As a result, session continuity of the session cannot be maintained on the target side, and service experience of the terminal device is affected. According to the network slice selection method provided in this embodiment of this application, even if the first access network device does not support the network slice associated with the session of the terminal device, because the first access network device may obtain the information about the first network slice and the information about the second network slice that is supported by the first access network device and that has a mapping relationship with the first network slice, and may trigger migration of the session of the terminal device from the first network slice to the second network slice, continuity of the session can be maintained.

According to a thirteenth aspect, a network slice selection method is provided. The method includes: A mobility management network element determines information about a first network slice and information about a second network slice, where the second network slice has a mapping relationship with the first network slice. The mobility management network element sends mapping information between the first network slice and the second network slice to an access network device. In an existing Xn interface handover procedure, if a first access network device does not support a network slice associated with a session of a terminal device, the first access network device rejects handover of the session of the terminal device to a target side. As a result, session continuity of the session cannot be maintained on the target side, and service experience of the terminal device is affected. According to the network slice selection method provided in this embodiment of this application, even if the first access network device does not support the network slice associated with the session of the terminal device, because the first access network device may obtain the information about the first network slice and the information about the second network slice that is supported by the first access network device and that has a mapping relationship with the first network slice, the first access network device may trigger migration of the session of the terminal device from the first network slice to the second network slice. Therefore, continuity of the session can be maintained.

In an embodiment, that a mobility management network element determines information about a first network slice and information about a second network slice includes: The mobility management network element determines the information about the first network slice. The mobility management network element determines the information about the second network slice based on the information about the first network slice and the mapping information between the second network slice and the first network slice.

In an embodiment, the first network slice is a network slice supported by the access network device. Based on this solution, the access network device may obtain slice mapping information of the network slice supported by the access network device.

In an embodiment, the first network slice is a network slice associated with a session of a terminal device. Based on this solution, the access network device may obtain slice mapping information of the network slice associated with the session of the terminal device.

In an embodiment, the first network slice is a network slice indicated by allowed network slice selection assistance information NSSAI of a terminal device. Based on this solution, the access network device may obtain slice mapping information of the network slice indicated by the allowed NSSAI of the terminal device.

With reference to any one of the tenth aspect to the thirteenth aspect, in an embodiment, that the second network slice has a mapping relationship with the first network slice includes: The first network slice and the second network slice can provide services of a same type; or the first network slice and the second network slice can share a network slice instance.

According to a fourteenth aspect, a communication system is provided. The communication system includes a first access network device and a second access network device. The second access network device is configured to send information about a first network slice to the first access network device, where the first network slice is a network slice associated with a session of a terminal device. The first access network device is configured to: receive the information about the first network slice from the second access network device, and determine that the first access network device does not support the first network slice. The first access network device is further configured to determine a second network slice, where the first access network device supports the second network slice, and the second network slice has a mapping relationship with the first network slice. The first access network device is further configured to send indication information to a session management network element, where the indication information indicates that second network slice can serve the session. For technical effects brought by the fourteenth aspect, refer to the technical effects brought by the tenth aspect. Details are not described herein again.

According to a fifteenth aspect, a communication system is provided. The communication system includes a first access network device and a second access network device. The second access network device is configured to determine information about a first network slice and information about a second network slice, where the first network slice is a network slice associated with a session of a terminal device, and the second network slice has a mapping relationship with the first network slice. The second access network device is further configured to send the information about the first network slice and the information about the second network slice to the first access network device. The first access network device is configured to: receive the information about the first network slice and the information about the second network slice from the second access network device, and determine that the first access network device does not support the first network slice but supports the second network slice. The first access network device is further configured to send indication information to a session management network element, where the indication information indicates that second network slice can serve the session. For technical effects brought by the fifteenth aspect, refer to the technical effects brought by the eleventh aspect or the twelfth aspect. Details are not described herein again.

DETAILED DESCRIPTION OF EMBODIMENTS

The following describes technical solutions in embodiments of this application with reference to the accompanying drawings in embodiments of this application. In descriptions of this application, unless otherwise specified, "/" represents an "or" relationship between associated objects. For example, A/B may represent A or B. In this application, "and/or" describes only an association relationship for describing associated objects and represents that three relationships may exist. For example, A and/or B may represent the following three cases: Only A exists, both A and B exist, and only B exists, where A or B may be singular or plural. In addition, in the descriptions of this application, unless otherwise specified, "a plurality of" means two or more than two. "At least one of the following items (pieces)" or a similar expression thereof refers to any combination of these items, including any combination of singular items (pieces) or plural items (pieces). For example, at least one of a, b, or c may indicate: a, b, c, a and b, a and c, b and c, or a, b, and c, where a, b, and c may be singular or plural. In addition, to clearly describe the technical solutions in embodiments of this application, terms such as "first" and "second" are used in embodiments of this application to distinguish between same items or similar items that have basically same functions and purposes. A person skilled in the art may understand that the terms such as "first" and "second" do not limit a quantity or an execution sequence, and the terms such as "first" and "second" do not indicate a definite difference. In addition, in embodiments of this application, the term such as "example" or "for example" is used to represent giving an example, an illustration, or a description. Any embodiment or design scheme described as an "example" or "for example" in embodiments of this application should not be explained as being more preferred or having more advantages than another embodiment or design scheme. Exactly, use of the term "example", "for example", or the like is intended to present a relative concept in a specific manner for ease of understanding.

In addition, a network architecture and a service scenario described in embodiments of this application are intended to describe the technical solutions in embodiments of this application more clearly, and do not constitute a limitation on the technical solutions provided in embodiments of this application. A person of ordinary skill in the art may know that: With evolution of the network architecture and emergence of new service scenarios, the technical solutions provided in embodiments of this application are also applicable to similar technical problems.

Figure 1:
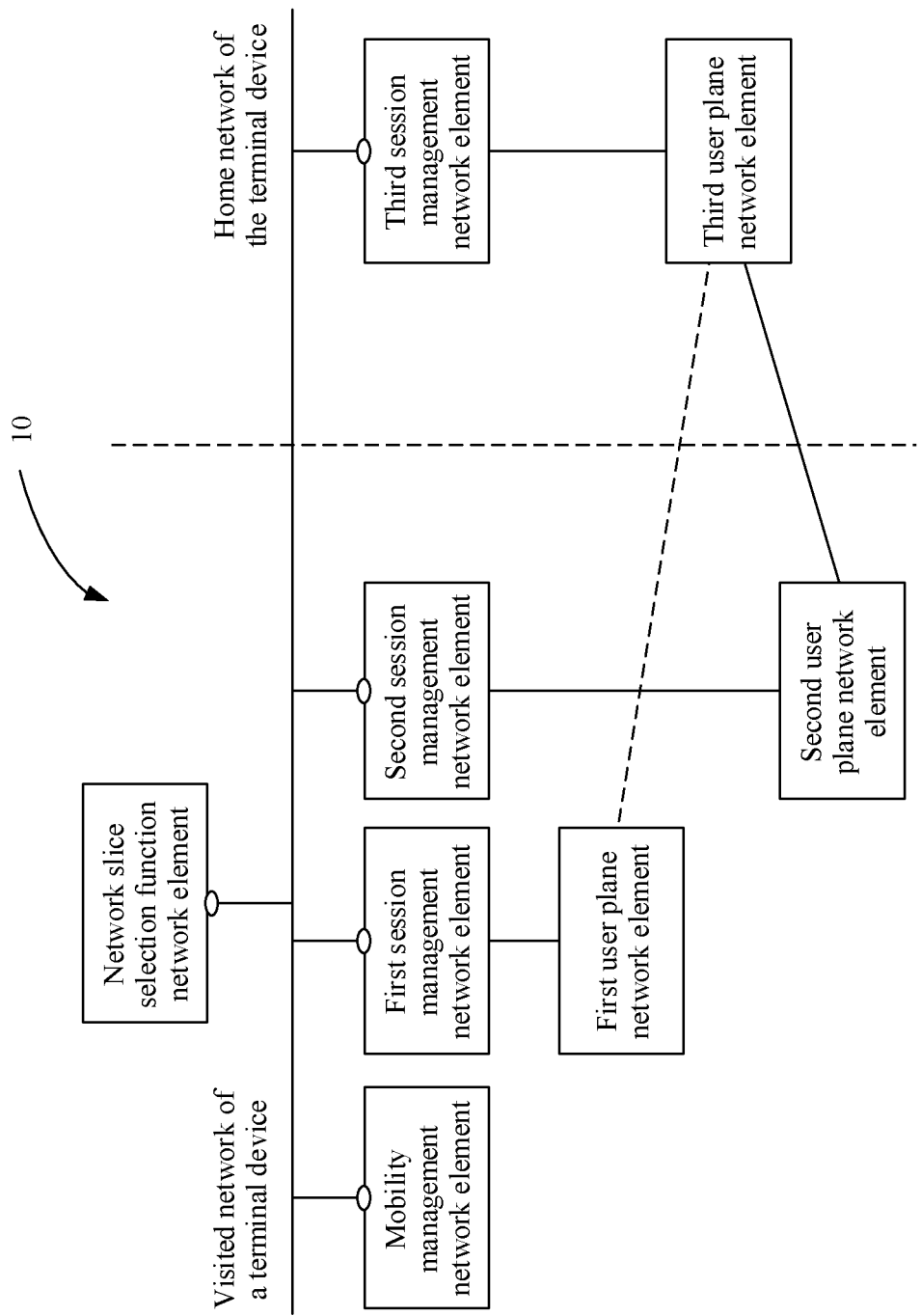
FIG. 1 is a diagram of a communication system according to an embodiment of this application.

FIG. 1 shows a communication system 10 according to an embodiment of this application. The communication system 10 is applied to a scenario in which a first session of a terminal device is migrated from a second network slice to a first network slice in a roaming scenario. The first network slice and the second network slice are network slices that are associated with the first session of the terminal device in a visited network of the terminal device and that each have a mapping relationship with a third network slice, the second network slice is a network slice currently associated with the first session in the visited network, and the third network slice is a network slice associated with the first session in a home network of the terminal device.

As shown in FIG. 1, the communication system 10 includes a mobility management network element and a first session management network element. The mobility management network element and the first session management network element are located in the visited network of the terminal device. The first session management network element is a session management network element that serves the first session in the first network slice.

Optionally, as shown in FIG. 1, the communication system 10 may further include one or more of a second session management network element, a third session management network element, a first user plane network element, a second user plane network element, a third user plane network element, or a network slice selection function network element. The second session management network element, the first user plane network element, the second user plane network element, and the network slice selection function network element are located in the visited network of the terminal device, and the third session management network element and the third user plane network element are located in the home network of the terminal device. The second session management network element is a session management network element that serves the first session in the second network slice, the third session management network element is a session management network element that serves the first session in the third network slice, the first user plane network element is a user plane network element that serves the first session in the first network slice, the second user plane network element is a user plane network element that serves the first session in the second network slice, and the third user plane network element is a user plane network element that serves the first session in the third network slice.

Figure 2A:
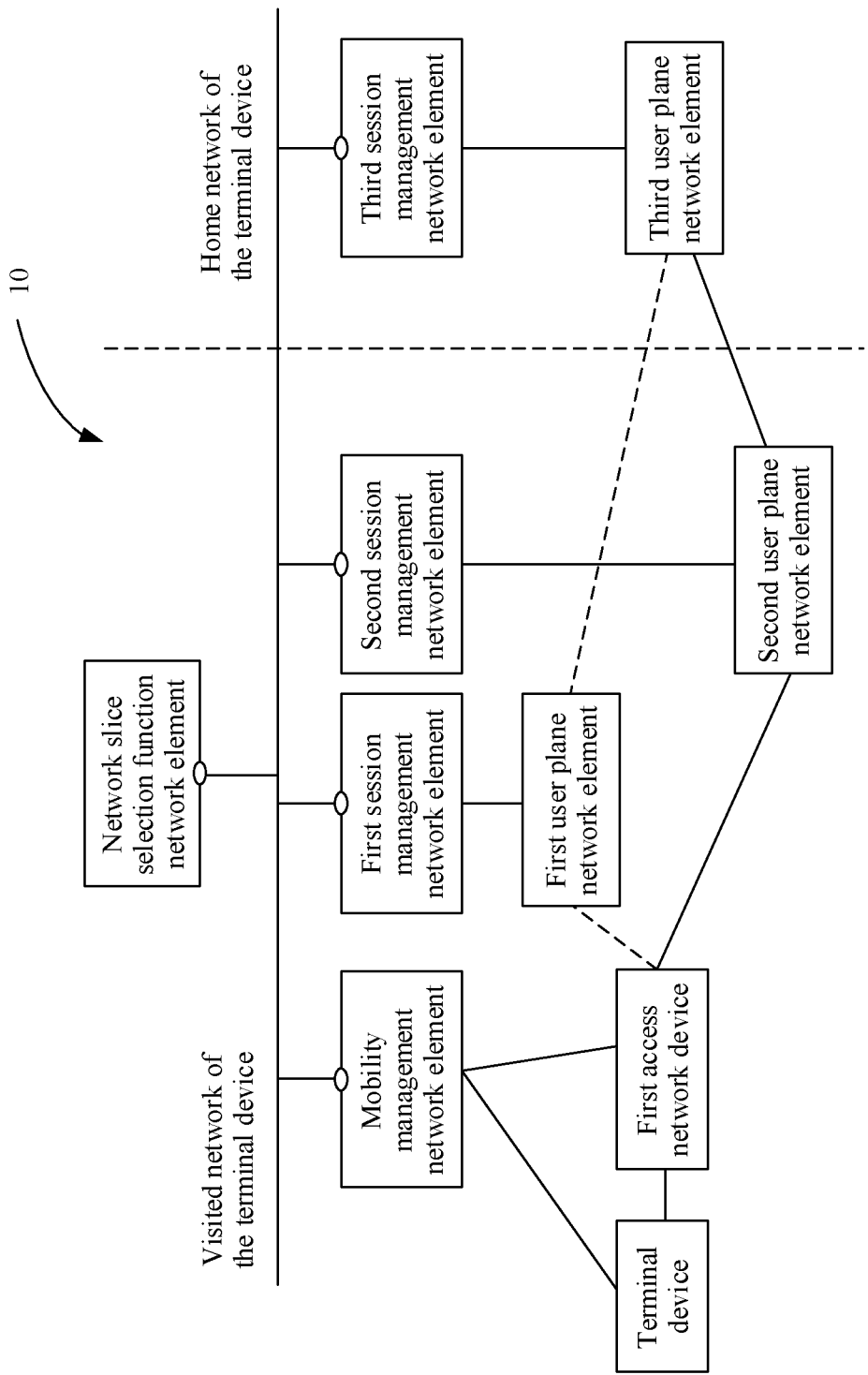
FIG. 2A is a diagram of a communication system according to an embodiment of this application.

In an embodiment, after the first session is migrated, an access network device connected to the terminal device does not change. For example, as shown in FIG. 2A, the communication system 10 may further include a first access network device. Before the first session is migrated, the terminal device accesses a core network through the first access network device, and the first access network device may communicate with the second user plane network element. After the first session is migrated, the terminal device accesses the core network through the first access network device, and the first access network device may communicate with the first user plane network element.

Figure 2B:
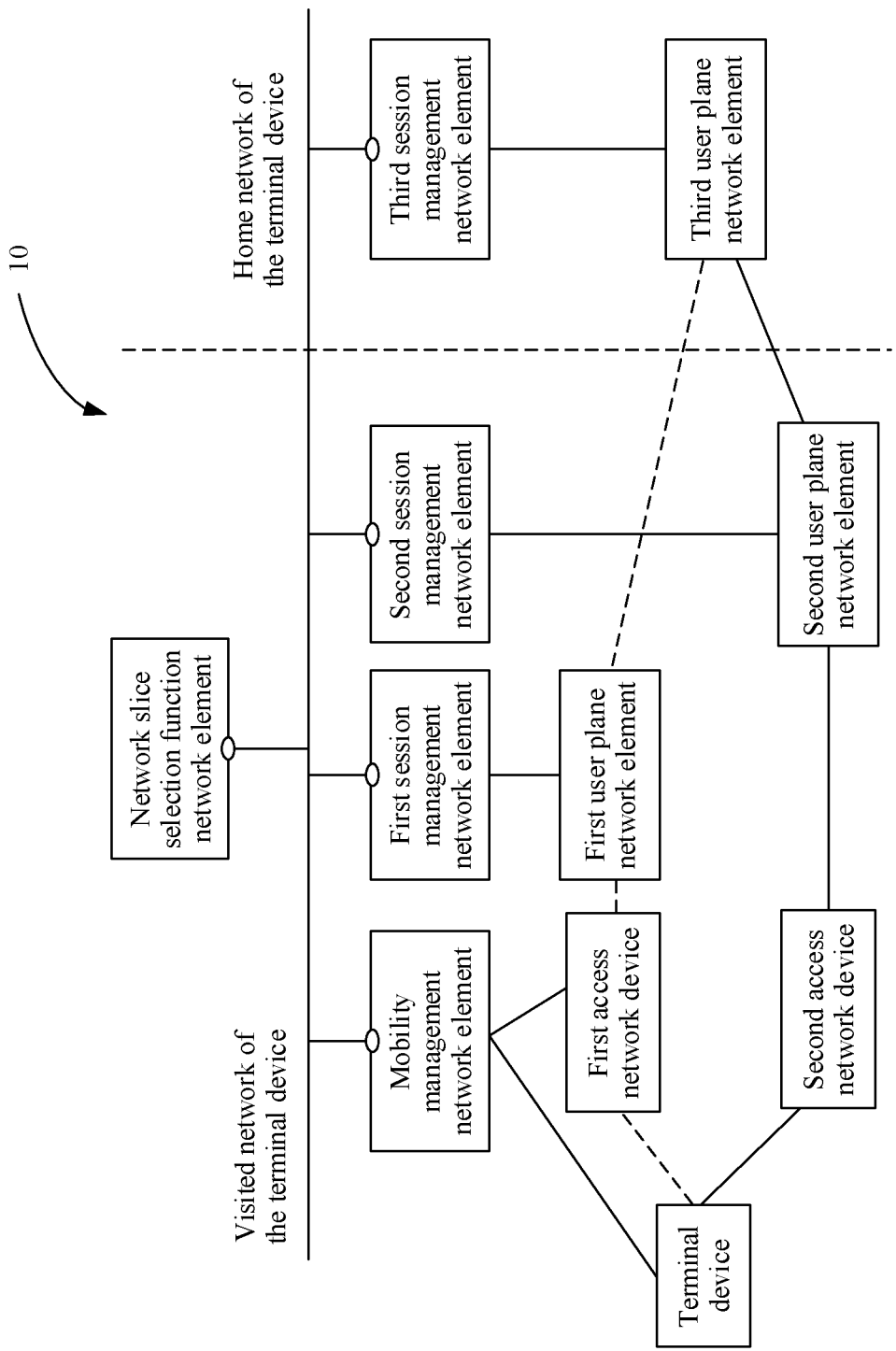
FIG. 2B is a diagram of a communication system according to an embodiment of this application.

In an embodiment, after the first session is migrated, an access network device connected to the terminal device changes. For example, as shown in FIG. 2B, the communication system 10 may further include a first access network device and a second access network device. Before the first session is migrated, the terminal device accesses a core network through the second access network device, and the second access network device may communicate with the second user plane network element. After the first session is migrated, the terminal device accesses the core network through the first access network device, and the first access network device may communicate with the first user plane network element. The first access network device is different from the second access network device.

Figure 14:
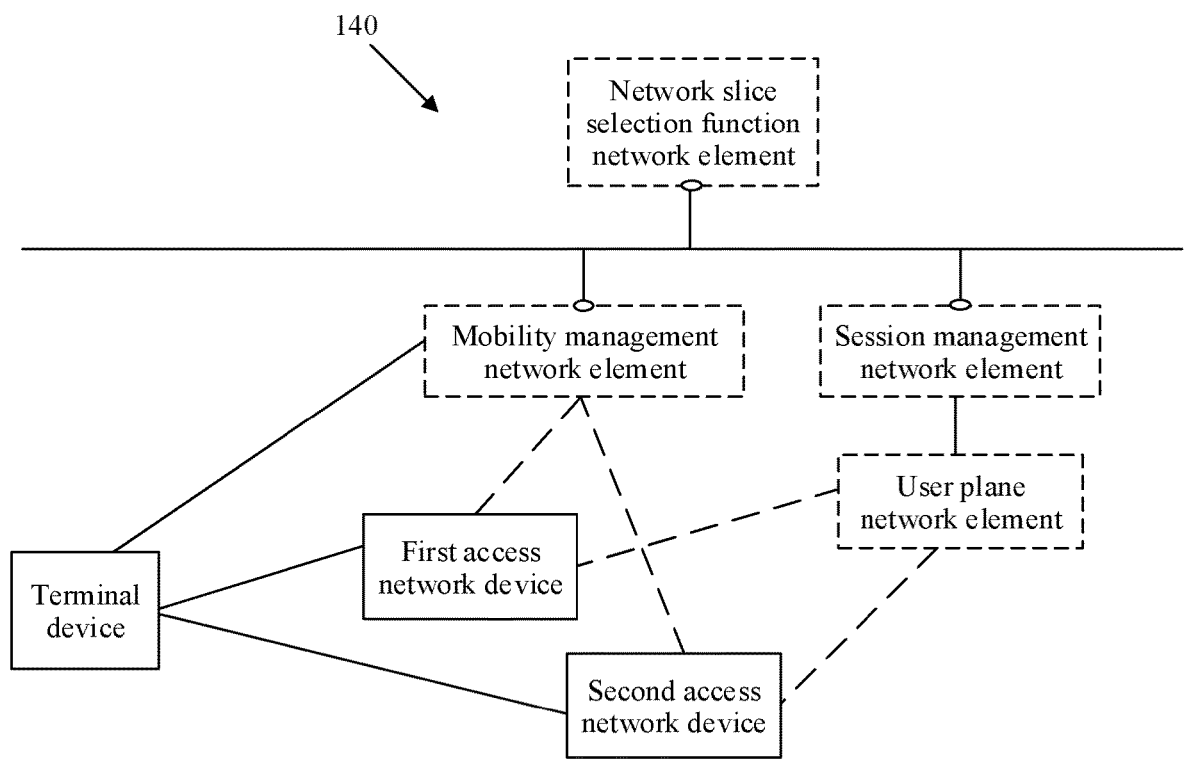
FIG. 14 is a fourth diagram of a communication system according to an embodiment of this application.

In an existing Xn interface handover procedure, when a terminal device moves out of a coverage area of a network slice associated with a session of the terminal device, if a target access network device does not support the network slice associated with the session of the terminal device, the target access network device rejects handover of the session of the terminal device to a target side. As a result, session continuity of the session cannot be maintained on the target side, and service experience of the terminal device is affected. FIG. 14 shows another communication system 140 according to an embodiment of this application. The communication system 140 is applied to an Xn interface handover procedure in a roaming or non-roaming scenario, so that the session of the terminal device may be successfully migrated from the associated network slice to a network slice that has a mapping relationship with the network slice associated with the terminal device, and therefore session continuity of the session is maintained on the target side. The target access network device supports the network slice that has a mapping relationship with the network slice associated with the terminal device.

In this embodiment of this application, it is assumed that the network slice associated with the session of the terminal device is a first network slice, and the network slice that has a mapping relationship with the network slice associated with the terminal device is a second network slice. In this case, that the second network slice has a mapping relationship with the first network slice includes: The first network slice and the second network slice can provide services of a same type, or the first network slice and the second network slice can share a network slice instance. This is uniformly described herein, and details are not described again below.

For example, the first network slice is a slice A, and the second network slice is a slice X. That the slice A has a mapping relationship with the slice X means one or more of the following:

1. The slice A and the slice X provide services of a same type, the slice A may provide a service whose type is the same as a service provided by the slice X. For example, a component slice/service type (SST) of an identifier single network slice selection assistance information (S-NSSAI)-A of the slice A is the same as an SST included in an identifier S-NSSAI-X of the slice X. However, a component slice differentiator (SD) of the S-NSSAI-A is different from an SD included in the S-NSSAI-X. Because SDs are different but SSTs are the same, it indicates that the S-NSSAI-A and the S-NSSAI-X are different but services of a same type can be provided. In this case, the slice A may have a mapping relationship with the slice X.

Figure 15:
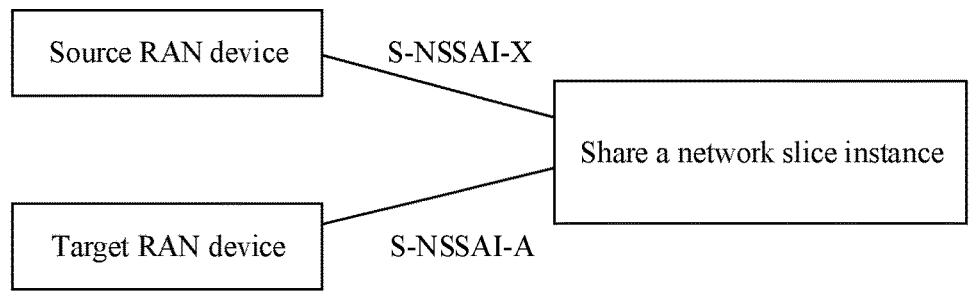
FIG. 15 is a diagram of a network instance shared by a plurality of slices according to an embodiment of this application.

2. The slice A and the slice X may share a network slice instance. For example, a network slice instance in a network can serve both the slice A and the slice X. When an anchor network element belongs to the network slice instance shared by the slice A and the slice X, the anchor network element may serve both the slice A and the slice X. For example, as shown in FIG. 15, after the terminal device moves into a coverage area of the slice X and establishes a session corresponding to the slice X, an anchor of the session is located in the slice X. If the terminal device moves out of the coverage area of the slice X, because the slice A has a mapping relationship with the slice X, the terminal device may be connected to the anchor of the session by accessing the slice A, to ensure service continuity of the session.

As shown in FIG. 14, the communication system 140 provided in this embodiment of this application includes a first access network device and a second access network device. The first access network device is an access network device accessed by the terminal device after the session of the terminal device is migrated, and may also be referred to as a target access network device. The second access network device is an access network device accessed by the terminal device before the session of the terminal device is migrated, and may also be referred to as a source access network device. In other words, before the session of the terminal device is migrated, the terminal device accesses a core network through the second access network device; after the session of the terminal device is migrated, the terminal device accesses the core network through the first access network device.

Optionally, as shown in FIG. 14, the communication system 140 may further include one or more of a mobility management network element, a session management network element, a user plane network element, or a network slice selection function network element. For a connection manner of the terminal device, the first access network device, the second access network device, the mobility management network element, the session management network element, the user plane network element, or the network slice selection function network element, refer to FIG. 14. Details are not described herein.

Optionally, the terminal device in embodiments of this application may be a device configured to implement a wireless communication function, for example, a terminal or a chip that may be used in the terminal. The terminal device may be deployed on land, where the deployment includes indoor or outdoor, or handheld or vehicle-mounted deployment, may be deployed on water (for example, on a ship), or may be deployed in air (for example, on an aircraft, a balloon, and a satellite). The terminal may be user equipment (UE), an access terminal, a terminal unit, a terminal station, a mobile station, a remote station, a remote terminal, a mobile device, a wireless communication device, a terminal agent, a terminal apparatus, or the like in a 5G network or a future evolved public land mobile network (PLMN). The access terminal may be a cellular phone, a cordless phone, a session initiation protocol (SIP) phone, a wireless local loop (WLL) station, a personal digital assistant (PDA), a handheld device having a wireless communication function, a computing device or another processing device connected to a wireless modem, a vehicle-mounted device, a wearable device, a virtual reality (VR) terminal device, an augmented reality (AR) terminal device, a wireless terminal in industrial control, a wireless terminal in self driving, a wireless terminal in telemedicine (remote medical), a wireless terminal in a smart grid, a wireless terminal in transportation safety, a wireless terminal in a smart city, a wireless terminal in a smart home, or the like. The terminal may be mobile or fixed.

Optionally, the access network (radio access network, RAN) device (including the first access network device or the second access network device) in embodiments of this application is a device that provides a wireless communication function for a terminal device. For example, the access network device includes but is not limited to a next-generation base station (gNodeB, gNB) in 5G, an evolved NodeB (eNB), a radio network controller (RNC), a NodeB (NB), a base station controller (BSC), a base transceiver station (BTS), a home base station (for example, home evolved NodeB, or home NodeB, HNB), a baseband unit (BBU), a transmission reception point (TRP), a transmission point (TP), a mobile switching center, and the like.

Optionally, the mobility management network element in embodiments of this application is mainly used for mobility management in a mobile network, for example, user location update, registration of a user with a network, and user switching. In a 5G communication system, the mobility management network element may be an access and mobility management function (AMF) network element, and Namf is a service-based interface provided by the AMF network element. The AMF network element may communicate with another network function through Namf. In future communication such as 6th generation (6G) communication, the mobility management network element may still be the AMF network element or have another name. This is not limited in embodiments of this application.

Optionally, the session management network element (including the first session management network element, the second session management network element, or the third session management network element) in embodiments of this application is mainly used for session management in a mobile network, for example, session establishment, modification, and release. A specific function is, for example, allocating an internet protocol (IP) address to a user, or selecting a user plane network element that provides a packet forwarding function. In a 5G system, the session management network element may be a session management function (SMF) network element, Nsmf is a service-based interface provided by the SMF, and the SMF may communicate with another network function through Nsmf. In future communication such as 6G, the session management network element may still be the SMF network element or have another name. This is not limited in embodiments of this application.

Optionally, the user plane network element (including the first user plane network element, the second user plane network element, or the third user plane network element) in embodiments of this application is mainly used for forwarding of a user data packet based on a routing rule of a session management network element. In a 5G communication system, the user management network element may be a user plane function (UPF) network element. In future communication such as 6G communication, the user management network element may still be the UPF network element or have another name. This is not limited in embodiments of this application.

Optionally, the network slice selection function network element in embodiments of this application is used for network slice selection for a terminal device or the like. In a 5G communication system, the network slice selection function network element may be a network slice selection function (NSSF) network element, Nnssf is a service-based interface provided by the NSSF network element, and the NSSF network element may communicate with another network function through Nnssf. In future communication such as 6G communication, the network slice selection function network element may still be the NSSF network element or have another name. This is not limited in embodiments of this application.

Figure 3A:
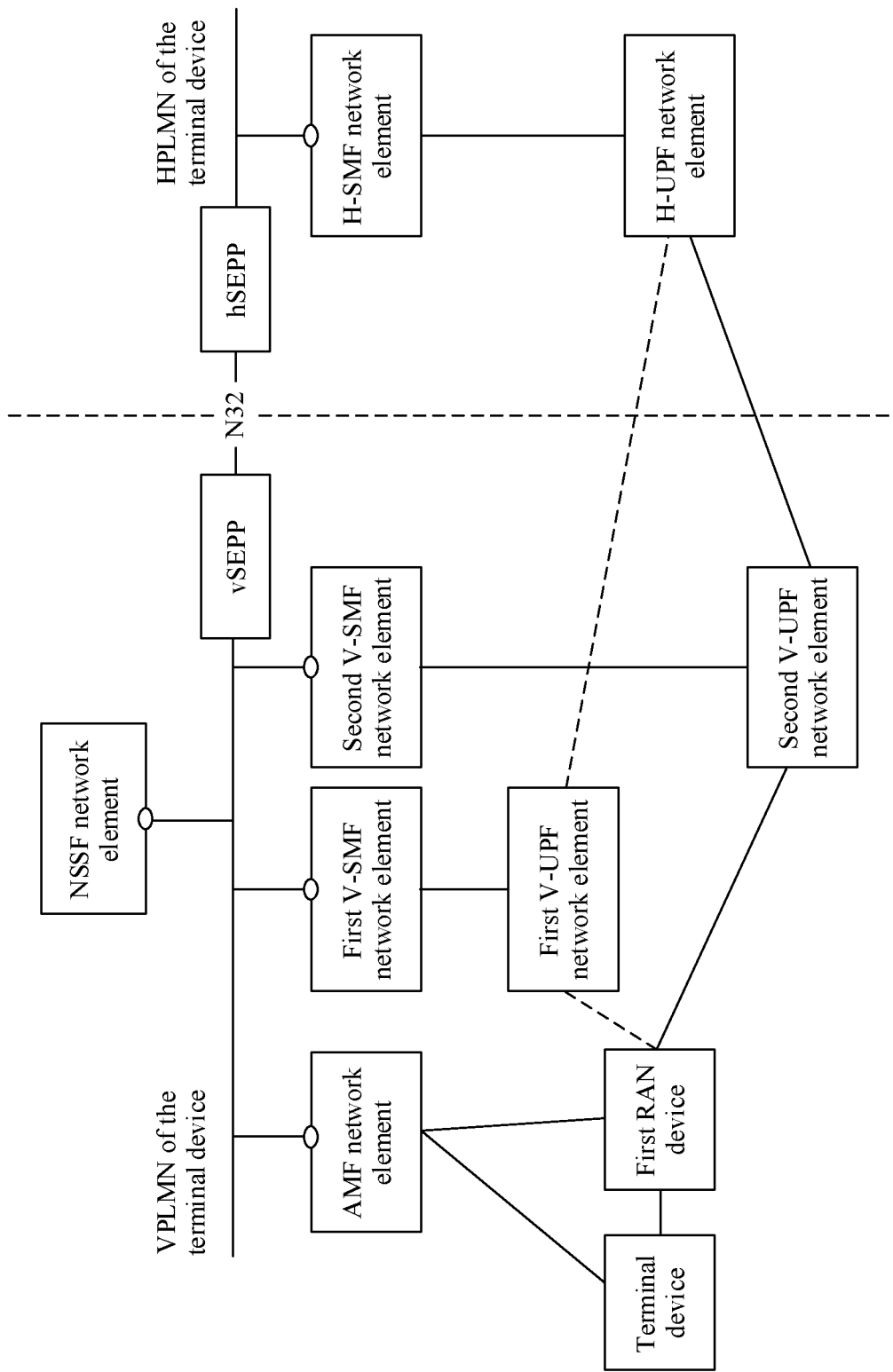
FIG. 3A is a diagram of the communication system shown in FIG. 2A according to an embodiment of this application.
Figure 3B:
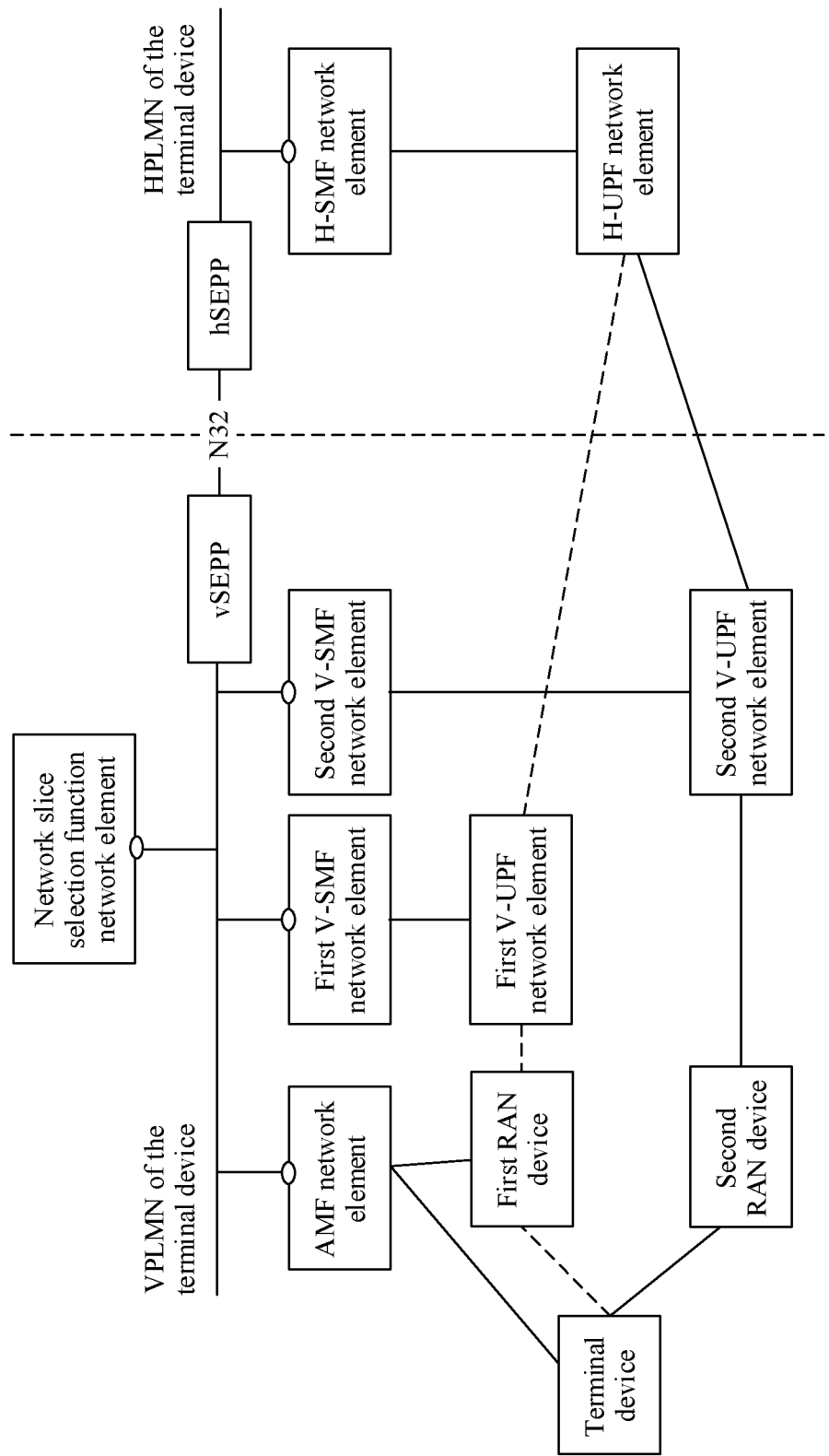
FIG. 3B is a diagram of the communication system shown in FIG. 2B according to an embodiment of this application.

A 5G communication system is used as an example. FIG. 3A is a schematic diagram of a network architecture corresponding to the communication system shown in FIG. 2A, to which an embodiment of this application is applicable. FIG. 3B is a schematic diagram of a network architecture corresponding to the communication system shown in FIG. 2B, to which an embodiment of this application is applicable. A network element or an entity corresponding to the mobility management network element may be an AMF network element in the 5G communication system. A network element or an entity corresponding to the first session management network element may be a first visited SMF (V-SMF) network element in the 5G communication system. A network element or an entity corresponding to the second session management network element may be a second V-SMF network element in the 5G communication system. A network element or an entity corresponding to the third session management network element may be a home SMF (H-SMF) network element in the 5G communication system. A network element or an entity corresponding to the first user plane network element may be a first visited UPF (V-UPF) network element in the 5G communication system. A network element or an entity corresponding to the second user plane network element may be a second V-UPF network element in the 5G communication system. A network element or an entity corresponding to the third user plane network element may be a home UPF (H-UPF) network element in the 5G communication system. A network element or an entity corresponding to the network slice selection function network element may be an NSSF network element in the 5G communication system. A network element or an entity corresponding to the first access network device may be a first RAN device in the 5G communication system. A network element or an entity corresponding to the second access network device may be a second RAN device in the 5G communication system.

Figure 16:
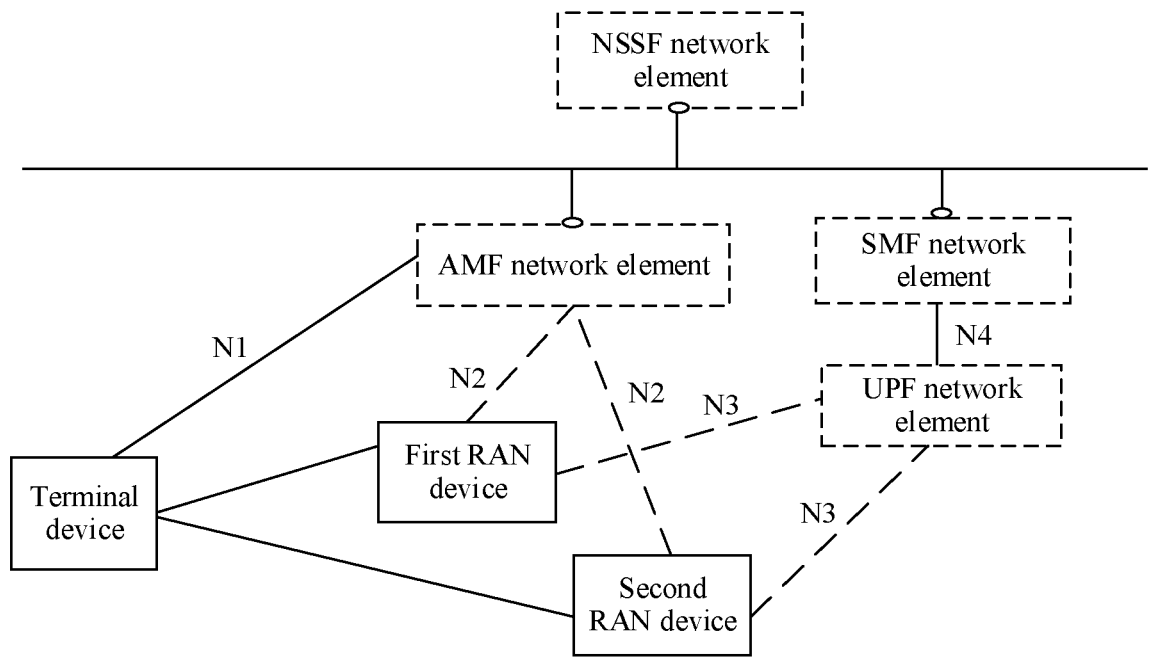
FIG. 16 is a diagram of a network architecture corresponding to the communication system shown in FIG. 14 according to an embodiment of this application.

Alternatively, a 5G communication system is used as an example. FIG. 16 is a diagram of a network architecture corresponding to the communication system shown in FIG. 14, to which an embodiment of this application is applicable. A network element or an entity corresponding to the mobility management network element may be an AMF network element in the 5G communication system. A network element or an entity corresponding to the session management network element may be an SMF network element in the 5G communication system. A network element or an entity corresponding to the user plane network element may be a UPF network element in the 5G communication system. A network element or an entity corresponding to the network slice selection function network element may be an NSSF network element in the 5G communication system. A network element or an entity corresponding to the first access network device may be a first RAN device (which may also be referred to as a target RAN device) in the 5G communication system. A network element or an entity corresponding to the second access network device may be a second RAN device (which may also be referred to as a source RAN device) in the 5G communication system.

In FIG. 3A, FIG. 3B, or FIG. 16, an N1 interface is a reference point between a terminal device and an AMF network element; an N2 interface is a reference point between a RAN device and an AMF network element (for example, between the first RAN device and the AMF network element or between the second RAN device and the AMF network element), and is used to send a non-access stratum (NAS) message and a next generation application protocol (NGAP) message, and the like; an N3 interface is a reference point between a RAN device and a V-UPF network element (for example, between the first RAN device and the first V-UPF network element, between the first RAN device and the second V-UPF network element, or between the second RAN device and the second V-UPF network element) or a reference point between a RAN device and a UPF network element (for example, in FIG. 16, between the first RAN device and the UPF network element or between the second RAN device and the UPF network element), and is used to transmit user plane data and the like; an N4 interface is a reference point between an SMF network element and a UPF network element (for example, between the first V-SMF network element and the first V-UPF network element, between the second V-SMF network element and the second V-UPF network element, between the H-SMF network element and the H-UPF network element, or between the SMF network element and the UPF network element in FIG. 16), and is used to transmit information such as tunnel identifier information of an N3 connection, data buffer indication information, and a downlink data notification message; and an N9 interface is a reference point between UPF network elements (for example, between the first V-UPF network element and the H-UPF network element, or between the second V-UPF network element and the H-UPF network element).

Control plane network elements shown in FIG. 3A, FIG. 3B, or FIG. 16 such as the AMF network element, the SMF network element (for example, the first V-SMF network element, the second V-SMF network element, the H-SMF network element, or the SMF network element in FIG. 16), and the NSSF network element can interact with each other through service-oriented interfaces. For example, an external service-oriented interface provided by the AMF network element may be Namf, an external service-oriented interface provided by the SMF network element may be Nsmf, an external service-oriented interface provided by a PCF network element may be Npcf, and an external service-oriented interface provided by the NSSF network element may be Nnssf. In addition, a visited security edge protection proxy (vSEPP) in FIG. 3A or FIG. 3B is used for information filtering, policy control, topology hiding, and the like of a control plane interface inside a visited public land mobile network (VPLMN) of the terminal device; a home security edge protection proxy (home security edge protection proxy, hSEPP) in FIG. 3A or FIG. 3B is used for information filtering, policy control, topology hiding, and the like of a control plane interface inside a home public land mobile network (HPLMN) of the terminal device. The vSEPP and the hSEPP are connected through an N32 interface (N32 for short).

It should be noted that the H-SMF network element may also be referred to as an anchor SMF network element, the H-UPF network element may also be referred to as an anchor UPF network element, the first V-UPF network element may also be referred to as a new V-UPF network element, the second V-UPF network element may also be referred to as an old V-UPF network element, the first V-SMF network element may also be referred to as a new V-SMF network element, and the second V-SMF network element may also be referred to as an old V-SMF network element. This is not specifically limited in embodiments of this application.

Optionally, in embodiments of this application, the mobility management network element, the session management network element, the first access network device, the second access network device, the first session management network element, the second session management network element, the third session management network element, the first user plane network element, the second user plane network element, the third user plane network element, or the network slice selection function network element may also be referred to as a communication apparatus, and may be a general-purpose device or a dedicated device. This is not specifically limited in embodiments of this application.

Optionally, in embodiments of this application, a related function of the mobility management network element, the session management network element, the first access network device, the second access network device, the first session management network element, the second session management network element, the third session management network element, the first user plane network element, the second user plane network element, the third user plane network element, or the network slice selection function network element may be implemented by one device, may be jointly implemented by a plurality of devices, or may be implemented by one or more function modules in one device. This is not specifically limited in embodiments of this application. It may be understood that the foregoing function may be a network element in a hardware device, a software function running on dedicated hardware, a combination of hardware and software, or a virtualization function instantiated on a platform (for example, a cloud platform).

Figure 4:
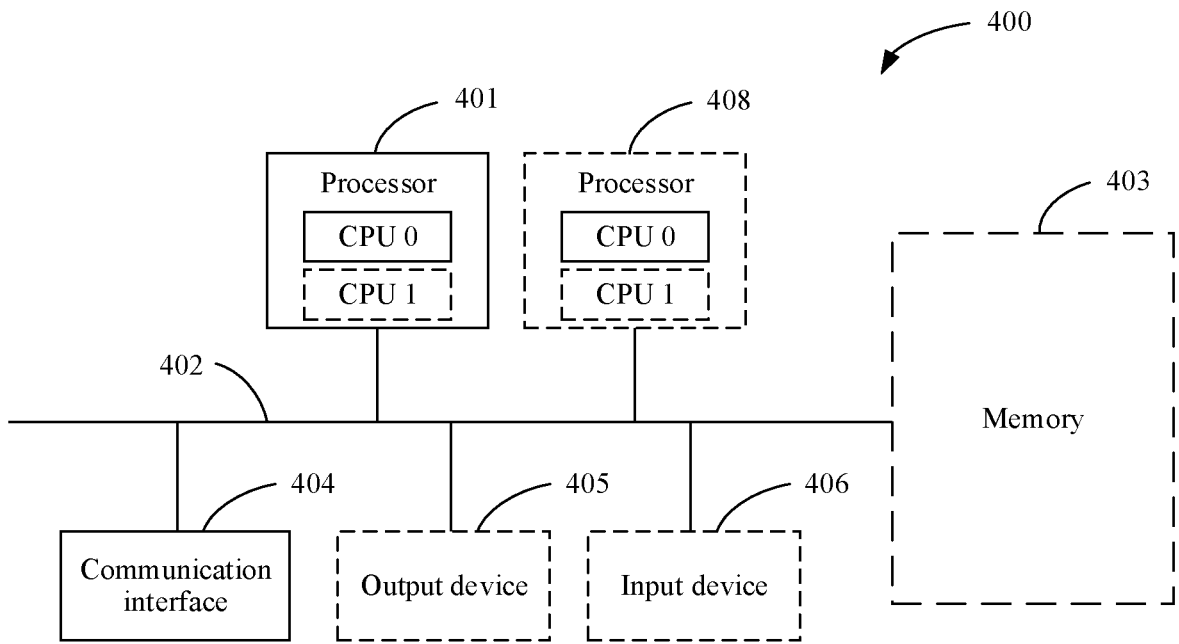
FIG. 4 is a diagram of a communication device according to an embodiment of this application.

For example, in embodiments of this application, the related function of the mobility management network element, the session management network element, the first access network device, the second access network device, the first session management network element, the second session management network element, the third session management network element, the first user plane network element, the second user plane network element, the third user plane network element, or the network slice selection function network element may be implemented by a communication device 400 in FIG. 4. FIG. 4 is a schematic diagram of a structure of the communication device 400 according to an embodiment of this application. The communication device 400 includes one or more processors 401, a communication line 402, and at least one communication interface (where in FIG. 4, an example in which a communication interface 404 and one processor 401 are included is merely used for description), and optionally, may further include a memory 403.

The processor 401 may be a general-purpose central processing unit (CPU), a microprocessor, an application-specific integrated circuit (ASIC), or one or more integrated circuits configured to control program execution of the solutions in this application.

The communication line 402 may include a path for connecting different components.

The communication interface 404 may be a transceiver module, configured to communicate with another device or a communication network, such as the Ethernet, a RAN, or a wireless local area network (WLAN). For example, the transceiver module may be an apparatus such as a transceiver or a transceiver machine. Optionally, the communication interface 404 may alternatively be a transceiver circuit located in the processor 401, and is configured to implement signal input and signal output of the processor.

The memory 403 may be an apparatus having a storage function. For example, the memory 403 may be a read-only memory (ROM) or another type of static storage device that can store static information and instructions, or a random access memory (RAM) or another type of dynamic storage device that can store information and instructions, or may be an electrically erasable programmable read-only memory (EEPROM), a compact disc read-only memory (CD-ROM) or other compact disc storage, optical disc storage (including a compact disc, a laser disc, an optical disc, a digital versatile disc, a Blu-ray disc, or the like), a magnetic disk storage medium or another magnetic storage device, or any other medium that can be used to carry or store expected program code in an instruction form or a data structure form and that can be accessed by a computer. However, the memory 403 is not limited thereto. The memory may exist independently, and is connected to the processor through the communication line 402. Alternatively, the memory may be integrated with the processor.

The memory 403 is configured to store computer-executable instructions for executing the solutions in this application, and the processor 401 controls execution. The processor 401 is configured to execute the computer-executable instructions stored in the memory 403, to implement the network slice selection method provided in embodiments of this application.

Alternatively, optionally, in this embodiment of this application, the processor 401 may perform processing-related functions in the network slice selection method provided in the following embodiments of this application, and the communication interface 404 is responsible for communicating with another device or a communication network. This is not specifically limited in this embodiment of this application.

Optionally, the computer-executable instructions in this embodiment of this application may also be referred to as application program code. This is not specifically limited in this embodiment of this application.

During implementation, in an embodiment, the processor 401 may include one or more CPUs, for example, a CPU 0 and a CPU 1 in FIG. 4.

During implementation, in an embodiment, the communication device 400 may include a plurality of processors, for example, the processor 401 and a processor 408 in FIG. 4. Each of these processors may be a single-core processor or a multi-core processor. The processor herein may include but is not limited to at least one of the following various computing devices that run software: a central processing unit (CPU), a microprocessor, a digital signal processor (DSP), a microcontroller unit (MCU), an artificial intelligence processor, or the like. Each computing device may include one or more cores configured to perform an operation or processing by executing software instructions.

During implementation, in an embodiment, the communication device 400 may further include an output device 405 and an input device 406. The output device 405 communicates with the processor 401, and may display information in a plurality of manners. For example, the output device 405 may be a liquid crystal display (LCD), a light emitting diode (LED) display device, a cathode ray tube (CRT) display device, or a projector. The input device 406 communicates with the processor 401, and may receive an input of a user in a plurality of manners. For example, the input device 406 may be a mouse, a keyboard, a touchscreen device, or a sensor device.

The communication device 400 may also be referred to as a communication apparatus sometimes, and may be a general-purpose device or a dedicated device. For example, the communication device 400 may be a desktop computer, a portable computer, a network server, a personal digital assistant (PDA), a mobile phone, a tablet computer, a wireless terminal device, an embedded device, the foregoing terminal device, the foregoing network device, or a device having a structure similar to that in FIG. 4. A type of the communication device 400 is not limited in this embodiment of this application.

Figure 5:
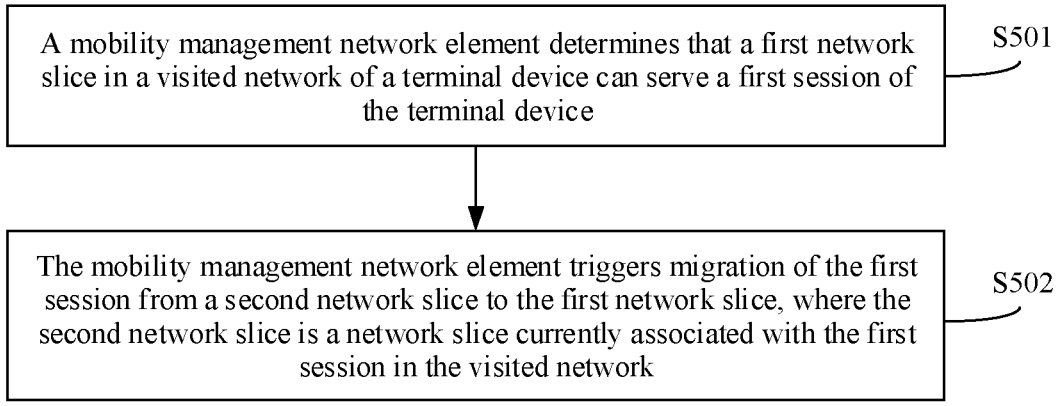
FIG. 5 is a flowchart of a network slice selection method according to an embodiment of this application.

FIG. 5 shows a network slice selection method according to an embodiment of this application. The method includes the following steps.

S501: A mobility management network element determines that a first network slice in a visited network of a terminal device can serve a first session of the terminal device.

In an embodiment, that a mobility management network element determines that a first network slice in a visited network of a terminal device can serve a first session of the terminal device includes: The mobility management network element determines that the terminal device moves out of a service range of a second network slice and the terminal device is currently located in a service range of the first network slice. In other words, the mobility management network element determines that the first session of the terminal device is associated with the first network slice in the visited network. The first network slice has a mapping relationship with a third network slice, and the third network slice is a network slice associated with the first session in a home network of the terminal device. This is to be further described with reference to FIG. 7A and FIG. 7B, FIG. 9, and FIG. 10 below.

In an embodiment, that a mobility management network element determines that a first network slice in a visited network of a terminal device can serve a first session of the terminal device includes: The mobility management network element receives first indication information from a first access network device, where the first indication information indicates that the first network slice supported by the first access network device can serve the first session. This is to be further described with reference to FIG. 11 below.

S502: The mobility management network element triggers migration of the first session from the second network slice to the first network slice, where the second network slice is a network slice currently associated with the first session in the visited network.

In an embodiment, that the mobility management network element triggers migration of the first session from the second network slice to the first network slice includes: The mobility management network element sends a first message to a first session management network element, where the first message requests to establish a user plane resource between a first user plane network element and a third user plane network element. This is to be further described with reference to "a manner 1" in FIG. 7A below.

In an embodiment, that the mobility management network element triggers migration of the first session from the second network slice to the first network slice includes: The mobility management network element obtains context information of the first session in the third network slice, where the third network slice is a network slice associated with the first session in the home network of the terminal device. The mobility management network element sends a second message to a first session management network element, where the second message includes the context information of the first session in the third network slice, and the second message requests to establish a user plane resource between a first user plane network element and a third user plane network element. This is to be further described with reference to "a manner 2" in FIG. 7B below.

The first session management network element is a session management network element that serves the first session in the first network slice, the first user plane network element is a user plane network element that serves the first session in the first network slice, the third user plane network element is a user plane network element that serves the first session in the third network slice, and the third network slice is a network slice associated with the first session in the home network of the terminal device.

An implementation of the foregoing solution is to be described in detail in the following interaction embodiment shown in FIG. 7A and FIG. 7B, FIG. 9, or FIG. 10 with reference to a specific scenario. Details are not described herein.

In a current technology, when the terminal device moves out of the service range of the second network slice, the mobility management network element triggers a corresponding session management network element to perform a session release procedure. In this way, the session is interrupted, and therefore continuity of the session cannot be maintained. According to the network slice selection method provided in this embodiment of this application, for the established first session of the terminal device, when the terminal device moves out of the service range of the second network slice, if the mobility management network element determines that the first network slice in the visited network of the terminal device can serve the first session of the terminal device, the mobility management network element triggers migration of the first session from the second network slice to the first network slice, so that continuity of the session can be maintained.

Figure 6:
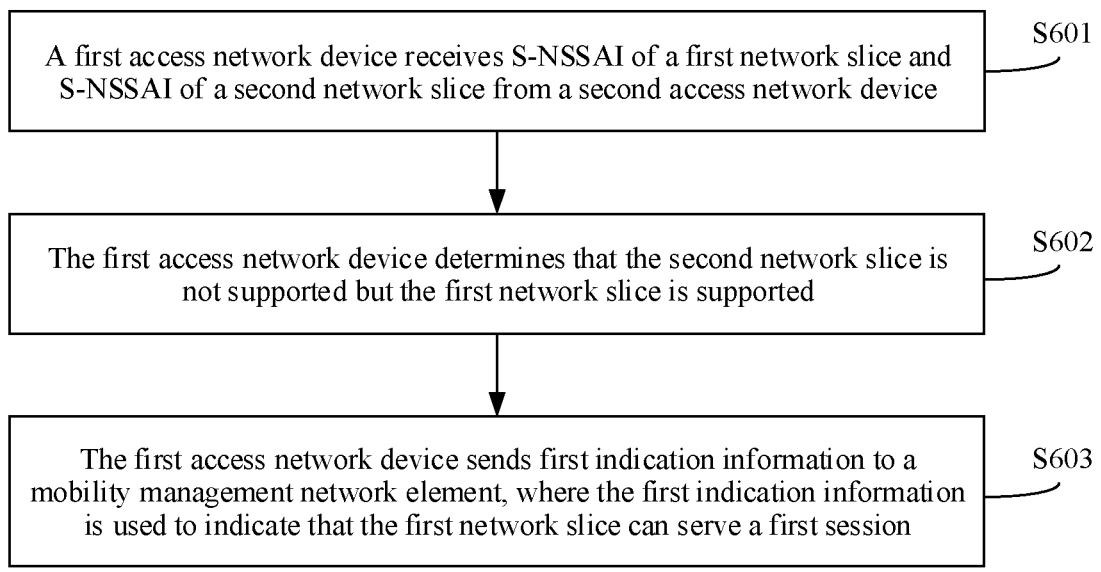
FIG. 6 is a flowchart of another network slice selection method according to an embodiment of this application.

FIG. 6 shows another network slice selection method according to an embodiment of this application. The method includes the following steps.

S601: A first access network device receives single network slice selection assistance information (S-NSSAI) of a first network slice and S-NSSAI of a second network slice from a second access network device.

The first network slice and the second network slice are network slices that are associated with a first session of a terminal device in a visited network of the terminal device and that each have a mapping relationship with a third network slice, the second network slice is a network slice currently associated with the first session in the visited network, and the third network slice is a network slice associated with the first session in a home network of the terminal device.

S602: The first access network device determines that the second network slice is not supported but the first network slice is supported.

S603: The first access network device sends first indication information to a mobility management network element, where the first indication information indicates that the first network slice can serve the first session.

An implementation of the foregoing solution is to be described in detail in the following interaction embodiment shown in FIG. 11 with reference to a specific scenario. Details are not described herein.

In a current technology, when the terminal device moves out of a service range of the second network slice, the mobility management network element triggers a corresponding session management network element to perform a session release procedure. In this way, the session is interrupted, and therefore continuity of the session cannot be maintained. According to the network slice selection method provided in this embodiment of this application, for the established first session of the terminal device, when the terminal device moves out of the service range of the second network slice, if the first access network device determines that the first network slice is supported, the first access network device may send, to the mobility management network element, the first indication information used to indicate that the first network slice can serve the first session, and the mobility management network element triggers migration of the first session from the second network slice to the first network slice, so that continuity of the session can be maintained.

The following describes in detail the network slice selection method provided in embodiments of this application with reference to FIG. 1 to FIG. 6.

It should be noted that names of messages between network elements, names of parameters in the messages, or the like in the following embodiments of this application are merely examples, and there may be other names during implementation. This is not specifically limited in embodiments of this application.

Figure 7A:
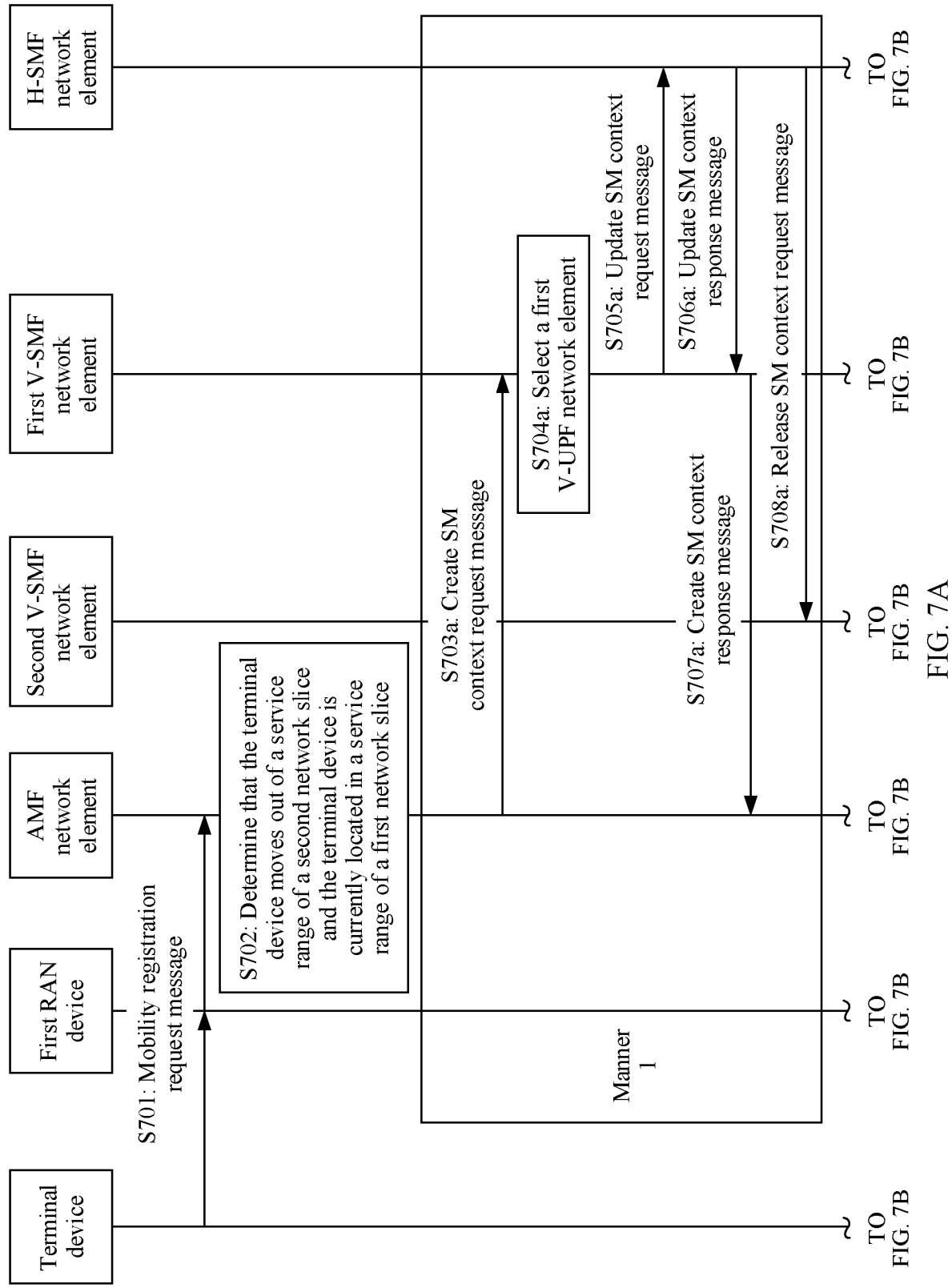
FIG. 7A and FIG. 7B are a first interaction diagram of a network slice selection method according to an embodiment of this application.
Figure 7B:
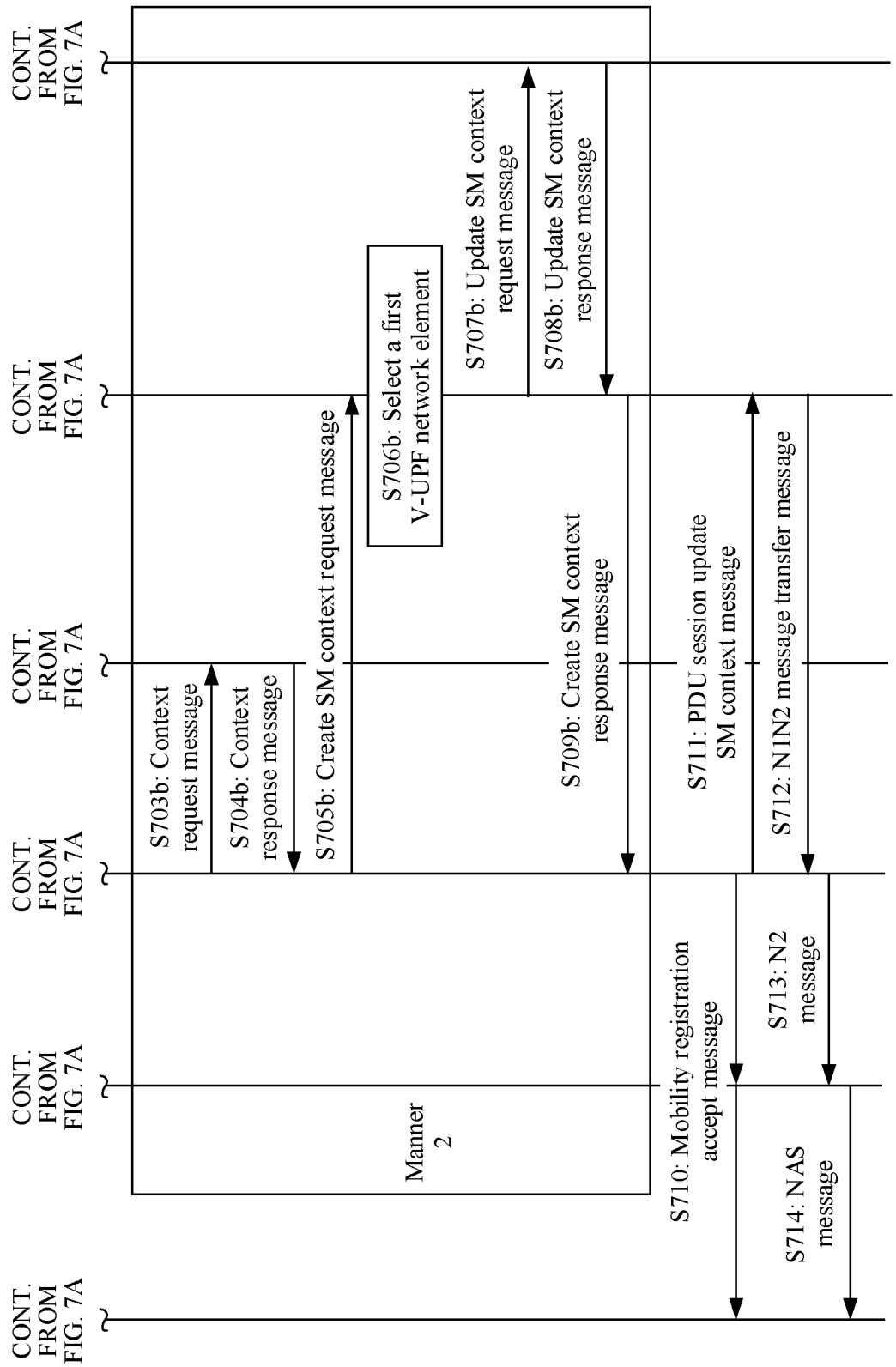

First, that the communication system shown in FIG. 2A is applied to the 5G network shown in FIG. 3A is used as an example. FIG. 7A and FIG. 7B show a network slice selection method according to an embodiment of this application. The network slice selection method is applied to a mobility registration update procedure and includes the following steps.

S701: The terminal device in an idle state initiates the mobility registration update procedure, and sends a message a to the AMF network element through the first RAN device. Correspondingly, the AMF network element receives the message a from the terminal device.

The message a carries parameters such as a globally unique temporary UE identity (5G-GUTI) and requested NSSAI. The first RAN device may address the AMF network element based on the 5G-GUTI. Details are not described herein.

In addition, it should be noted that the AMF network element in this embodiment of this application is located in a visited network of the terminal device. This is uniformly described herein, and details are not described again below.

For example, the message a in this embodiment of this application may be, for example, a mobility registration request message shown in FIG. 7A or a periodic registration update request message. This is not limited in the present invention.

S702: The AMF network element determines that the terminal device moves out of a service range of a second network slice and the terminal device is currently located in a service range of a first network slice. The first network slice has a mapping relationship with a third network slice, and the third network slice is a network slice associated with a first session of the terminal device in a home network of the terminal device.

Optionally, in this embodiment of this application, the AMF network element may learn, based on a stored context of the terminal device, that the terminal device has established the first session. If the first session is a session in a home-routed mode, the AMF network element further determines visited network S-NSSAI (V-S-NSSAI) and home network S-NSSAI (H-S-NSSAI) that correspond to the first session, and the AMF network element determines, based on current location information (for example, a tracking area identity (TAI)) of the terminal device, that the terminal device moves out of the service range of the second network slice indicated by the V-S-NSSAI. Further, the AMF network element may determine whether another network slice having a mapping relationship with the third network slice indicated by the H-S-NSSAI exists at a current location of the terminal device.

In an embodiment, the AMF network element may determine whether another network slice having a mapping relationship with the third network slice indicated by the H-S-NSSAI exists at the current location of the terminal device. An example is: The AMF network element determines, based on a stored roaming agreement between the VPLMN and the HPLMN, whether another network slice having a mapping relationship with the third network slice exists at the current location of the terminal device. For example, the terminal device is currently located in the service range of the first network slice, and the roaming agreement includes a mapping relationship between S-NSSAI (that is, the H-S-NSSAI) of the third network slice and S-NSSAI of the first network slice. In this case, the AMF network element may determine that the first network slice having a mapping relationship with the third network slice indicated by the H-S-NSSAI exists at the current location of the terminal device.

In an embodiment, the AMF network element may determine whether another network slice having a mapping relationship with the third network slice indicated by the H-S-NSSAI exists at the current location of the terminal device. An example is: The AMF network element sends a query message to the NSSF network element, where the query message carries a home PLMN ID (that is, an HPLMN ID) of the terminal device, the current location information of the terminal device, and NSSAI (that is, the H-S-NSSAI) of the third network slice, and requests information about a network slice in the visited network of the terminal device that can be mapped to the third network slice and that exists at the current location of the terminal device. Further, the AMF network element receives, from the NSSF network element, allowed NSSAI of the terminal device in the visited network and a mapping relationship between the allowed NSSAI and the S-NSSAI of the third network slice (mapping of allowed NSSAI), where the allowed NSSAI includes S-NSSAI of the first network slice. Therefore, the AMF network element may determine that the first network slice having a mapping relationship with the third network slice indicated by the H-S-NSSAI exists at the current location of the terminal device.

Further, in this embodiment of this application, because the AMF network element determines that the first network slice having a mapping relationship with the third network slice indicated by the H-S-NSSAI exists at the current location of the terminal device, the AMF network element may determine to reserve the first session but update the V-S-NSSAI corresponding to the first session, that is, the AMF network element triggers migration of the first session from the second network slice to the first network slice. The following provides two implementations in which the AMF network element triggers migration of the first session from the second network slice to the first network slice.

In an embodiment, the AMF triggers the first V-SMF network element to reestablish an N9 tunnel (for example, an N9 tunnel between the first V-UPF network element and the H-UPF network element) of the first session. However, because the terminal device is in the idle state, in the mobility registration update procedure, an N3 tunnel (for example, an N3 tunnel between the first V-UPF network element and the first RAN device) of the first session does not need to be established. The first V-SMF network element is selected by the AMF network element based on the S-NSSAI of the first network slice. As shown in FIG. 7A, the network slice selection method provided in this embodiment of this application further includes the following steps S703a to S708a.

S703a: The AMF network element sends a message b to the first V-SMF network element. Correspondingly, the first V-SMF network element receives the message b from the AMF network element. The message b requests to establish a user plane resource between the first V-UPF network element and the H-UPF network element.

Optionally, the message b in this embodiment of this application may carry a session identifier of the first session, the S-NSSAI of the first network slice, an identifier of the H-SMF network element, and the H-S-NSSAI. The session identifier of the first session is an identifier that is of the first session previously established by the terminal device and that is determined by the AMF network element based on the context of the terminal device, the identifier of the H-SMF network element is used to identify the H-SMF network element, and the H-S-NSSAI is S-NSSAI associated with the first session in the HPLMN of the terminal device, that is, the S-NSSAI of the third network slice. Optionally, the message b may further carry indication information a. The indication information a indicates the first V-SMF network element to establish only the N9 tunnel corresponding to the first session, but not to establish the N3 tunnel.

For example, the message b in this embodiment of this application may be, for example, a create session management (SM) context request message shown in FIG. 7A. Certainly, the message b in this embodiment of this application may alternatively be a scheduled Nsmf_PDUSession_CreateSMContext. This is not specifically limited in this embodiment of this application.

S704a: The first V-SMF network element selects the first V-UPF network element based on the S-NSSAI of the first network slice, and obtains first tunnel information of a first N9 tunnel between the first V-UPF network element and the H-UPF network element.

The first tunnel information may be allocated by the first V-SMF network element, or may be allocated by the first V-UPF network element. This is not specifically limited in this embodiment of this application. In addition, the first tunnel information may be understood as downlink tunnel information of the first N9 tunnel corresponding to the first session. This is uniformly described herein, and details are not described again below.

For example, the first tunnel information may be, for example, a tunnel identifier (which may be denoted as a core network tunnel identifier (CN tunnel ID)) of the first N9 tunnel on a first V-UPF network element side.

S705a: The first V-SMF network element addresses the H-SMF network element corresponding to the first session based on the identifier of the H-SMF network element, and sends a message c to the H-SMF network element. Correspondingly, the H-SMF network element receives the message c from the first V-SMF network element.

The message c carries the session identifier of the first session, an identifier of the first V-SMF network element, the H-S-NSSAI, and the first tunnel information of the first N9 tunnel, and requests the H-SMF network element to update a context of the N9 tunnel for the first session.

Certainly, in this embodiment of this application, after receiving the message c, the H-SMF network element may send the first tunnel information of the first N9 tunnel to the H-UPF network element, so that the H-UPF network element may subsequently send downlink data to the first V-UPF network element. This is not specifically limited in this embodiment of this application.

For example, the message c in this embodiment of this application may be, for example, an update SM context request message shown in FIG. 7A. Certainly, the message c in this embodiment of this application may alternatively be a scheduled Nsmf_PDUSession_UpdateSMContext. This is not specifically limited in this embodiment of this application.

S706a: The H-SMF network element sends a message d to the first V-SMF network element. Correspondingly, the first V-SMF network element receives the message d from the H-SMF network element.

The message d carries second tunnel information of the first N9 tunnel between the first V-UPF network element and the H-UPF network element. The second tunnel information may be allocated by the H-SMF network element, or may be allocated by the H-UPF network element. This is not specifically limited in this embodiment of this application. In addition, the second tunnel information may be understood as uplink tunnel information of the first N9 tunnel corresponding to the first session. This is uniformly described herein, and details are not described again below.

For example, the second tunnel information may be, for example, a tunnel identifier of the first N9 tunnel on an H-UPF network element side.

Certainly, in this embodiment of this application, after receiving the message d, the first V-SMF network element may send the second tunnel information of the first N9 tunnel to the first V-UPF network element, so that the first V-UPF network element may subsequently send uplink data to the H-UPF network element. This is not specifically limited in this embodiment of this application.

For example, the message d in this embodiment of this application may be, for example, an update SM context response message shown in FIG. 7A. Certainly, the message d in this embodiment of this application may alternatively be a scheduled Nsmf_PDUSession_UpdateSMContext response. This is not specifically limited in this embodiment of this application.

S707a: The first V-SMF network element sends a message e to the AMF network element. Correspondingly, the AMF network element receives the message e from the first V-SMF network element.

For example, the message e in this embodiment of this application may be, for example, a create SM context response message shown in FIG. 7A. Certainly, the message e in this embodiment of this application may alternatively be a scheduled Nsmf_PDUSession_UpdateSMContext response. This is not specifically limited in this embodiment of this application.

S708a: The H-SMF network element sends a message f to the second V-SMF network element. Correspondingly, the second V-SMF network element receives the message f from the H-SMF network element. The message f carries the session identifier of the first session, and is used to trigger the second V-SMF network element to release a session context of the first session.

For example, the message f in this embodiment of this application may be, for example, a release SM context request message shown in FIG. 7A. Certainly, the message f in this embodiment of this application may alternatively be a scheduled Nsmf_PDUSession_ReleaseSMContext. This is not specifically limited in this embodiment of this application.

Optionally, after releasing the session context of the first session, the second V-SMF network element may further send a release SM context response message to the H-SMF network element. This is not specifically limited in this embodiment of this application.

In an embodiment, the AMF network element obtains, from the second V-SMF, a session context that is of the first session and that is allocated by the H-SMF network element, and sends, to the first V-SMF network element, the session context that is of the first session and that is allocated by the H-SMF network element, to trigger the first V-SMF network element to update an N9 tunnel of the first session with the H-SMF network element. The first V-SMF network element is selected by the AMF network element based on the S-NSSAI of the first network slice. As shown in FIG. 7B, the network slice selection method provided in this embodiment of this application further includes the following steps S703b to S709b.

S703b: The AMF network element sends a message g to the second V-SMF network element. Correspondingly, the second V-SMF network element receives the message g from the AMF network element.

The message g carries a session identifier of the first session, and requests a session context that is of the first session and that is allocated by the H-SMF network element. The session context includes third tunnel information allocated by the H-SMF network element or the H-UPF network element for a second N9 tunnel between the second V-UPF network element and the H-UPF network element. In addition, the third tunnel information may also be understood as uplink tunnel information of the second N9 tunnel corresponding to the first session. This is uniformly described herein, and details are not described again below.

For example, the third tunnel information may be, for example, a tunnel identifier of the second N9 tunnel on an H-UPF network element side.

For example, the message g in this embodiment of this application may be, for example, a context request message shown in FIG. 7B.

S704b: The second V-SMF network element sends a message h to the AMF network element. Correspondingly, the AMF network element receives the message h from the second V-SMF network element. The message h carries the session context that is of the first session and that is allocated by the H-SMF network element.

For example, the message h in this embodiment of this application may be, for example, a context response message shown in FIG. 7B.

Optionally, in this embodiment of this application, the second V-SMF network element may further set a timer, and after the timer expires, the second V-SMF network element may locally release the context of the first session. This is not specifically limited in this embodiment of this application.

S705b: The AMF network element sends a message i to the first V-SMF network element. Correspondingly, the first V-SMF network element receives the message i from the AMF network element. The message i requests to establish a user plane resource between the first V-UPF network element and the H-UPF network element.

Optionally, the message i in this embodiment of this application may carry the session identifier of the first session, the S-NSSAI of the first network slice, an identifier of the H-SMF network element, and the session context that is of the first session and that is allocated by the H-SMF network element. The session identifier of the first session is an identifier that is of the first session previously established by the terminal device and that is determined by the AMF network element based on the context of the terminal device, and the identifier of the H-SMF network element is used to identify the H-SMF network element.

For example, the message i in this embodiment of this application may be, for example, a create SM context request message shown in FIG. 7B.

S706b: The first V-SMF network element selects the first V-UPF network element based on the S-NSSAI of the first network slice, and obtains first tunnel information of a first N9 tunnel between the first V-UPF network element and the H-UPF network element.

The first tunnel information may be allocated by the first V-SMF network element, or may be allocated by the first V-UPF network element. This is not specifically limited in this embodiment of this application.

For example, the first tunnel information may be, for example, a tunnel identifier of the first N9 tunnel on a first V-UPF network element side.

Certainly, in this embodiment of this application, after selecting the first V-UPF network element, the first V-SMF network element may send the third tunnel information of the second N9 tunnel between the second V-UPF network element and the H-UPF network element to the first V-UPF network element. Before session migration, the third tunnel information is used, so that the second V-UPF network element can send uplink data to the H-UPF network element. Because the H-UPF network element remains unchanged after session migration, the third tunnel information may be reused, that is, the third tunnel information is second tunnel information of the first N9 tunnel between the first V-UPF network element and the H-UPF network element. In this way, the first V-UPF network element may subsequently send uplink data to the H-UPF network element. This is not specifically limited in this embodiment of this application.

S707b: The first V-SMF network element addresses the H-SMF network element corresponding to the first session based on the identifier of the H-SMF network element, and sends a message j to the H-SMF network element. Correspondingly, the H-SMF network element receives the message j from the first V-SMF network element.

The message j carries the session identifier of the first session, an identifier of the first V-SMF network element, the H-S-NSSAI, the first tunnel information of the first N9 tunnel, and the session context that is of the first session and that is allocated by the H-SMF network element, and requests the H-SMF network element to create a context with the first V-SMF network element.

In this embodiment of this application, the message j carries the session context that is of the first session and that is allocated by the H-SMF network element, to request the H-SMF network element to update the session context that is of the first session and that is stored in the H-SMF network element. The H-SMF network element may replace fourth tunnel information of the second N9 tunnel between the second V-UPF network element and the H-UPF network element stored in the session context that is of the first session and that is stored in the H-SMF network element with the first tunnel information of the first N9 tunnel between the first V-UPF network element and the H-UPF network element. In addition, the fourth tunnel information may be understood as downlink tunnel information of the second N9 tunnel corresponding to the first session. This is uniformly described herein, and details are not described again below.

For example, the fourth tunnel information may be, for example, a tunnel identifier of the second N9 tunnel on a second V-UPF network element side.

Certainly, in this embodiment of this application, after receiving the message j, the H-SMF network element may send the first tunnel information of the first N9 tunnel to the H-UPF network element, so that the H-UPF network element may subsequently send downlink data to the first V-UPF network element. This is not specifically limited in this embodiment of this application.

Figure 8:
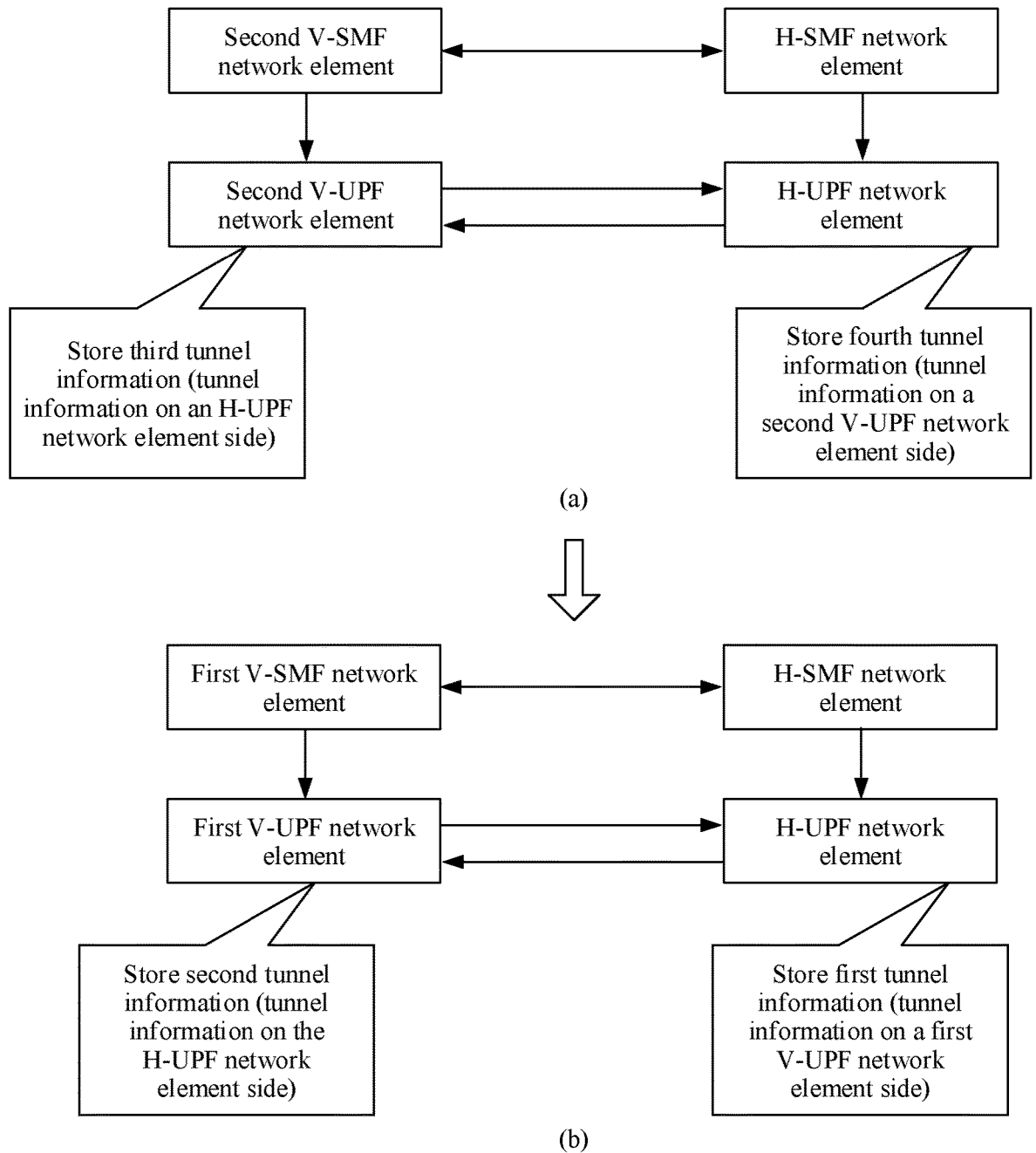
FIG. 8 is a diagram of N9 tunnels before and after a first session is migrated according to an embodiment of this application.

For ease of understanding, FIG. 8 is a schematic diagram of N9 tunnels before and after the first session is migrated according to this embodiment of this application. (a) in FIG. 8 is a schematic diagram of an N9 tunnel before the first session is migrated, and (b) in FIG. 8 is a schematic diagram of an N9 tunnel after the first session is migrated. It can be learned that both the second tunnel information and the third tunnel information are tunnel information on the H-UPF network element side, and therefore can remain unchanged before and after the first session is migrated, that is, the second tunnel information and the third tunnel information may be the same. However, because a V-UPF network element changes after the first session is migrated, the fourth tunnel information on the H-UPF network element side is replaced with the first tunnel information.

For example, the message j in this embodiment of this application may be, for example, an update SM context request message shown in FIG. 7B.

S708b: The H-SMF network element sends a message k to the first V-SMF network element. Correspondingly, the first V-SMF network element receives the message k from the H-SMF network element.

For example, the message k in this embodiment of this application may be, for example, an update SM context response message shown in FIG. 7B.

S709b: The first V-SMF network element sends a message 1 to the AMF network element. Correspondingly, the AMF network element receives the message 1 from the first V-SMF network element.

For example, the message 1 in this embodiment of this application may be, for example, a create SM context response message shown in FIG. 7B.

Based on the foregoing steps S703a to S708a or steps S703b to S709b, the first session may be successfully migrated on a core network side. Further, as shown in FIG. 7B, the network slice selection method provided in this embodiment of this application includes the following steps.

S710: The AMF network element sends a message m to the terminal device. Correspondingly, the terminal device receives the message m from the AMF network element.

The message m carries updated allowed NSSAI and a mapping relationship between the S-NSSAI of the first network slice and the S-NSSAI of the third network slice, where the updated allowed NSSAI includes the S-NSSAI of the first network slice.

For example, the message m in this embodiment of this application may be, for example, a mobility registration accept message shown in FIG. 7B.

S711: The AMF network element sends a message n to the first V-SMF network element. Correspondingly, the first V-SMF network element receives the message n from the AMF network element. The message n carries indication information b, and the indication information b indicates the first V-SMF network element to initiate a modification procedure of the first session, to notify the terminal device that the V-S-NSSAI of the first session has changed.

For example, the message n in this embodiment of this application may be, for example, a PDU session update SM context message shown in FIG. 7B.

It should be noted that the indication information b in this embodiment of this application may also be referred to as first indication information. This is uniformly described herein, and is not specifically limited in this embodiment of this application.

S712: The first V-SMF network element initiates the session modification procedure according to an indication in the message n. The first V-SMF network element sends a message to the AMF network element. Correspondingly, the AMF network element receives the message o from the first V-SMF network element. The message o carries an N2 SM container and a PDU session modification command. The N2 SM container includes the session identifier of the first session and the S-NSSAI of the first network slice. The PDU session modification command includes the session identifier of the first session, the S-NSSAI of the first network slice, and the S-NSSAI of the third network slice. The S-NSSAI of the first network slice is a modified V-S-NSSAI corresponding to the first session, and the S-NSSAI of the third network slice is the H-S-NSSAI corresponding to the first session.

For example, the message o in this embodiment of this application may be, for example, an N1N2 message transfer message shown in FIG. 7B.

S713: The AMF network element sends a message p to the first RAN device. Correspondingly, the first RAN device receives the message p from the AMF network element. The message p carries the N2 SM container and the PDU session modification command.

For example, the message p in this embodiment of this application may be, for example, an N2 message shown in FIG. 7B.

S714: The first RAN device sends a message q to the terminal device. Correspondingly, the terminal device receives the message q from the first RAN device. The message q carries the PDU session modification command.

For example, the message q in this embodiment of this application may be, for example, a NAS message shown in FIG. 7B.

In this way, the terminal device learns of the S-NSSAI (that is, the V-S-NSSAI) of the first network slice that corresponds to the H-S-NSSAI of the first session. Therefore, the locally stored S-NSSAI of the second network slice corresponding to the first session may be modified into the S-NSSAI of the first network slice that can serve the first session at the current location.

In a current technology, when the terminal device moves out of the service range of the second network slice, the AMF network element triggers a corresponding SMF network element (for example, the second V-SMF network element in this embodiment of this application) to perform a session release procedure. In this way, the session is interrupted, and therefore continuity of the session cannot be maintained. However, according to the network slice selection method provided in this embodiment of this application, for the established first session of the terminal device, when the terminal device moves out of the service range of the second network slice, if the AMF network element determines that the first network slice in the visited network of the terminal device can serve the first session of the terminal device, the AMF network element triggers migration of the first session from the second network slice to the first network slice, so that continuity of the session can be maintained.

The actions of the AMF network element or the actions of the first V-SMF network element in the foregoing steps S701 to S713 may be performed by the processor 401 in the communication device 400 shown in FIG. 4 by invoking the application program code stored in the memory 403. This is not limited in this embodiment.

In a current technology, when a first session of a terminal device is in an active state, and the terminal device is handed over from a second RAN device to a first RAN device, the first RAN device determines whether the first RAN device supports a network slice corresponding to the first session. If the first RAN device does not support the network slice corresponding to the first session, the first RAN device rejects handover of the first session from the second RAN device to the first RAN device, that is, handover of the first session fails. As a result, session continuity of the first session cannot be maintained.

Figure 9:
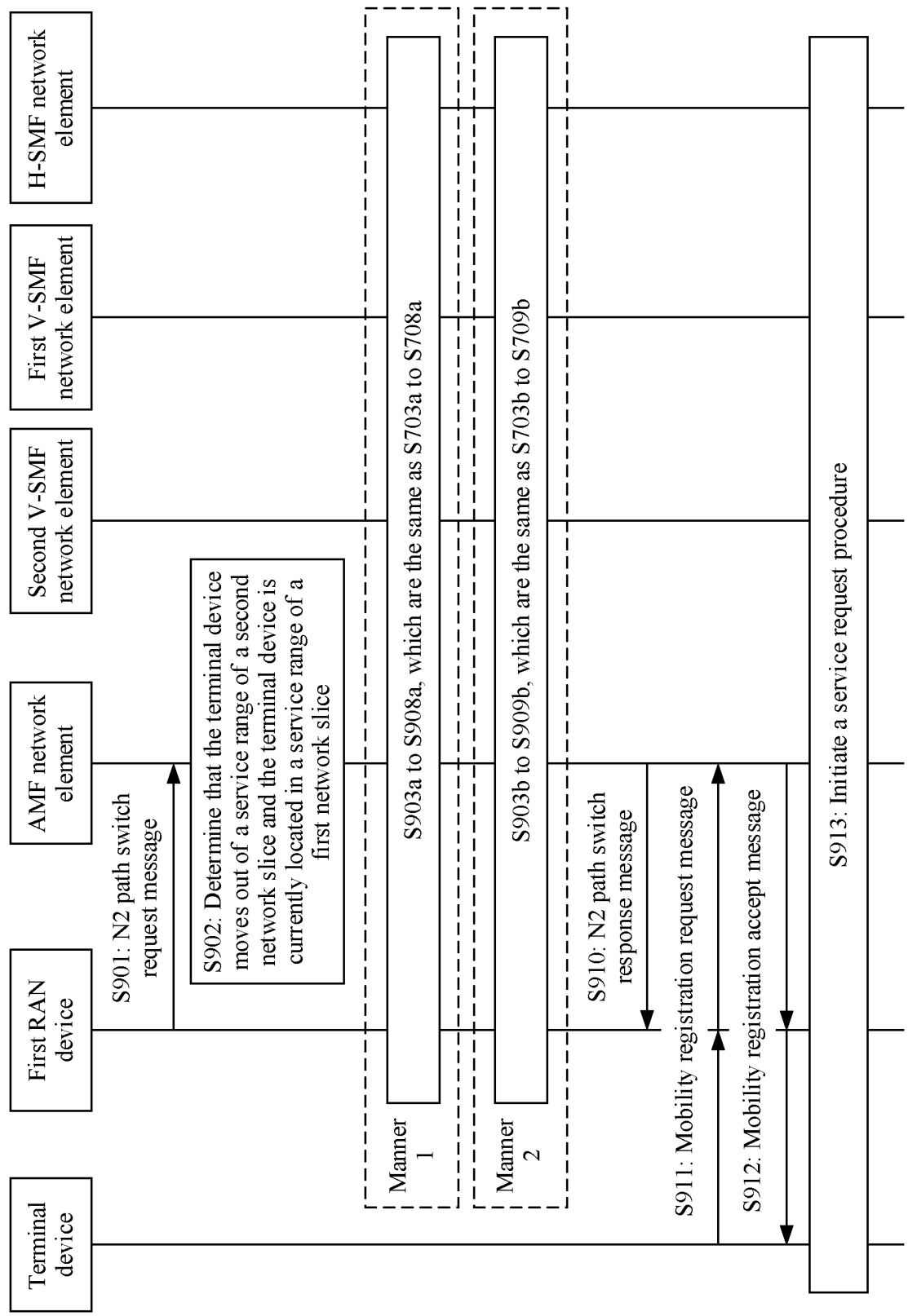
FIG. 9 is a second interaction diagram of a network slice selection method according to an embodiment of this application.

To resolve this problem, in an embodiment, that the communication system shown in FIG. 2B is applied to the 5G network shown in FIG. 3B is used as an example. FIG. 9 shows a network slice selection method according to an embodiment of this application. The network slice selection method is applied to a handover procedure and includes the following steps.

S901: The first RAN device sends a message r to the AMF network element. Correspondingly, the AMF network element receives the message r from the first RAN device. The message r carries a TAI corresponding to the first RAN device and a list of PDU sessions rejected with a rejection cause. The rejection list includes a session identifier of the first session of the terminal device, and the rejection cause is that the first RAN device does not support a second network slice associated with the first session in a visited network of the terminal device.

For example, the message r in this embodiment of this application may be, for example, an N2 path switch request message shown in FIG. 9.

S902: The AMF network element determines that the terminal device moves out of a service range of the second network slice and the terminal device is currently located in a service range of a first network slice. The first network slice has a mapping relationship with a third network slice, and the third network slice is a network slice associated with the first session of the terminal device in a home network of the terminal device.

Optionally, in this embodiment of this application, the AMF network element may determine, based on the list of PDU sessions rejected with a rejection cause, that the terminal device moves out of the service range of the second network slice. Further, the AMF network element may determine whether another network slice having a mapping relationship with the third network slice indicated by H-S-NSSAI exists at a current location of the terminal device. For a manner in which the AMF network element determines whether another network slice having a mapping relationship with the third network slice indicated by the H-S-NSSAI exists at the current location of the terminal device, refer to step S702 in the embodiment shown in FIG. 7A and FIG. 7B. Details are not described herein again.

Further, in this embodiment of this application, because the AMF network element determines that the first network slice having a mapping relationship with the third network slice indicated by the H-S-NSSAI exists at the current location of the terminal device, the AMF network element may determine to reserve the first session but update V-S-NSSAI corresponding to the first session, that is, the AMF network element triggers migration of the first session from the second network slice to the first network slice. The following provides two implementations in which the AMF network element triggers migration of the first session from the second network slice to the first network slice.

In an embodiment, as shown in FIG. 9, the network slice selection method provided in this embodiment of this application further includes the following steps S903*a* to S908*a*.

S903*a* to S908*a* are the same as steps S703*a* to S708*a* in the embodiment shown in FIG. 7A and FIG. 7B. For related descriptions, refer to the embodiment shown in FIG. 7A and FIG. 7B. Details are not described herein again.

In an embodiment, as shown in FIG. 9, the network slice selection method provided in this embodiment of this application further includes the following steps S903*b* to S909*b*.

S903*b* to S909*b* are the same as steps S703*b* to S709*b* in the embodiment shown in FIG. 7A and FIG. 7B. For related descriptions, refer to the embodiment shown in FIG. 7A and FIG. 7B. Details are not described herein again.

Based on the foregoing steps S903*a* to S908*a* or steps S903*b* to S909*b*, the first session may be successfully migrated on a core network side. Further, as shown in FIG. 9, the network slice selection method provided in this embodiment of this application includes the following step.

S910: The AMF network element sends a message s to the first RAN device. Correspondingly, the first RAN device receives the message s from the AMF network element.

For example, the message s in this embodiment of this application may be, for example, an N2 path switch response message shown in FIG. 9.

In this case, no N3 tunnel between the first RAN device and the first V-UPF network element or air interface resource of the first session has been established. Therefore, to implement complete handover of the first session on a target side, as shown in FIG. 9, the network slice selection method provided in this embodiment of this application further includes the following steps.

S911: The terminal device initiates a mobility registration update procedure, and sends a message a' to the AMF network element through the first RAN device. Correspondingly, the AMF network element receives the message a' from the terminal device.

The message a' carries parameters such as a 5G-GUTI, requested NSSAI, and a PDU session status. The 5G-GUTI is used to address the AMF network element. The PDU session status indicates a status of a session currently established by the terminal device on a terminal device side. For example, a second session is in the active state on the terminal device side, and a third session is in an inactive state on the terminal device side. The PDU session status is used by the terminal device to perform session status synchronization with a core network. For details, refer to an existing implementation. Details are not described herein.

For example, the message a' in this embodiment of this application may be, for example, a mobility registration request message shown in FIG. 9.

S912: Although the AMF network element reserves an anchor resource of the first session on the core network side, no air interface resource or N3 tunnel resource is established for the first session on the target side. Therefore, the AMF network element sends a message m' to the terminal device. Correspondingly, the terminal device receives the message m' from the AMF network element. The message m' carries indication information c, the indication information c indicates the terminal device to initiate a service request procedure associated with the first session, and the service request procedure is for establishment of an air interface resource of the first session. The air interface resource of the first session is associated with the first network slice.

For example, the indication information c may be, for example, the session identifier of the first session.

In addition, optionally, the message m' may further carry a PDU session status confirmed by the core network, updated allowed NSSAI, and a mapping relationship between S-NSSAI of the first network slice and S-NSSAI of the third network slice. The updated allowed NSSAI includes the S-NSSAI of the first network slice, and the confirmed PDU session status indicates statuses, on the core network side, of all sessions currently established by the terminal device. The session identifier of the first session, the S-NSSAI of the first network slice, and the S-NSSAI of the third network slice may be used by the terminal device to update S-NSSAI associated with the first session in the visited network.

It should be noted that the indication information c in this embodiment of this application may also be referred to as third indication information. This is uniformly described herein, and is not specifically limited in this embodiment of this application.

For example, the message m' in this embodiment of this application may be, for example, a mobility registration accept message shown in FIG. 9.

S913: The terminal device initiates the service request procedure based on the indication information c, so that the AMF network element establishes an N3 tunnel between the first RAN device and the first V-UPF network element and the air interface resource of the first session, where the service request procedure is consistent with a service request procedure triggered by a terminal device in the current technology, and details are not described herein.

It should be noted that, in the service request procedure provided in this embodiment of this application, the AMF network element may send the S-NSSAI of the first network slice and the session identifier of the first session to the first RAN device. The S-NSSAI of the first network slice and the session identifier of the first session are for an update of the S-NSSAI corresponding to the first session in the visited network. This is not specifically limited in this embodiment of this application.

In the current technology, when the terminal device moves out of the service range of the second network slice, the AMF network element triggers a corresponding SMF network element (for example, the second V-SMF network element in this embodiment of this application) to perform a session release procedure. In this way, the session is interrupted, and therefore continuity of the session cannot be maintained. However, according to the network slice selection method provided in this embodiment of this application, for the established first session of the terminal device, when the terminal device moves out of the service range of the second network slice, if the AMF network element determines that the first network slice in the visited network of the terminal device can serve the first session of the terminal device, the AMF network element triggers migration of the first session from the second network slice to the first network slice, so that continuity of the session can be maintained.

The actions of the AMF network element or the actions of the first V-SMF network element in the foregoing steps S901 to S913 may be performed by the processor 401 in the communication device 400 shown in FIG. 4 by invoking the application program code stored in the memory 403. This is not limited in this embodiment.

Figure 10:
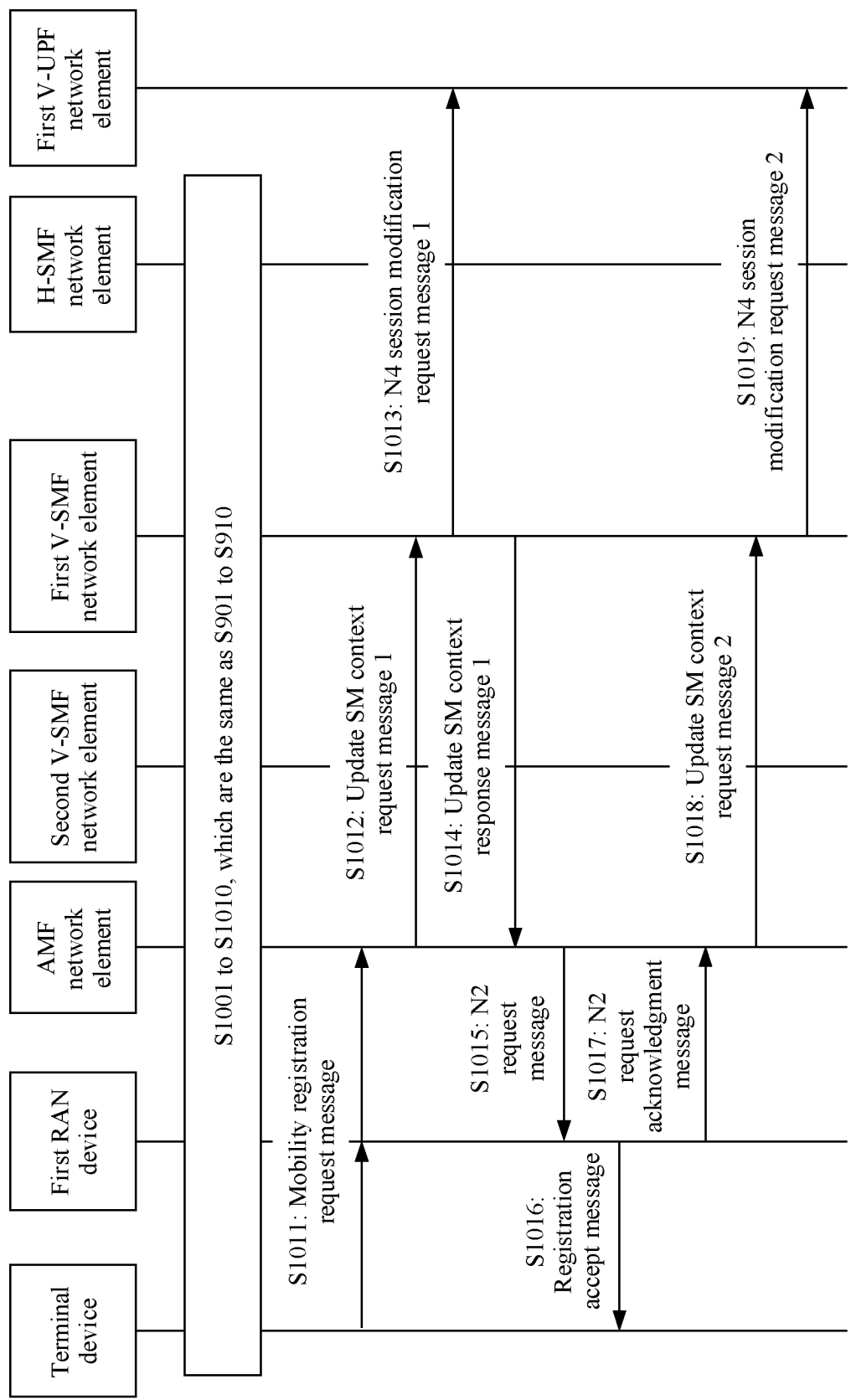
FIG. 10 is a third interaction diagram of a network slice selection method according to an embodiment of this application.

In an embodiment, that the communication system shown in FIG. 2B is applied to the 5G network shown in FIG. 3B is used as an example. FIG. 10 shows another network slice selection method according to an embodiment of this application. The network slice selection method is applied to a handover procedure and includes the following steps.

S1001 to S1010 are the same as steps S901 to S910 in the embodiment shown in FIG. 9. For related descriptions, refer to the embodiment shown in FIG. 9. Details are not described herein again.

In this case, no N3 tunnel between the first RAN device and the first V-UPF network element or air interface resource of the first session has been established. Therefore, to implement complete handover of the first session on a target side, as shown in FIG. 10, the network slice selection method provided in this embodiment of this application further includes the following steps.

S1011 is the same as step S911 in the embodiment shown in FIG. 9. For related descriptions, refer to the embodiment shown in FIG. 9. Details are not described herein again.

S1012: The AMF network element sends a message t to the first V-SMF network element. Correspondingly, the first V-SMF network element receives the message t from the AMF network element. The message t carries a session identifier of the first session, and requests the first V-SMF network element to establish an N3 tunnel between the first RAN device and the first V-UPF network element and an air interface resource of the first session. The air interface resource of the first session is associated with a first network slice.

For example, the message t in this embodiment of this application may be, for example, an update SM context request message 1 shown in FIG. 10.

S1013: The first V-SMF network element selects the first V-UPF network element based on S-NSSAI of the first network slice, and sends a message u to the first V-UPF network element. Correspondingly, the first V-UPF network element receives the message u from the first V-SMF network element.

Optionally, the message u may carry fifth tunnel information of an N3 tunnel between the first RAN device and the first V-UPF network element, and the fifth tunnel information may be understood as uplink N3 tunnel information corresponding to the first session.

For example, the fifth tunnel information may be, for example, a tunnel identifier of the N3 tunnel on the first V-UPF network element side.

For example, the message u in this embodiment of this application may be, for example, an N4 session modification request message 1 shown in FIG. 10.

Certainly, the first V-UPF network element may further send an N4 session modification response message 1 to the first V-SMF network element. This is not specifically limited in this embodiment of this application.

It should be noted that, in this embodiment of this application, the fifth tunnel information of the N3 tunnel between the first RAN device and the first V-UPF network element may alternatively be allocated by the first V-UPF network element. In this case, the N4 session modification response message 1 carries the fifth tunnel information. This is uniformly described herein, and details are not described again below.

S1014: The first V-SMF network element sends a message v to the AMF network element. Correspondingly, the AMF network element receives the message v from the first V-SMF network element. The message v carries N2 SM information, the N2 SM information includes the S-NSSAI of the first network slice, a QoS profile, and the fifth tunnel information of the N3 tunnel between the first RAN device and the first V-UPF network element, and the fifth tunnel information is used by the first RAN device to subsequently send uplink data to the first V-UPF network element through the N3 tunnel.

For example, the message v in this embodiment of this application may be, for example, an update SM context response message 1 shown in FIG. 10.

S1015: The AMF network element sends a message w to the first RAN device. Correspondingly, the first RAN device receives the message w from the AMF network element. The message w includes the N2 SM information and a registration accept message, and the registration accept message includes a confirmed PDU session status, updated allowed NSSAI, and a mapping relationship between the S-NSSAI of the first network slice and S-NSSAI of a third network slice. The updated allowed NSSAI includes the S-NSSAI of the first network slice.

For example, the message w in this embodiment of this application may be, for example, an N2 request message shown in FIG. 10.

S1016: The first RAN device sends a registration accept message to the terminal device. Correspondingly, the terminal device receives the registration accept message from the first RAN device.

S1017: The first RAN device sends a message x to the AMF network element. Correspondingly, the AMF network element receives the message x from the first RAN device. The message x carries sixth tunnel information that is of an N3 tunnel between the first RAN device and the first V-UPF network element and that is allocated by the first RAN device, and the sixth tunnel information may be understood as downlink N3 tunnel information corresponding to the first session.

For example, the sixth tunnel information may include, for example, a tunnel identifier of the N3 tunnel on a first RAN device side.

For example, the message x in this embodiment of this application may be, for example, an N2 request acknowledgment message shown in FIG. 10.

S1018: The AMF network element sends a message y to the first V-SMF network element. Correspondingly, the first V-SMF network element receives the message y from the AMF network element. The message y carries the sixth tunnel information of the N3 tunnel between the first RAN device and the first V-UPF network element.

For example, the message y in this embodiment of this application may be, for example, an update SM context request message 2 shown in FIG. 10.

S1019: The first V-SMF network element sends a message z to the first V-UPF network element. Correspondingly, the first V-UPF network element receives the message z from the first V-SMF network element. The message z carries the sixth tunnel information of the N3 tunnel between the first RAN device and the first V-UPF network element, and the sixth tunnel information is used by the first V-UPF network element to subsequently send downlink data to the first RAN device through the N3 tunnel.

For example, the message z in this embodiment of this application may be, for example, an N4 session modification request message 2 shown in FIG. 10.

Certainly, the first V-UPF network element may further send an N4 session modification response message 2 to the first V-SMF network element, and the first V-SMF network element may further send an update SM context response message 2 to the AMF network element. This is not specifically limited in this embodiment of this application.

In the current technology, when the terminal device moves out of a service range of a second network slice, the AMF network element triggers a corresponding SMF network element (for example, the second V-SMF network element in this embodiment of this application) to perform a session release procedure. In this way, the session is interrupted, and therefore continuity of the session cannot be maintained. However, according to the network slice selection method provided in this embodiment of this application, for the established first session of the terminal device, when the terminal device moves out of the service range of the second network slice, if the AMF network element determines that the first network slice in a visited network of the terminal device can serve the first session of the terminal device, the AMF network element triggers migration of the first session from the second network slice to the first network slice, so that continuity of the session can be maintained.

The actions of the AMF network element or the actions of the first V-SMF network element in the foregoing steps S1001 to S1019 may be performed by the processor 401 in the communication device 400 shown in FIG. 4 by invoking the application program code stored in the memory 403. This is not limited in this embodiment.

In still another embodiment, that the communication system shown in FIG. 2B is applied to the 5G network shown in FIG. 3B is used as an example. FIG. 11 shows still another network slice selection method according to an embodiment of this application. The network slice selection method is applied to a handover procedure and includes the following steps.

S1101: The terminal device initiates a session establishment procedure, and sends a message 1 to the AMF network element through the second RAN device. Correspondingly, the AMF network element receives the message 1 from the second RAN device. The message 1 carries a session identifier of the first session of the terminal device, S-NSSAI (which may be denoted as H-S-NSSAI) of a third network slice associated with the first session in a home network of the terminal device, and S-NSSAI (which may be denoted as V-S-NSSAI 2) of a second network slice currently associated with the first session in a visited network of the terminal device. The second RAN device supports the second network slice.

Figure 11:
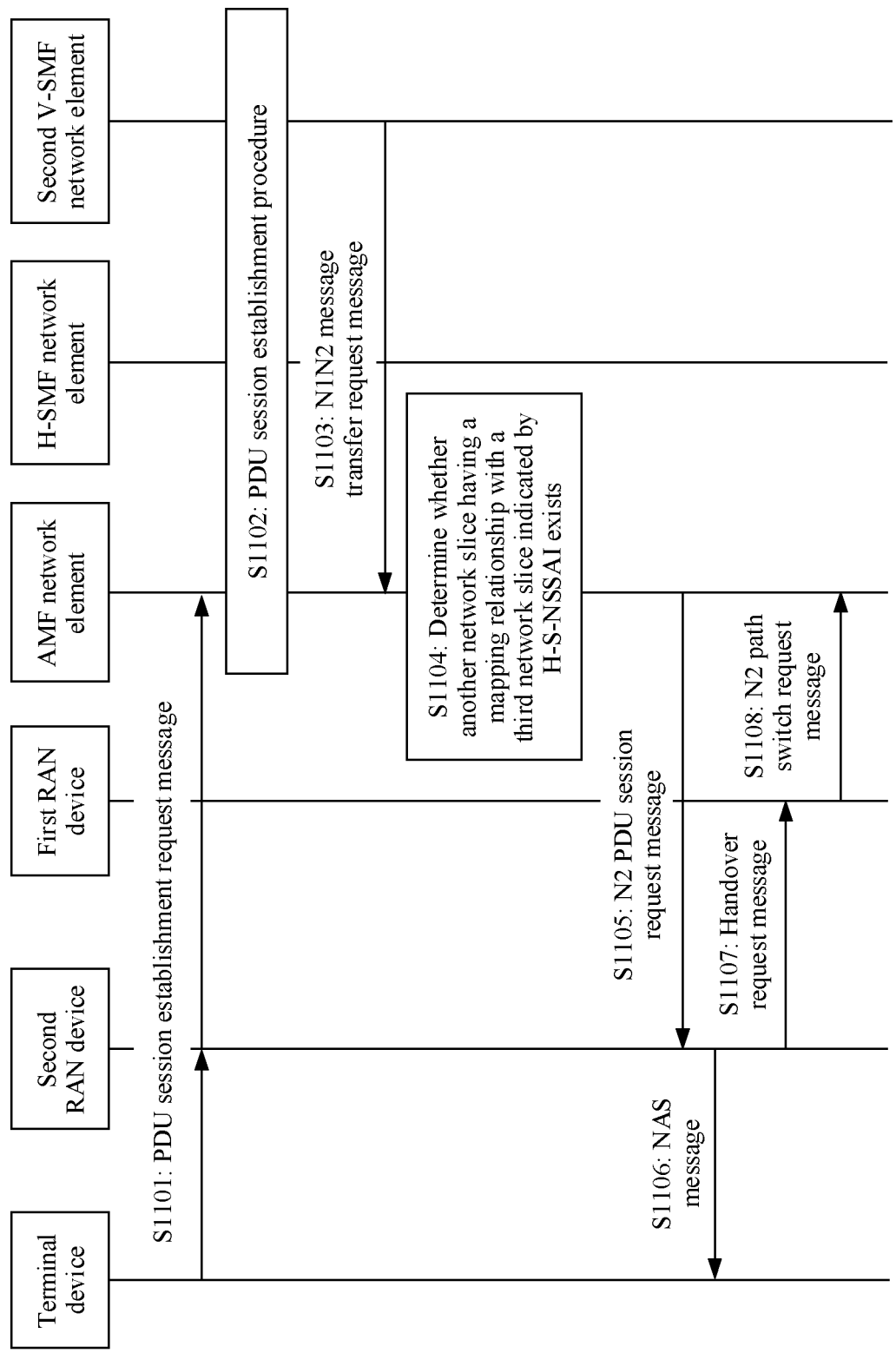
FIG. 11 is a fourth interaction diagram of a network slice selection method according to an embodiment of this application.

For example, the message 1 in this embodiment of this application may be, for example, a PDU session establishment request message shown in FIG. 11.

S1102: The AMF network element separately selects the second V-SMF network element and the H-SMF network element based on the V-S-NSSAI 2 and the H-S-NSSAI, and triggers the second V-SMF network element and the H-SMF network element to create a session context on a core network side. For a related implementation, refer to the current technology. Details are not described herein.

S1103: The second V-SMF network element sends a message 2 to the AMF network element. Correspondingly, the AMF network element receives the message 2 from the second V-SMF network element. The message 2 carries the session identifier of the first session, N2 SM information, and an N1 SM container. The N2 SM information includes the session identifier of the first session and the V-S-NSSAI 2, and an N2 SM container includes a PDU session establishment accept message.

For example, the message 2 in this embodiment of this application may be, for example, an N1N2 message transfer request message shown in FIG. 11.

S1104: The AMF network element determines whether another network slice having a mapping relationship with the third network slice indicated by the H-S-NSSAI exists.

In an embodiment, that the AMF network element determines whether another network slice having a mapping relationship with the third network slice indicated by the H-S-NSSAI exists may include: The AMF network element determines, based on a stored roaming agreement between the VPLMN and the HPLMN, whether another network slice having a mapping relationship with the third network slice exists in the VPLMN. For example, the terminal device is currently located in a service range of the second network slice, and the roaming agreement includes a mapping relationship between the S-NSSAI (that is, the H-S-NSSAI) of the third network slice and S-NSSAI of a first network slice, and a mapping relationship between the S-NSSAI of the third network slice and the S-NSSAI of the second network slice. In this case, the AMF network element may determine that in addition to the second network slice, network slices in the VPLMN that each have a mapping relationship with the third network slice indicated by the H-S-NSSAI also include the first network slice.

In an embodiment, that the AMF network element determines whether another network slice having a mapping relationship with the third network slice indicated by the H-S-NSSAI exists may include: The AMF network element sends a query message to the NSSF network element, where the query message carries a home PLMN ID (that is, an HPLMN ID) of the terminal device and the S-NSSAI (that is, the H-S-NSSAI) of the third network slice, and requests information about a network slice in the visited network of the terminal device that can be mapped to the third network slice and that exists in the VPLMN. Further, the AMF network element receives S-NSSAI of a first network slice and the S-NSSAI of the second network slice from the NSSF network element. The S-NSSAI of the first network slice and the S-NSSAI of the second network slice each have a mapping relationship with the NSSAI of the third network slice. Therefore, the AMF network element may determine that in addition to the second network slice, network slices in the VPLMN that each have a mapping relationship with the third network slice indicated by the H-S-NSSAI also include the first network slice.

When the AMF network element determines that the first network slice, other than the second network slice, that has a mapping relationship with the third network slice indicated by the H-S-NSSAI exists, the network slice selection method provided in this embodiment of this application further includes the following steps.

S1105: The AMF network element sends a message 3 to the second RAN device. Correspondingly, the second RAN device receives the message 3 from the AMF network element. The message 3 carries the S-NSSAI of the second network slice, the S-NSSAI of the first network slice, the N2 SM information, and the N1 SM container.

In this embodiment of this application, after receiving the message 3 from the AMF network element, the second RAN device may store the S-NSSAI of the second network slice, the S-NSSAI of the first network slice, and the N2 SM information.

It should be noted that in this embodiment of this application, the second RAN device supports the second network slice but does not support the first network slice. In this embodiment of this application, that the AMF network element determines that the first network slice, other than the second network slice, that has a mapping relationship with the third network slice indicated by the H-S-NSSAI exists is used as an example for description. Certainly, the AMF network element may alternatively determine that another network slice, other than the second network slice, that has a mapping relationship with the third network slice indicated by the H-S-NSSAI exists. A processing method is similar to that in this embodiment of this application, and details are not described herein again.

For example, the message 3 in this embodiment of this application may be, for example, an N2 PDU session request message shown in FIG. 11.

S1106: The second RAN device sends a message 4 to the terminal device. Correspondingly, the terminal device receives the message 4 from the second RAN device. The message 4 includes the N1 SM container.

For example, the message 4 in this embodiment of this application may be, for example, a NAS message shown in FIG. 11.

S1107: When the terminal device moves and performs Xn handover, the second RAN device sends a message 5 to the first RAN device. Correspondingly, the first RAN device receives the message 5 from the second RAN device. The message 5 carries the S-NSSAI of the first network slice and the S-NSSAI of the second network slice.

For example, as shown in FIG. 11, the message 5 in this embodiment of this application may be, for example, a handover request message.

S1108: If determining that the first RAN device does not support the second network slice but supports the first network slice, the first RAN device considers that handover of the first session may succeed, and then the first RAN device may send a message 6 to the AMF network element. Correspondingly, the AMF network element receives the message 6 from the first RAN device. The message 6 carries indication information d, and the indication information d indicates that the first network slice can serve the first session.

Optionally, the indication information d may be, for example, the session identifier of the first session and the S-NSSAI of the first network slice.

For example, the message 6 in this embodiment of this application may be, for example, an N2 path switch request message shown in FIG. 11.

Further, after learning that the first network slice can serve the first session, the AMF network element may trigger migration of the first session from the second network slice to the first network slice, and establish an N3 tunnel between the first RAN device and the first V-UPF network element and an air interface resource of the first session. For a related implementation, refer to steps S903*a* to S913 or steps S903*b* to S913 in the embodiment shown in FIG. 9. Alternatively, for a related implementation, refer to steps S1003*a* to S1019 or steps S1003*b* to S1019 in the embodiment shown in FIG. 10. Details are not described herein again.

In the current technology, when the terminal device moves out of the service range of the second network slice, the AMF network element triggers a corresponding SMF network element (for example, the second V-SMF network element in this embodiment of this application) to perform a session release procedure. In this way, the session is interrupted, and therefore continuity of the session cannot be maintained. However, according to the network slice selection method provided in this embodiment of this application, for the established first session of the terminal device, when the terminal device moves out of the service range of the second network slice, if the AMF network element determines that the first network slice in the visited network of the terminal device can serve the first session of the terminal device, the AMF network element triggers migration of the first session from the second network slice to the first network slice, so that continuity of the session can be maintained.

The actions of the AMF network element or the actions of the first V-SMF network element in the foregoing steps S1101 to S1108 may be performed by the processor 401 in the communication device 400 shown in FIG. 4 by invoking the application program code stored in the memory 403. This is not limited in this embodiment.

Figure 17:
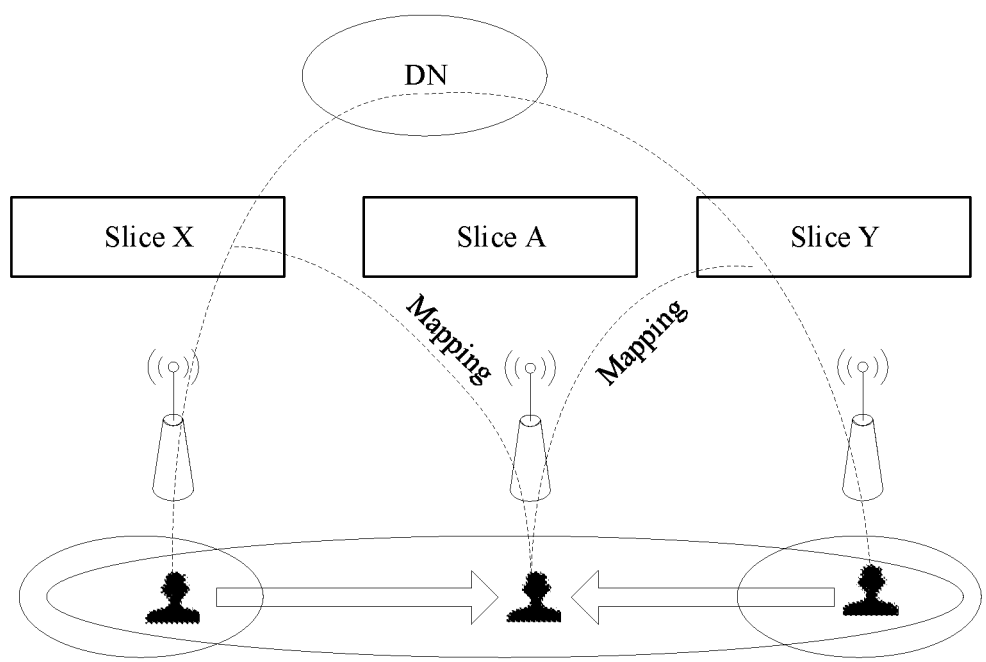
FIG. 17 is a diagram of a cross-slice movement scenario according to an embodiment of this application.

In a current technology, when a terminal device is in a connected state, a handover procedure is triggered as the terminal device moves. If an Xn interface exists between a source RAN device and a target RAN device to which the terminal device is to be handed over, the terminal device is handed over to a target side in an Xn interface handover procedure. However, in an existing Xn interface handover procedure, if the target RAN device does not support a network slice associated with a session of the terminal device, the target RAN device rejects handover of the session of the terminal device to the target side. As a result, session continuity of the session cannot be maintained on the target side, and service experience of the terminal device is affected. To resolve this problem, a slice mapping relationship in a same PLMN is introduced in embodiments of this application. A mapping relationship is formed between slices in different coverage areas, to ensure that a session anchor remains unchanged after the terminal device leaves a slice coverage area, thereby implementing service continuity. For example, as shown in FIG. 17, coverage areas of a slice X and a slice Y are both limited geographical areas. In other words, the terminal device can access the slice X or the slice Y only when located in a coverage area of the slice X or the slice Y In addition, a slice A is further deployed in the network, and the slice A has a mapping relationship with the slice X and also has a mapping relationship with the slice Y. In this way, after the terminal device moves into the coverage area of the slice X or the slice Y and establishes a session corresponding to the slice X or the slice Y, if the terminal device moves out of the coverage area of the slice X or the slice Y, because the slice A has a mapping relationship with the slice X or the slice Y, the terminal device may be connected to an anchor of the session by accessing the slice A, to ensure service continuity of the session.

The following describes in detail the network slice selection method provided in embodiments of this application with reference to FIG. 18A to FIG. 20.

Figure 18A:
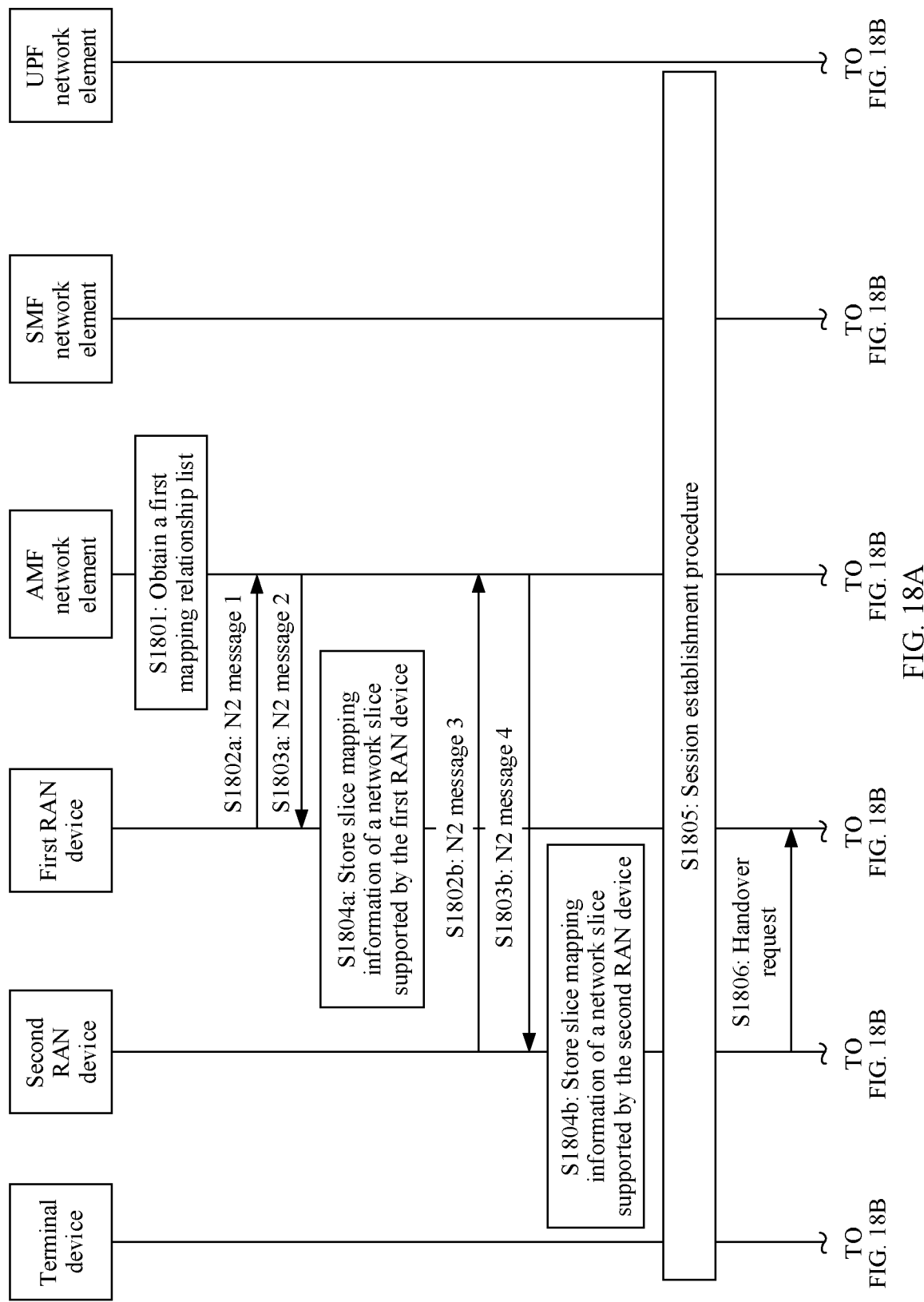
FIG. 18A and FIG. 18B are a fifth interaction diagram of a network slice selection method according to an embodiment of this application.
Figure 18B:
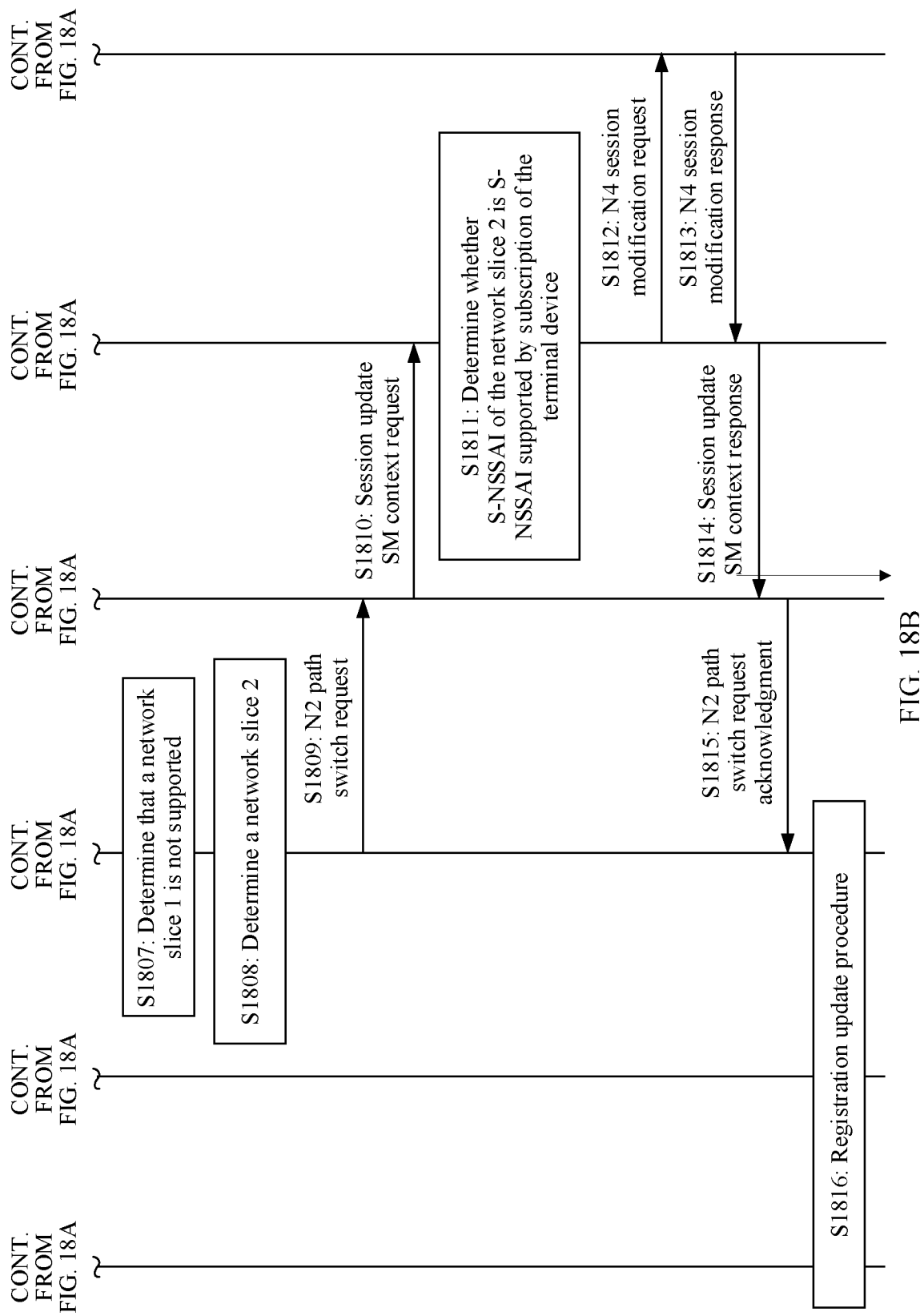

First, that the communication system shown in FIG. 14 is applied to the 5G network shown in FIG. 16 is used as an example. FIG. 18A and FIG. 18B show a network slice selection method according to an embodiment of this application. In the network slice selection method, RAN devices (including the first RAN device and the second RAN device below) obtain slice mapping information (slice mappings) in N2 setup procedures. For example, in an N2 connection setup procedure, the AMF network element delivers the slice mapping to the RAN device, and the RAN device locally stores the slice mapping. The AMF network element may locally configure the slice mapping or obtain the slice mapping from the NSSF network element. In a subsequent Xn handover procedure, the first RAN device may determine mapped S-NSSAI based on the slice mapping and S-NSSAI of a current session. The network slice selection method shown in FIG. 18A and FIG. 18B includes the following steps.

S1801: The AMF network element obtains a first mapping relationship list, where the first mapping relationship list includes slice mapping information of each network slice supported by the AMF network element.

For example, it is assumed that pieces of S-NSSAI of network slices supported by the AMF network element are separately S-NSSAI-X, S-NSSAI-Y, and S-NSSAI-Z, a network slice indicated by the S-NSSAI-X has a mapping relationship with a network slice indicated by S-NSSAI-A, a network slice indicated by the S-NSSAI-Y has a mapping relationship with a network slice indicated by S-NSSAI-B, and a network slice indicated by the S-NSSAI-Z has a mapping relationship with a network slice indicated by S-NSSAI-C. In this case, the first mapping relationship list may be shown in Table 1:

TABLE 1

| S-NSSAI of a network slice supported by the AMF network element | S-NSSAI of a network slice having a mapping relationship with the network slice |
| --- | --- |
| S-NSSAI-X | S-NSSAI-A |
| S-NSSAI-Y | S-NSSAI-B |
| S-NSSAI-Z | S-NSSAI-C |

For related descriptions that two network slices have a mapping relationship, refer to the foregoing embodiment. Details are not described herein again.

It should be noted that although the mapping relationship shown in Table 1 is a one-to-one mapping, in this embodiment of this application, a mapping relationship between network slices may alternatively be a one-to-many mapping, that is, a network slice may have a mapping relationship with a plurality of network slices. This is not specifically limited in this embodiment of this application.

It should be noted that, in this embodiment of this application, the network slice having a mapping relationship with the network slice supported by the AMF network element may be referred to as a mapped network slice for short. The AMF network element may support all mapped network slices. For example, with reference to Table 1, the AMF network element may support the network slice indicated by the S-NSSAI-A, the network slice indicated by the S-NSSAI-B, and the network slice indicated by the S-NSSAI-C. Alternatively, the AMF network element may not support any mapped network slice. For example, with reference to Table 1, the AMF network element may not support the network slice indicated by the S-NSSAI-A, the network slice indicated by the S-NSSAI-B, and the network slice indicated by the S-NSSAI-C. Alternatively, the AMF network element may support a part of mapped network slices. For example, with reference to Table 1, the AMF network element may support one or two of the network slice indicated by the S-NSSAI-A, the network slice indicated by the S-NSSAI-B, or the network slice indicated by the S-NSSAI-C. Whether the AMF network element supports a mapped network slice is not specifically limited in this embodiment of this application.

In an embodiment, the AMF network element may locally configure the first mapping relationship list. Correspondingly, that the AMF network element obtains a first mapping relationship list includes: The AMF network element obtains the preconfigured first mapping relationship list.

In an embodiment, the AMF network element does not locally configure the first mapping relationship list. Correspondingly, that the AMF network element obtains a first mapping relationship list includes: The AMF network element obtains the first mapping relationship list from the NSSF network element. The AMF network element may send a slice mapping request to the NSSF network element, where the slice mapping request includes NSSAI of the network slice supported by the AMF network element. Further, the NSSF network element may determine the first mapping relationship list based on the NSSAI of the network slice supported by the AMF network element, and send a slice mapping response to the AMF network element, where the slice mapping response includes the first mapping relationship list.

It should be noted that a mapping relationship list in embodiments of this application may also be referred to as a mapping relationship set. This is not specifically limited in embodiments of this application.

S1802a: The first RAN device sends an N2 message 1 to the AMF network element. Correspondingly, the AMF network element receives the N2 message 1 from the first RAN device.

The N2 message 1 includes information about the first RAN device and a slice information list supported by the first RAN device (where the slice information list herein may also be referred to as a slice information set).

Optionally, in this embodiment of this application, the information about the first RAN device may include an identifier of the first RAN device, a tracking area (TA) in which the first RAN device is located, or the like. This is not specifically limited in this embodiment of this application.

Optionally, the N2 message 1 in this embodiment of this application may be an N2 connection request message, an NG setup request message, or the like. This is not specifically limited in this embodiment of this application.

It should be noted that, in this embodiment of this application, an example in which the first RAN device interacts with one AMF network element is used for description. Certainly, if an N2 interface (or an NG interface) exists between the first RAN device and a plurality of AMF network elements, the first RAN device needs to separately send the N2 message 1 to the plurality of AMF network elements. This is not specifically limited in this embodiment of this application.

For example, it is assumed that network slices supported by the first RAN device include the network slice indicated by the S-NSSAI-A and the network slice indicated by the S-NSSAI-C. In this case, the slice information list supported by the first RAN device may be shown in Table 2:

TABLE 2

| Information about a RAN device | Slice information list supported by the RAN device |
| --- | --- |
| Information about the first RAN device | S-NSSAI-A and S-NSSAI-C |

S1803a: The AMF network element sends an N2 message 2 to the first RAN device. Correspondingly, the first RAN device receives the N2 message 2 from the AMF network element.

For example, the N2 message 2 includes slice mapping information of the network slice supported by the first RAN device.

For example, it is assumed that, as shown in Table 2, the slice information list supported by the first RAN device includes the S-NSSAI-A and the S-NSSAI-C, the network slice indicated by the S-NSSAI-A has a mapping relationship with the network slice indicated by the S-NSSAI-X, and the network slice indicated by the S-NSSAI-C has a mapping relationship with the network slice indicated by the S-NSSAI-Z. In this case, the slice mapping information of the network slice supported by the first RAN device may be shown in Table 3:

TABLE 3

| S-NSSAI of a network slice supported by the first RAN device | S-NSSAI of a network slice having a mapping relationship with the network slice |
| --- | --- |
| S-NSSAI-A | S-NSSAI-X |
| S-NSSAI-C | S-NSSAI-Z |

Alternatively, the N2 message 2 may include the S-NSSAI of the network slice supported by the AMF network element, and S-NSSAI of a network slice having a mapping relationship with each network slice supported by the AMF network element. For example, the first RAN device receives the slice mapping information shown in Table 1.

Optionally, in this embodiment of this application, the N2 message 2 may further include the S-NSSAI of the network slice supported by the AMF network element.

Optionally, the N2 message 2 in this embodiment of this application may be an N2 connection response message, an NG setup response message, or the like. This is not specifically limited in this embodiment of this application.

S1804a: The first RAN device stores the slice mapping information of the network slice supported by the first RAN device.

S1802b: The second RAN device sends an N2 message 3 to the AMF network element. Correspondingly, the AMF network element receives the N2 message 3 from the second RAN device.

The N2 message 3 includes information about the second RAN device and a slice information list supported by the second RAN device (where the slice information list herein may also be referred to as a slice information set).

Optionally, in this embodiment of this application, the information about the second RAN device may include an identifier of the second RAN device, a TA in which the first RAN device is located, or the like. This is not specifically limited in this embodiment of this application.

Optionally, the N2 message 3 in this embodiment of this application may be an N2 connection request message, an NG setup request message, or the like. This is not specifically limited in this embodiment of this application.

It should be noted that, in this embodiment of this application, an example in which the second RAN device interacts with one AMF network element is used for description. Certainly, if an N2 interface (or an NG interface) exists between the second RAN device and a plurality of AMF network elements, the second RAN device needs to separately send the N2 message 3 to the plurality of AMF network elements. This is not specifically limited in this embodiment of this application.

For example, it is assumed that network slices supported by the second RAN device include the network slice indicated by the S-NSSAI-Y and the network slice indicated by the S-NSSAI-X. In this case, the slice information list supported by the second RAN device may be shown in Table 4:

TABLE 4

| Information about a RAN device | Slice information list supported by the RAN device |
| --- | --- |
| Information about the second RAN device | S-NSSAI-Y and S-NSSAI-X |

S1803b: The AMF network element sends an N2 message 4 to the second RAN device. Correspondingly, the second RAN device receives the N2 message 4 from the AMF network element.

The N2 message 4 includes slice mapping information of the network slice supported by the second RAN device.

For example, it is assumed that, as shown in Table 4, the slice information list supported by the second RAN device includes the S-NSSAI-Y and the S-NSSAI-X, the network slice indicated by the S-NSSAI-X has a mapping relationship with the network slice indicated by the S-NSSAI-A, and the network slice indicated by the S-NSSAI-Y has a mapping relationship with the network slice indicated by the S-NSSAI-B. In this case, the slice mapping information of the network slice supported by the second RAN device may be shown in Table 5:

TABLE 5

| S-NSSAI of a network slice supported by the second RAN device | S-NSSAI of a network slice having a mapping relationship with the network slice |
| --- | --- |
| S-NSSAI-X | S-NSSAI-A |
| S-NSSAI-Y | S-NSSAI-B |

Similarly, alternatively, the N2 message 4 may include the S-NSSAI of the network slice supported by the AMF network element, and S-NSSAI of a network slice having a mapping relationship with each network slice supported by the AMF network element. For example, the second RAN device receives the slice mapping information shown in Table 1.

Optionally, in this embodiment of this application, the N2 message 4 may further include the S-NSSAI of the network slice supported by the AMF network element.

Optionally, the N2 message 4 in this embodiment of this application may be an N2 connection response message, an NG setup response message, or the like. This is not specifically limited in this embodiment of this application.

S1804b: The second RAN device stores the slice mapping information of the network slice supported by the second RAN device.

It should be noted that in this embodiment of this application, an example in which the first RAN device obtains, from the AMF network element, the slice mapping information of the network slice supported by the first RAN device, and the second RAN device obtains, from the AMF network element, the slice mapping information of the network slice supported by the second RAN device is used for description. Certainly, if an N2 interface (or an NG interface) exists between another RAN device and the AMF network element in FIG. 18A and FIG. 18B, the another RAN device may also obtain, in the manner of steps S1802a and S1803a or the manner of steps S1802b and S1803b, slice mapping information of a network slice supported by the RAN device. Details are not described herein again in this embodiment of this application.

S1805: After registering with the AMF network element, the terminal device initiates a session establishment procedure.

For detailed descriptions of the session establishment procedure, refer to a current technology. Details are not described herein.

The terminal device may register with the AMF network element in a registration procedure. In the registration procedure, the terminal device may send a registration request message to the AMF network element, where the registration request message carries requested NSSAI. After receiving the registration request message, the AMF network element determines allowed NSSAI based on subscription data of the terminal device and the requested NSSAI. The allowed NSSAI includes at least one S-NSSAI, and the at least one S-NSSAI included in the allowed NSSAI is an identifier of a network slice that the terminal device is allowed to access, and may be an identifier of a network slice that the terminal device is allowed to access in a current registration area.

In addition, in this embodiment of this application, after registering with the AMF network element, the terminal device may establish one or more sessions. This is not specifically limited in this embodiment of this application.

Further, the terminal device moves, and an Xn interface handover procedure is triggered. When the terminal device is in a connected state, the terminal device performs related measurement based on a measurement configuration message delivered by the second RAN device, and sends a measurement report to the second RAN device. The measurement report includes an information list of candidate RAN devices, on a target side, to which the terminal device is to be handed over (a list of candidate target IDs), and a result of a measurement indicator between each candidate RAN device and the terminal device. The measurement indicator includes at least one of a reference signal strength indication (RSSI), reference signal received power (RSRP), reference signal received quality (RSRQ), and the like that are obtained by the terminal device. Further, the second RAN device selects one candidate RAN device from a plurality of candidate RAN devices as a target RAN device (T-RAN) (that is, the first RAN device below) based on the result that is of the measurement indicator and that is reported by the terminal device. Further, if determining that an Xn interface exists between the second RAN device and the first RAN device, the second RAN device triggers an Xn based handover procedure, and performs the following step S1806.

S1806: The second RAN device sends a handover request to the first RAN device. Correspondingly, the first RAN device receives the handover request from the second RAN device.

The handover request includes S-NSSAI of a network slice associated with each session of the terminal device.

Optionally, the handover request may further include identification information of a target cell, QoS profile information corresponding to each session of the terminal device, or the like. This is not specifically limited in this embodiment of this application.

The following uses a session 1 of the terminal device as an example for description.

S1807: The first RAN device determines that a network slice associated with the session 1 of the terminal device is not supported.

For ease of the following descriptions, in this embodiment of this application, the network slice associated with the session 1 of the terminal device is referred to as a network slice 1. This is uniformly described herein, and details are not described again below.

An identifier of the network slice 1 is included in the allowed NSSAI in step S1805. In this embodiment of this application, that the first RAN device determines that the network slice 1 is not supported may be understood as that the first RAN device determines that the TA in which the first RAN device is located does not support the network slice 1. For example, the network slice 1 is not deployed in the TA in which the first RAN device is located, and the terminal device moves out of a service range of the network slice 1. This is uniformly described herein, and details are not described again below.

S1808: The first RAN device determines a network slice 2. The first RAN device supports the network slice 2, and the network slice 2 has a mapping relationship with the network slice 1.

Optionally, in this embodiment of this application, that the first RAN device determines a network slice 2 includes: The first RAN device determines the network slice 2 based on S-NSSAI of the network slice 1 and mapping information between the network slice 1 and the network slice 2. The mapping information between the network slice 1 and the network slice 2 may be stored by the first RAN device in step S1804a.

Optionally, in this embodiment of this application, if the network slice 1 has a mapping relationship with a plurality of network slices, the first RAN device may select a network slice supported by the AMF network element as the network slice 2.

For example, it is assumed that the S-NSSAI of the network slice 1 is the S-NSSAI-X, and the first RAN device does not support the network slice 1 but supports the network slice indicated by the S-NSSAI-A that has a mapping relationship with the S-NSSAI-X. In this case, the first RAN device may determine that the network slice indicated by the S-NSSAI-A is the network slice 2. Further, the first RAN device may allow the session 1 to be handed over to a first RAN device side.

Alternatively, for example, it is assumed that the S-NSSAI of the network slice 1 is the S-NSSAI-X, the first RAN device does not support the network slice 1 but supports network slices indicated by the S-NSSAI-A and S-NSSAI-AA that each have a mapping relationship with the S-NSSAI-X, and the AMF network element connected to the first RAN device supports the network slice indicated by the S-NSSAI-A but does not support a network slice indicated by the S-NSSAI-AA. In this case, the first RAN device may determine that the network slice indicated by the S-NSSAI-A is the network slice 2. Further, the first RAN device may allow the session 1 to be handed over to a first RAN device side.

For example, a method in which the first RAN device determines that the AMF network element connected to the first RAN device supports the network slice indicated by the S-NSSAI-A but does not support the network slice indicated by the S-NSSAI-AA may be: The first RAN device determines, based on the S-NSSAI that is of the network slice supported by the AMF network element and that is included in the N2 message 2 obtained in step S1802a, that the AMF network element supports the network slice indicated by the S-NSSAI-A but does not support the network slice indicated by the S-NSSAI-AA.

S1809: The first RAN device sends an N2 path switch request to the AMF network element. Correspondingly, the AMF network element receives the N2 path switch request from the first RAN device.

The N2 path switch request includes location information of the terminal device and N2 SM information. The N2 SM information includes an identifier of the session 1, and S-NSSAI of the network slice 2 that has a mapping relationship with the network slice 1 associated with the session 1.

In addition, the N2 SM information may further include first indication information, where the first indication information indicates that the S-NSSAI is an identifier of the network slice 2 that has a mapping relationship with the network slice 1 associated with the session 1.

S1810: The AMF network element sends a session update SM context request to the SMF network element. Correspondingly, the SMF network element receives the session update SM context request from the AMF network element.

The session update SM context request includes the N2 SM information.

S1811: The SMF network element determines whether the S-NSSAI of the network slice 2 is S-NSSAI supported by subscription of the terminal device.

If the SMF network element determines, based on the first indication information in the N2 SM information, that the S-NSSAI included in the N2 SM information is the identifier of the network slice 2 that has a mapping relationship with the network slice 1 associated with the session 1, the SMF network element further determines that the S-NSSAI of the network slice 2 is the mapped S-NSSAI supported by subscription of the terminal device, and continues to perform the following step S1812. Otherwise, the handover procedure ends.

S1812: The SMF network element sends an N4 session modification request to the UPF network element. Correspondingly, the UPF network element receives the N4 session modification request from the SMF network element.

S1813: The UPF network element sends an N4 session modification response to the SMF network element. Correspondingly, the SMF network element receives the N4 session modification response from the UPF network element.

S1814: The SMF network element sends a session update SM context response to the AMF network element. Correspondingly, the AMF network element receives the session update SM context response from the SMF network element.

S1815: The AMF network element sends an N2 path switch request acknowledgment (N2 path switch request ACK) to the first RAN device. Correspondingly, the first RAN device receives the N2 path switch request acknowledgment from the AMF network element.

For implementation of the foregoing steps S1812 to S1815, refer to the current technology. Details are not described herein.

It should be noted that the foregoing steps S1807 to S1815 are described by using a handover procedure of one session (that is, the session 1) of the terminal device as an example. If the handover request in step S1806 includes pieces of NSSAI of network slices associated with a plurality of sessions of the terminal device, for a handover procedure of each session, refer to the foregoing steps S1807 to S1815. This is uniformly described herein, and details are not described again below.

S1816: After handover, the terminal device initiates a registration update procedure.

In this procedure, the terminal device sends a registration request message to the AMF network element. Because an identifier of a network slice associated with the session of the terminal device changes, in the registration update procedure, the AMF network element determines new allowed NSSAI for the terminal device, and sends the new allowed NSSAI to the terminal device by using a registration accept message. The new allowed NSSAI includes at least one S-NSSAI, and the at least one S-NSSAI included in the new allowed NSSAI is an identifier of a network slice that the terminal device is allowed to access in a registration area of the target RAN device (that is, the first RAN device).

The new allowed NSSAI includes the identifier of the network slice 2. The new allowed NSSAI may be obtained by updating the allowed NSSAI in step S1805. It may be understood as that the allowed NSSAI determined by the AMF network element for the terminal device before handover includes the identifier of the network slice 1, and the new allowed NSSAI determined by the AMF network element for the terminal device after handover includes the identifier of the network slice 2 but does not include the identifier of the network slice 1.

After the mobility registration update procedure ends, the SMF network element initiates a session modification procedure. In the session modification procedure, the SMF network element sends an N1 session management message to the terminal device. The N1 session management message includes a session identifier of the terminal device and the identifier of the network slice 2, and is used to update the network slice that is associated with the session of the terminal device and that is stored in the terminal device. This is uniformly described herein, and details are not described again below.

In an existing Xn interface handover procedure, if the first RAN device does not support the network slice associated with the session of the terminal device (that is, the network slice 1), the first RAN device rejects handover of the session of the terminal device to the target side. As a result, session continuity of the session cannot be maintained on the target side, and service experience of the terminal device is affected. According to the network slice selection method provided in this embodiment of this application, even if the first RAN device does not support the network slice 1, because the first RAN device may perform slice mapping to determine a network slice (that is, the network slice 2) that is supported by the first RAN device and that has a mapping relationship with the network slice associated with the session of the terminal device, and trigger migration of the session of the terminal device from the network slice 1 to the network slice 2, continuity of the session can be maintained.

The actions of the first RAN device, the actions of the second RAN device, or the actions of the AMF network element in steps S1801 to S1816 may be performed by the processor 401 in the communication device 400 shown in FIG. 4 by invoking the application program code stored in the memory 403. This is not limited in this embodiment.

Figure 19A:
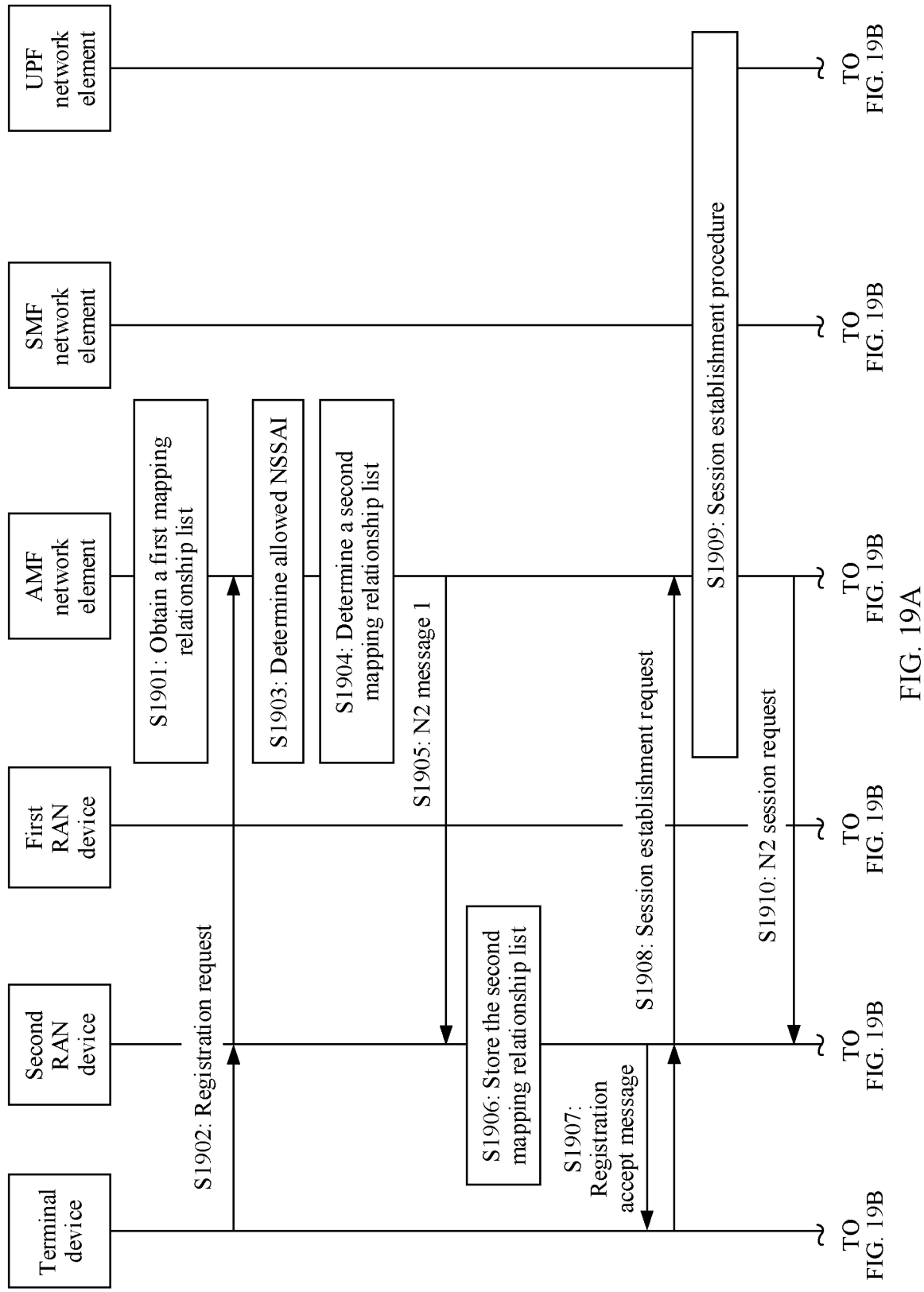
FIG. 19A and FIG. 19B are a sixth interaction diagram of a network slice selection method according to an embodiment of this application.
Figure 19B:
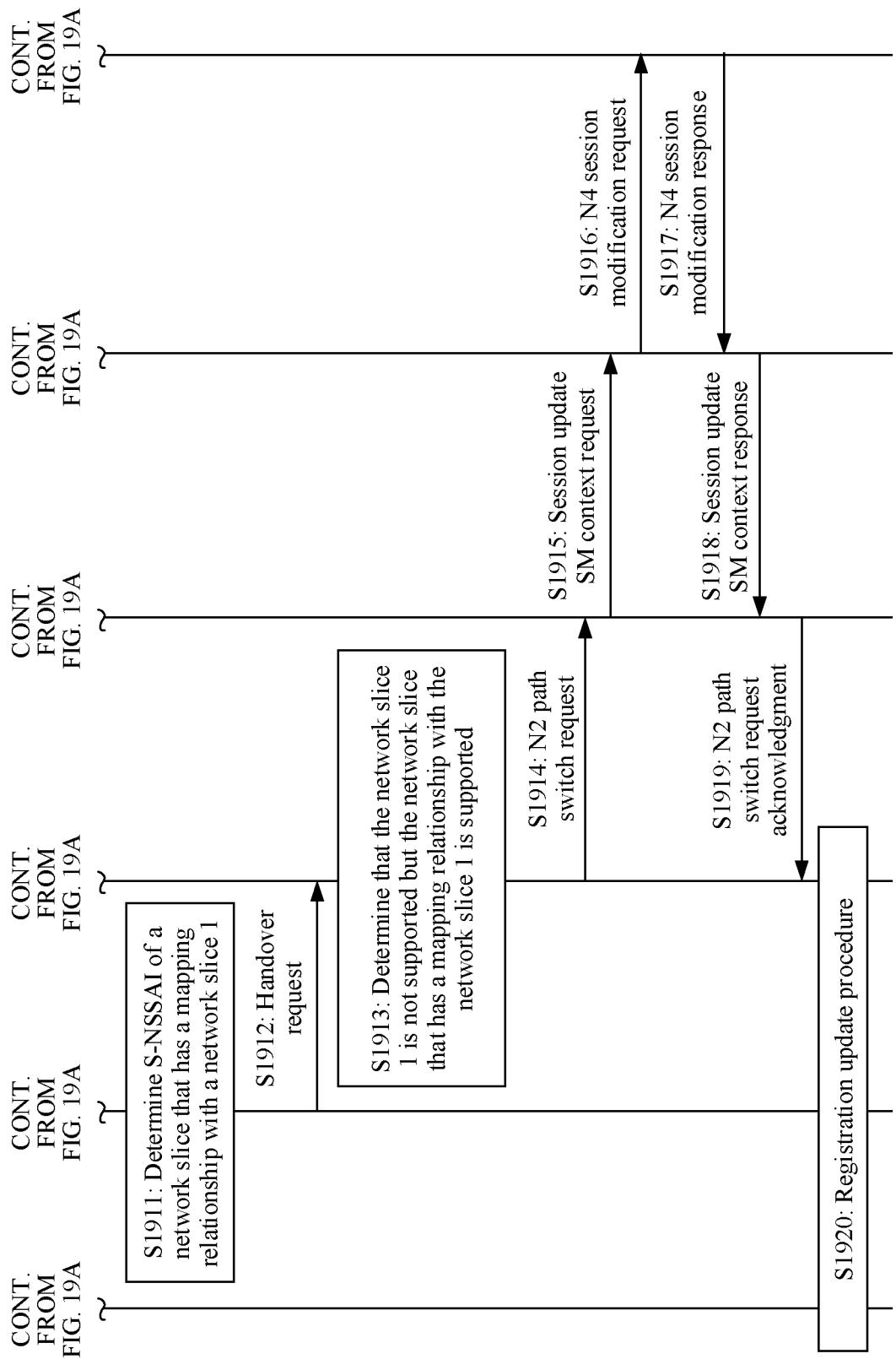

Optionally, that the communication system shown in FIG. 14 is applied to the 5G network shown in FIG. 16 is used as an example. FIG. 19A and FIG. 19B show another network slice selection method according to an embodiment of this application. The network slice selection method is applied to a registration procedure. In the method, the AMF network element delivers a slice mapping to the second RAN device, and the second RAN device locally stores the slice mapping. In a session establishment procedure, the second RAN device may determine mapped S-NSSAI based on the slice mapping and S-NSSAI of a current session. In a subsequent Xn handover procedure, the second RAN device may send the mapped S-NSSAI of the S-NSSAI of the current session to the first RAN device, so that the first RAN device determines whether a network slice indicated by the mapped S-NSSAI of the S-NSSAI of the current session is supported. The network slice selection method shown in FIG. 19A and FIG. 19B includes the following steps.

S1901: The AMF network element obtains a first mapping relationship list, where the first mapping relationship list includes slice mapping information of each network slice supported by the AMF network element.

For related descriptions of step S1901, refer to step S1801 in the embodiment shown in FIG. 18A and FIG. 18B. Details are not described herein again.

S1902: The terminal device is connected to the network through the second RAN device, and sends a registration request to the AMF network element through the second RAN device. Correspondingly, the AMF network element receives the registration request from the terminal device.

The registration request includes NSSAI (requested NSSAI) requested by the terminal device.

S1903: The AMF network element determines allowed NSSAI.

In this embodiment of this application, the AMF network element may determine the allowed NSSAI based on subscription data of the terminal device and the requested NSSAI. For details, refer to an existing implementation. Details are not described herein.

S1904: The AMF network element determines a second mapping relationship list, where the second mapping relationship list includes slice mapping information of a network slice indicated by the allowed NSSAI.

For example, it is assumed that the allowed NSSAI includes S-NSSAI-X and S-NSSAI-Y, a network slice indicated by the S-NSSAI-X has a mapping relationship with a network slice indicated by S-NSSAI-A, and a network slice indicated by the S-NSSAI-Y has a mapping relationship with a network slice indicated by S-NSSAI-B. In this case, the second mapping relationship list may be shown in Table 6:

TABLE 6

| Allowed NSSAI | S-NSSAI having a mapping relationship with each S-NSSAI included in the allowed NSSAI |
|---|---|
| S-NSSAI-X | S-NSSAI-A |
| S-NSSAI-Y | S-NSSAI-B |

Optionally, in this embodiment of this application, the AMF network element may determine the second mapping relationship list based on the allowed NSSAI and the first mapping relationship list obtained by the AMF network element in step S1901. The first mapping relationship list includes the second mapping relationship list.

It should be noted that a mapping relationship list in embodiments of this application may also be referred to as a mapping relationship set. This is not specifically limited in embodiments of this application.

S1905: The AMF network element sends an N2 message 1 to the second RAN device. Correspondingly, the second RAN device receives the N2 message 1 from the AMF network element.

The N2 message 1 includes the allowed NSSAI, the second mapping relationship list, and a registration accept message.

S1906: The second RAN device stores the second mapping relationship list.

S1907: The second RAN device sends a registration accept message to the terminal device. Correspondingly, the terminal device receives the registration accept message from the second RAN device.

S1908: The terminal device sends a session establishment request to the AMF network element. Correspondingly, the AMF network element receives the session establishment request from the terminal device.

The session establishment request includes parameters such as an identifier of a session 1 of the terminal device, S-NSSAI of a network slice associated with the session 1, and a DNN. For details, refer to a current technology. Details are not described herein. In addition, the S-NSSAI of the network slice associated with the session 1 is included in the allowed NSSAI in step S1903.

For ease of the following descriptions, in this embodiment of this application, the network slice associated with the session 1 of the terminal device is referred to as a network slice 1. This is uniformly described herein, and details are not described again below.

S1909: The AMF network element selects the SMF network element, and triggers the SMF network element to create a session context on a core network side. For related implementation, refer to the current technology. Details are not described herein.

S1910: The AMF network element sends an N2 session request to the second RAN device. Correspondingly, the second RAN device receives the N2 session request from the AMF network element.

The N2 session request includes N2 SM information, and the N2 SM information includes the identifier of the session 1 and S-NSSAI of a network slice 1 associated with the session 1.

S1911: The second RAN device determines S-NSSAI of a network slice that has a mapping relationship with the network slice 1.

The second RAN device may determine, based on the S-NSSAI of the network slice 1 associated with the session 1 and the second mapping relationship list stored in step S1906, the S-NSSAI of the network slice that has a mapping relationship with the network slice 1.

It should be noted that steps S1908 to S1911 are described by using an establishment procedure of one session (that is, the session 1) of the terminal device as an example. Certainly, the terminal device may establish a plurality of sessions. For an establishment procedure of each session, refer to the foregoing steps S1908 to S1911. Details are not described herein again.

Further, the terminal device moves, and an Xn interface handover procedure is triggered. When the terminal device is in a connected state, the terminal device performs related measurement based on a measurement configuration message delivered by the second RAN device, and sends a measurement report to the second RAN device. The measurement report includes an information list of candidate RAN devices, on a target side, to which the terminal device is to be handed over (a list of candidate target IDs), and a result of a measurement indicator between each candidate RAN device and the terminal device. The measurement indicator includes an RSSI, RSRP, RSRQ, or the like obtained by the terminal device. Further, the second RAN device selects one candidate RAN device from a plurality of candidate RAN devices as a target RAN device (T-RAN) (that is, the first RAN device below) based on the result that is of the measurement indicator and that is reported by the terminal device. Further, if determining that an Xn interface exists between the second RAN device and the first RAN device, the second RAN device triggers an Xn based handover procedure, and performs the following step S1912.

S1912: The second RAN device sends a handover request to the first RAN device. Correspondingly, the first RAN device receives the handover request from the second RAN device.

The handover request includes S-NSSAI of a network slice associated with each session of the terminal device (for example, the S-NSSAI of the network slice 1) and S-NSSAI of a network slice that has a mapping relationship with the network slice associated with each session (for example, the S-NSSAI of the network slice that has a mapping relationship with the network slice 1).

Optionally, the handover request may further include at least one of first indication information and second indication information. The first indication information indicates S-NSSAI that corresponds to a network slice associated with the session. The second indication information indicates S-NSSAI that corresponds to a network slice that has a mapping relationship with the network slice associated with the session. This is not specifically limited in this embodiment of this application.

Optionally, the handover request may further include identification information of a target cell, QoS profile information corresponding to each session of the terminal device, or the like. This is not specifically limited in this embodiment of this application.

The following uses the session 1 of the terminal device as an example for description.

S1913: The first RAN device determines that the network slice 1 associated with the session 1 of the terminal device is not supported but the network slice that has a mapping relationship with the network slice 1 is supported.

In an implementation, in step S1912, if the first RAN device receives the first indication information and the second indication information from the second RAN device, the first RAN device may preferentially determine, based on the first indication information, whether the network slice 1 associated with the session 1 of the terminal device is supported. If the first RAN device determines that the network slice 1 associated with the session 1 of the terminal device is not supported, the first RAN device determines, based on the second indication information, whether the network slice that has a mapping relationship with the network slice 1 is supported.

In another implementation, in step S1912, if the first RAN device receives the first indication information or the second indication information from the second RAN device, the first RAN device may learn, based on the first indication information or the second indication information, of S-NSSAI that corresponds to a network slice associated with the session or S-NSSAI that corresponds to a network slice that has a mapping relationship with the network slice associated with the session, and may further determine whether the network slice 1 associated with the session 1 of the terminal device is supported. If the first RAN device determines that the network slice 1 associated with the session 1 of the terminal device is not supported, the first RAN device may continue to determine whether the network slice that has a mapping relationship with the network slice 1 is supported.

In still another implementation, in step S1912, if the first RAN device does not receive the first indication information and the second indication information from the second RAN device, the first RAN device may determine, based on pieces of S-NSSAI that are of all network slices and sent by the second RAN device, whether the first RAN device supports at least one of the pieces of S-NSSAI. This is not specifically limited in this embodiment of this application.

S1914: The first RAN device sends an N2 path switch request to the AMF network element. Correspondingly, the AMF network element receives the N2 path switch request from the first RAN device.

The N2 path switch request includes location information of the terminal device and N2 SM information. The N2 SM information includes the identifier of the session 1, and S-NSSAI of a network slice 2 that has a mapping relationship with the network slice 1 associated with the session 1.

In addition, the N2 SM information may further include third indication information, where the third indication information indicates that the S-NSSAI is an identifier of the network slice 2 that has a mapping relationship with the network slice 1 associated with the session 1. Optionally, in this embodiment of this application, if the network slice 1 has a mapping relationship with a plurality of network slices in network slices supported by the first RAN device, the first RAN device may select a network slice supported by the AMF network element as the network slice 2.

S1915: The AMF network element sends a session update SM context request to the SMF network element. Correspondingly, the SMF network element receives the session update SM context request from the AMF network element.

The session update SM context request includes the N2 SM information.

The SMF network element determines whether the S-NSSAI of the network slice 2 is S-NSSAI supported by subscription of the terminal device.

If the SMF network element determines, based on the third indication information in the N2 SM information, that the S-NSSAI included in the N2 SM information is the identifier of the network slice 2 that has a mapping relationship with the network slice 1 associated with the session 1, the SMF network element further determines that the S-NSSAI of the network slice 2 is the mapped S-NSSAI supported by subscription of the terminal device, and continues to perform the following step S1916. Otherwise, the handover procedure ends.

S1916 to S1920 are the same as steps S1812 to S1816 in the embodiment shown in FIG. 18A and FIG. 18B. For related descriptions, refer to the embodiment shown in FIG. 18A and FIG. 18B. Details are not described herein again.

It should be noted that the foregoing steps S1913 to S1919 are described by using a handover procedure of one session (that is, the session 1) of the terminal device as an example. If the handover request in step S1912 includes pieces of NSSAI of network slices associated with a plurality of sessions of the terminal device, for a handover procedure of each session, refer to the foregoing steps S1913 to S1919. This is uniformly described herein, and details are not described again below.

In an existing Xn interface handover procedure, if the first RAN device does not support the network slice associated with the session of the terminal device (that is, the network slice 1), the first RAN device rejects handover of the session of the terminal device to the target side. As a result, session continuity of the session cannot be maintained on the target side, and service experience of the terminal device is affected. According to the network slice selection method provided in this embodiment of this application, even if the first RAN device does not support the network slice 1, because the second RAN device may perform slice mapping to determine the network slice that has a mapping relationship with the network slice 1 and send the S-NSSAI of the network slice that has a mapping relationship with the network slice 1 to the first RAN device, when the first RAN device supports the network slice that has a mapping relationship with the network slice 1, the first RAN device triggers migration of the session of the terminal device from the network slice 1 to the network slice (for example, the network slice 2) that is supported by the first RAN device and that has a mapping relationship with the network slice 1. Therefore, continuity of the session can be maintained.

The actions of the first RAN device, the actions of the second RAN device, or the actions of the AMF network element in steps S1901 to S1920 may be performed by the processor 401 in the communication device 400 shown in FIG. 4 by invoking the application program code stored in the memory 403. This is not limited in this embodiment.

Figure 20:
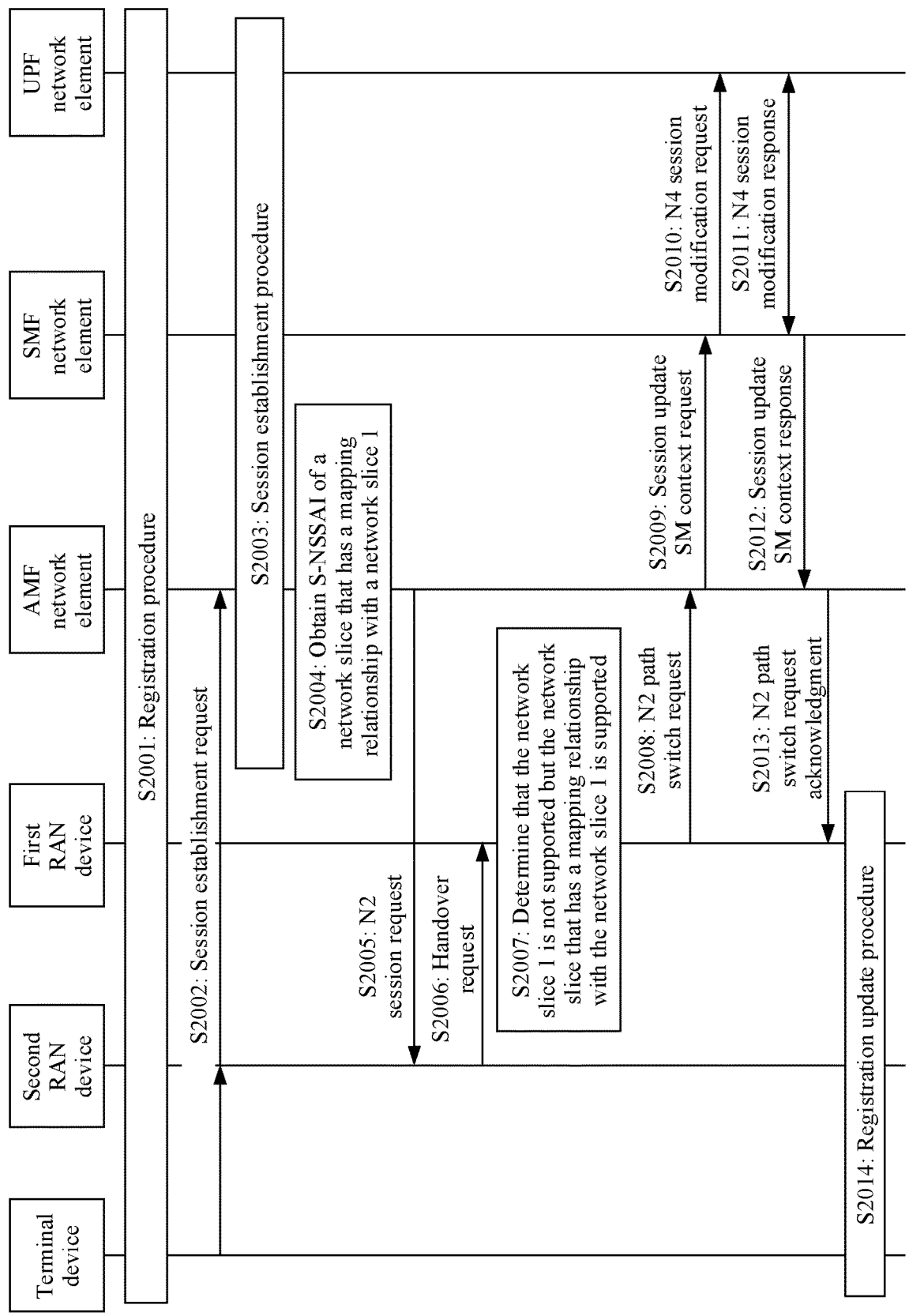
FIG. 20 is a seventh interaction diagram of a network slice selection method according to an embodiment of this application.

Optionally, that the communication system shown in FIG. 14 is applied to the 5G network shown in FIG. 16 is used as an example. FIG. 20 shows another network slice selection method according to an embodiment of this application. The network slice selection method is applied to a session establishment procedure. In the method, the AMF network element delivers a slice mapping to the second RAN device, and the second RAN device locally stores the slice mapping. In a subsequent Xn handover procedure, the second RAN device may send the slice mapping to the first RAN device, so that the first RAN device determines whether a network slice that has a mapping relationship with a network slice associated with a session of the terminal device is supported. The network slice selection method shown in FIG. 20 includes the following steps.

S2001: The terminal device successfully registers with the AMF network element in a registration procedure.

S2002: The terminal device sends a session establishment request to the AMF network element. Correspondingly, the AMF network element receives the session establishment request from the terminal device.

The session establishment request includes parameters such as an identifier of a session 1 of the terminal device, S-NSSAI of a network slice associated with the session 1, and a DNN. For details, refer to a current technology. Details are not described herein.

For ease of the following descriptions, in this embodiment of this application, the network slice associated with the session 1 of the terminal device is referred to as a network slice 1. This is uniformly described herein, and details are not described again below.

S2003: The AMF network element selects the SMF network element, and triggers the SMF network element to create a session context on a core network side. For related implementation, refer to the current technology. Details are not described herein.

S2004: The AMF network element obtains S-NSSAI of a network slice that has a mapping relationship with the network slice 1.

In an embodiment, the AMF network element may obtain the first mapping relationship list in the embodiment shown in FIG. 18A and FIG. 18B in advance. In this case, the AMF network element may determine, based on the S-NSSAI of the network slice 1 and the first mapping relationship list, the S-NSSAI of the network slice that has a mapping relationship with the network slice 1.

In an embodiment, the AMF network element does not obtain the first mapping relationship list in the embodiment shown in FIG. 18A and FIG. 18B in advance. In this case, the AMF network element may obtain the S-NSSAI of the network slice that has a mapping relationship with the network slice 1 from the NSSF network element. The AMF network element may send a slice mapping request to the NSSF network element, where the slice mapping request includes the S-NSSAI of the network slice 1. Further, the NSSF network element may determine the S-NSSAI of the network slice that has a mapping relationship with the network slice 1, and send a slice mapping response to the AMF network element. The slice mapping response includes the S-NSSAI of the network slice that has a mapping relationship with the network slice 1.

S2005: The AMF network element sends an N2 session request to the second RAN device. Correspondingly, the second RAN device receives the N2 session request from the AMF network element.

The N2 session request includes N2 SM information, and the N2 SM information includes the identifier of the session 1, the S-NSSAI of the network slice 1 associated with the session 1, and the S-NSSAI of the network slice that has a mapping relationship with the network slice 1.

After obtaining the S-NSSAI of the network slice 1 associated with the session 1 and the S-NSSAI of the network slice that has a mapping relationship with the network slice 1, the second RAN device may store the S-NSSAI of the network slice 1 associated with the session 1 and the S-NSSAI of the network slice that has a mapping relationship with the network slice 1. This is not specifically limited in this embodiment of this application.

It should be noted that steps S2002 to S2005 are described by using an establishment procedure of one session (that is, the session 1) of the terminal device as an example. Certainly, the terminal device may establish a plurality of sessions. For an establishment procedure of each session, refer to the foregoing steps S2002 to S2005. Details are not described herein again.

Further, the terminal device moves, and an Xn interface handover procedure is triggered. When the terminal device is in a connected state, the terminal device performs related measurement based on a measurement configuration message delivered by the second RAN device, and sends a measurement report to the second RAN device. The measurement report includes an information list of candidate RAN devices, on a target side, to which the terminal device is to be handed over (a list of candidate target IDs), and a result of a measurement indicator between each candidate RAN device and the terminal device. The measurement indicator includes an RSSI, RSRP, RSRQ, or the like obtained by the terminal device. Further, the second RAN device selects one candidate RAN device from a plurality of candidate RAN devices as a target RAN device (T-RAN) (that is, the first RAN device below) based on the result that is of the measurement indicator and that is reported by the terminal device. Further, if determining that an Xn interface exists between the second RAN device and the first RAN device, the second RAN device triggers an Xn based handover procedure, and performs the following step S2006.

S2006 to S2014 are the same as steps S1912 to S1920 in the embodiment shown in FIG. 19A and FIG. 19B. For related descriptions, refer to the embodiment shown in FIG. 19A and FIG. 19B. Details are not described herein again.

In an existing Xn interface handover procedure, if the first RAN device does not support the network slice associated with the session of the terminal device (that is, the network slice 1), the first RAN device rejects handover of the session of the terminal device to the target side. As a result, session continuity of the session cannot be maintained on the target side, and service experience of the terminal device is affected. According to the network slice selection method provided in this embodiment of this application, even if the first RAN device does not support the network slice 1, because the AMF network element may perform slice mapping to determine the network slice that has a mapping relationship with the network slice 1 and send the S-NSSAI of the network slice that has a mapping relationship with the network slice 1 to the second RAN device, and the second RAN device sends the S-NSSAI to the first RAN device, when the first RAN device supports the network slice that has a mapping relationship with the network slice 1, the first RAN device triggers migration of the session of the terminal device from the network slice 1 to the network slice (for example, the network slice 2) that is supported by the first RAN device and that has a mapping relationship with the network slice 1. Therefore, continuity of the session can be maintained.

The actions of the first RAN device, the actions of the second RAN device, or the actions of the AMF network element in steps S2001 to S2014 may be performed by the processor 401 in the communication device 400 shown in FIG. 4 by invoking the application program code stored in the memory 403. This is not limited in this embodiment.

Figure 21:
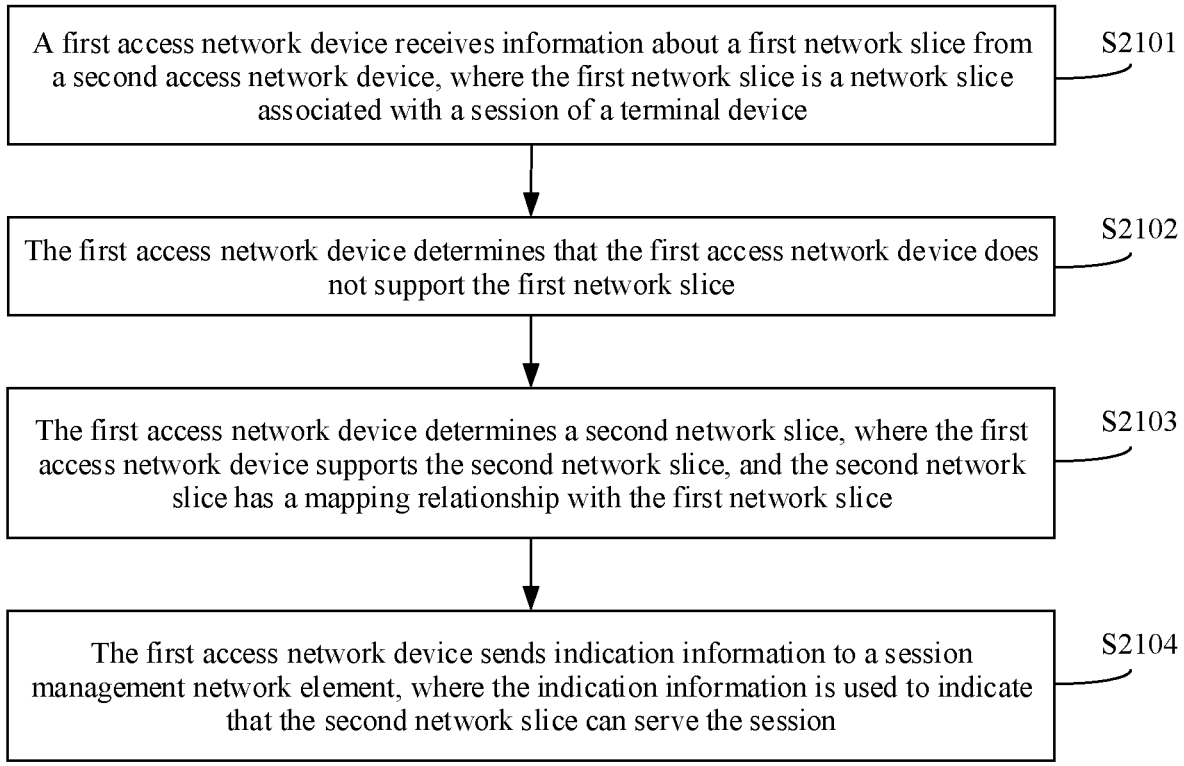
FIG. 21 is a flowchart of still another network slice selection method according to an embodiment of this application.

The foregoing FIG. 18A to FIG. 20 provide several network slice selection methods by using various embodiments. FIG. 21 shows a network slice selection method according to an embodiment of this application. The method includes the following steps.

S2101: A first access network device receives information about a first network slice from a second access network device, where the first network slice is a network slice associated with a session of a terminal device.

For example, in this embodiment of this application, the first access network device may be, for example, the first RAN device in the embodiment shown in FIG. 18A and FIG. 18B, and the second access network device may be, for example, the second RAN device in the embodiment shown in FIG. 18A and FIG. 18B.

Optionally, information about a network slice in embodiments of this application may be, for example, S-NSSAI of the network slice.

S2102: The first access network device determines that the first access network device does not support the first network slice.

S2103: The first access network device determines a second network slice, where the first access network device supports the second network slice, and the second network slice has a mapping relationship with the first network slice.

Optionally, in this embodiment of this application, that the second network slice has a mapping relationship with the first network slice includes: The first network slice and the second network slice can provide services of a same type, or the first network slice and the second network slice can share a network slice instance.

Optionally, in this embodiment of this application, that the first access network device determines a second network slice includes: The first access network device determines the second network slice based on the information about the first network slice and mapping information between the second network slice and the first network slice.

S2104: The first access network device sends indication information to a session management network element, where the indication information indicates that the second network slice can serve the session.

For example, the indication information may be, for example, a session identifier of the terminal device and S-NSSAI of the second network slice.

With reference to a specific scenario, for an embodiment of steps S2101 to S2104, refer to steps S1806 to S1810 in the embodiment shown in FIG. 18A and FIG. 18B. Details are not described herein again.

Optionally, in this embodiment of this application, the network slice selection method may further include: The first access network device sends information about the second network slice to a mobility management network element. The first access network device receives the mapping information between the second network slice and the first network slice from the mobility management network element. For an embodiment of this solution, refer to steps S1802a and S1803a in the embodiment shown in FIG. 18A and FIG. 18B. Details are not described herein again.

In an existing Xn interface handover procedure, if the first access network device does not support the network slice associated with the session of the terminal device, the first access network device rejects handover of the session of the terminal device to a target side. As a result, session continuity of the session cannot be maintained on the target side, and service experience of the terminal device is affected. According to the network slice selection method provided in this embodiment of this application, even if the first access network device does not support the network slice associated with the session of the terminal device, because the first access network device may perform slice mapping to determine the second network slice that is supported by the first access network device and that has a mapping relationship with the first network slice, the first access network device may trigger migration of the session of the terminal device from the first network slice to the second network slice. Therefore, continuity of the session can be maintained.

The actions of the first access network device in steps S2101 to S2104 may be performed by the processor 401 in the communication device 400 shown in FIG. 4 by invoking the application program code stored in the memory 403. This is not limited in this embodiment.

Figure 22:
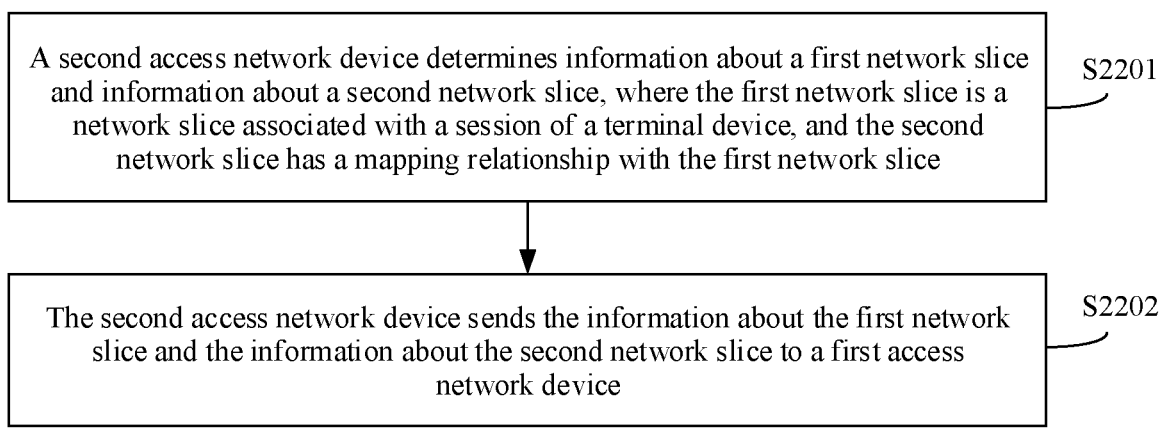
FIG. 22 is a flowchart of still another network slice selection method according to an embodiment of this application.

Optionally, FIG. 22 shows a network slice selection method according to an embodiment of this application. The method includes the following steps.

S2201: A second access network device determines information about a first network slice and information about a second network slice, where the first network slice is a network slice associated with a session of a terminal device, and the second network slice has a mapping relationship with the first network slice.

For example, in this embodiment of this application, a first access network device may be, for example, the first RAN device in the embodiment shown in FIG. 19A and FIG. 19B or FIG. 20, and the second access network device may be, for example, the second RAN device in the embodiment shown in FIG. 19A and FIG. 19B or FIG. 20.

Optionally, information about a network slice in embodiments of this application may be, for example, S-NSSAI of the network slice.

Optionally, in this embodiment of this application, that the second network slice has a mapping relationship with the first network slice includes: The first network slice and the second network slice can provide services of a same type, or the first network slice and the second network slice can share a network slice instance.

In an embodiment, in this embodiment of this application, that a second access network device determines information about a first network slice and information about a second network slice includes: The second access network device receives the information about the second network slice and the information about the first network slice from a mobility management network element.

In an embodiment, in this embodiment of this application, that a second access network device determines information about a first network slice and information about a second network slice includes: The second access network device receives the information about the first network slice from a mobility management network element. The second access network device determines the information about the second network slice based on the information about the first network slice and mapping information between the second network slice and the first network slice.

Optionally, the first network slice in this embodiment of this application may be a network slice in at least one network slice indicated by allowed NSSAI of the terminal device, and the network slice selection method provided in this embodiment of this application may further include: The second access network device receives the mapping information from the mobility management network element. For an embodiment of this solution, refer to step S1905 in the embodiment shown in FIG. 19A and FIG. 19B. Details are not described herein again.

S2202: The second access network device sends the information about the first network slice and the information about the second network slice to the first access network device.

For an embodiment of step S2202, refer to step S1912 in the embodiment shown in FIG. 19A and FIG. 19B or step S2006 in the embodiment shown in FIG. 20. Details are not described herein again.

With reference to a specific scenario, for an embodiment of steps S2201 and S2202, refer to steps S1910 to S1912 in the embodiment shown in FIG. 19A and FIG. 19B. Alternatively, with reference to a specific scenario, for another embodiment of steps S2201 and S2202, refer to steps S2005 and S2006 in the embodiment shown in FIG. 20. Details are not described herein again.

In an existing Xn interface handover procedure, if the first access network device does not support the network slice associated with the session of the terminal device, the first access network device rejects handover of the session of the terminal device to a target side. As a result, session continuity of the session cannot be maintained on the target side, and service experience of the terminal device is affected. According to the network slice selection method provided in this embodiment of this application, even if the first access network device does not support the network slice associated with the session of the terminal device, because the second access network device may send, to the first access network device, the information about the first network slice and the information about the second network slice that is supported by the first access network device and that has a mapping relationship with the first network slice, the first access network device may obtain the information about the first network slice and the information about the second network slice, and may further trigger migration of the session of the terminal device from the first network slice to the second network slice. Therefore, continuity of the session can be maintained.

The actions of the second access network device in steps S2201 and S2202 may be performed by the processor 401 in the communication device 400 shown in FIG. 4 by invoking the application program code stored in the memory 403. This is not limited in this embodiment.

Figure 23:
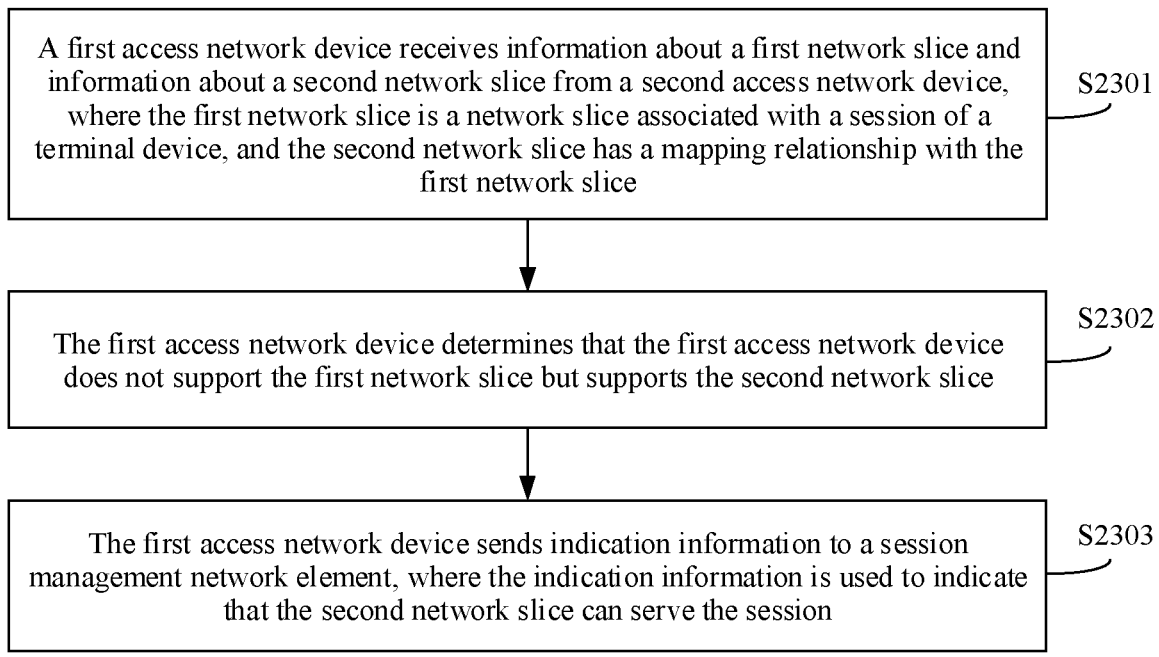
FIG. 23 is a flowchart of still another network slice selection method according to an embodiment of this application.

Optionally, FIG. 23 shows a network slice selection method according to an embodiment of this application. The method includes the following steps.

S2301: A first access network device receives information about a first network slice and information about a second network slice from a second access network device, where the first network slice is a network slice associated with a session of a terminal device, and the second network slice has a mapping relationship with the first network slice.

For example, in this embodiment of this application, the first access network device may be, for example, the first RAN device in the embodiment shown in FIG. 19A and FIG. 19B or FIG. 20, and the second access network device may be, for example, the second RAN device in the embodiment shown in FIG. 19A and FIG. 19B or FIG. 20.

Optionally, information about a network slice in embodiments of this application may be, for example, S-NSSAI of the network slice.

Optionally, in this embodiment of this application, that the second network slice has a mapping relationship with the first network slice includes: The first network slice and the second network slice can provide services of a same type, or the first network slice and the second network slice can share a network slice instance.

For an embodiment of step S2301, refer to step S1912 in the embodiment shown in FIG. 19A and FIG. 19B or step S2006 in the embodiment shown in FIG. 20. Details are not described herein again.

S2302: The first access network device determines that the first access network device does not support the first network slice but supports the second network slice.

For an embodiment of step S2302, refer to step S1913 in the embodiment shown in FIG. 19A and FIG. 19B or step S2007 in the embodiment shown in FIG. 20. Details are not described herein again.

S2303: The first access network device sends indication information to a session management network element, where the indication information indicates that the second network slice can serve the session.

For example, the indication information may be, for example, a session identifier of the terminal device and S-NSSAI of the second network slice.

With reference to a specific scenario, for an embodiment of steps S2301 to S2303, refer to steps S1912 to S1914 in the embodiment shown in FIG. 19A and FIG. 19B. Alternatively, with reference to a specific scenario, for another embodiment of steps S2301 to S2303, refer to steps S2006 to S2008 in the embodiment shown in FIG. 20. Details are not described herein again.

In an existing Xn interface handover procedure, if the first access network device does not support the network slice associated with the session of the terminal device, the first access network device rejects handover of the session of the terminal device to a target side. As a result, session continuity of the session cannot be maintained on the target side, and service experience of the terminal device is affected. According to the network slice selection method provided in this embodiment of this application, even if the first access network device does not support the network slice associated with the session of the terminal device, because the first access network device may obtain the information about the first network slice and the information about the second network slice that is supported by the first access network device and that has a mapping relationship with the first network slice, and may trigger migration of the session of the terminal device from the first network slice to the second network slice, continuity of the session can be maintained.

The actions of the first access network device in steps S2301 to S2303 may be performed by the processor 401 in the communication device 400 shown in FIG. 4 by invoking the application program code stored in the memory 403. This is not limited in this embodiment.

Figure 24:
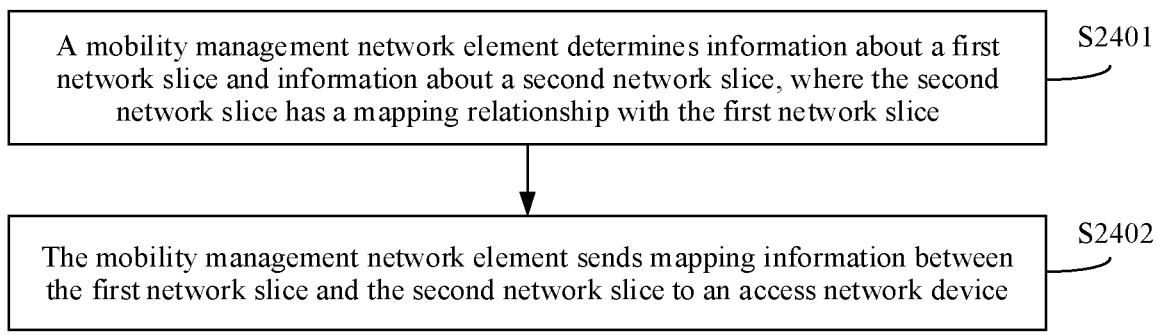
FIG. 24 is a flowchart of still another network slice selection method according to an embodiment of this application.

Optionally, FIG. 24 shows a network slice selection method according to an embodiment of this application. The method includes the following steps.

S2401: A mobility management network element determines information about a first network slice and information about a second network slice, where the second network slice has a mapping relationship with the first network slice.

Optionally, information about a network slice in embodiments of this application may be, for example, S-NSSAI of the network slice.

Optionally, in this embodiment of this application, that the second network slice has a mapping relationship with the first network slice includes: The first network slice and the second network slice can provide services of a same type, or the first network slice and the second network slice can share a network slice instance.

Optionally, in this embodiment of this application, that a mobility management network element determines information about a first network slice and information about a second network slice includes: The mobility management network element determines the information about the first network slice. The mobility management network element determines the information about the second network slice based on the information about the first network slice and mapping information between the second network slice and the first network slice.

S2402: The mobility management network element sends the mapping information between the first network slice and the second network slice to an access network device.

In an embodiment, the first network slice is a network slice supported by the access network device. With reference to a specific scenario, for an embodiment of steps S2401 and S2402, refer to steps S1802*a* and S1803*a* in the embodiment shown in FIG. 18A and FIG. 18B or steps S1802*b* and S1803*b* in the embodiment shown in FIG. 18A and FIG. 18B. Details are not described herein again.

In another embodiment, the first network slice is a network slice associated with a session of a terminal device. With reference to a specific scenario, for an embodiment of steps S2401 and S2402, refer to steps S2004 and S2005 in the embodiment shown in FIG. 20. Details are not described herein again.

In still another embodiment, the first network slice is a network slice indicated by allowed NSSAI of a terminal device. With reference to a specific scenario, for an embodiment of steps S2401 and S2402, refer to steps S1903 to S1905 in the embodiment shown in FIG. 19A and FIG. 19B. Details are not described herein again.

In an existing Xn interface handover procedure, if a first access network device does not support the network slice associated with the session of the terminal device, the first access network device rejects handover of the session of the terminal device to a target side. As a result, session continuity of the session cannot be maintained on the target side, and service experience of the terminal device is affected. According to the network slice selection method provided in this embodiment of this application, even if the first access network device does not support the network slice associated with the session of the terminal device, because the first access network device may obtain the information about the first network slice and the information about the second network slice that is supported by the first access network device and that has a mapping relationship with the first network slice, the first access network device may trigger migration of the session of the terminal device from the first network slice to the second network slice. Therefore, continuity of the session can be maintained.

The actions of the mobility management network element in steps S2401 and S2402 may be performed by the processor 401 in the communication device 400 shown in FIG. 4 by invoking the application program code stored in the memory 403. This is not limited in this embodiment.

It may be understood that in the foregoing embodiments, a method and/or step implemented by the mobility management network element may alternatively be implemented by a component (such as a chip or circuit) that may be used in the mobility management network element, a method and/or step implemented by the first access network device may alternatively be implemented by a component (such as a chip or circuit) that may be used in the first access network device, and a method and/or step implemented by the second access network device may alternatively be implemented by a component (such as a chip or circuit) that may be used in the second access network device.

The foregoing mainly describes the solutions provided in embodiments of this application from a perspective of interaction between network elements. Correspondingly, an embodiment of this application further provides a communication apparatus. The communication apparatus may be the mobility management network element in the method embodiments, an apparatus including the mobility management network element, or a component that may be used in the mobility management network element. Alternatively, the communication apparatus may be the first access network device in the method embodiments, an apparatus including the first access network device, or a component that may be used in the first access network device. Alternatively, the communication apparatus may be the second access network device in the method embodiments, an apparatus including the second access network device, or a component that may be used in the second access network device. It may be understood that, to implement the foregoing functions, the communication apparatus includes corresponding hardware structures and/or software modules for performing the functions. A person skilled in the art should be easily aware that, with reference to units and algorithm steps in the examples described in embodiments disclosed in this specification, this application can be implemented in a form of hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

Figure 12:
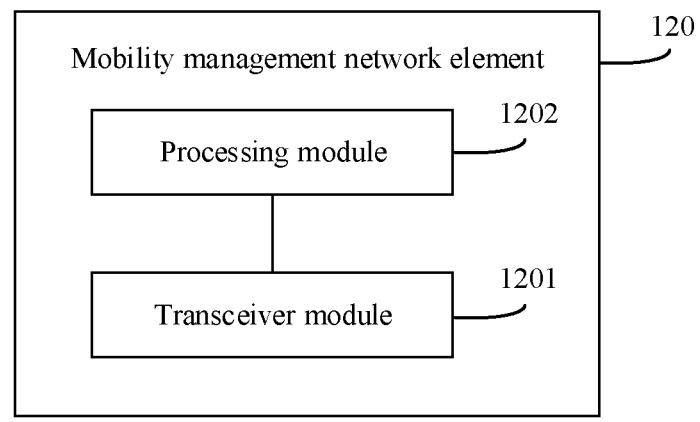
FIG. 12 is a diagram of a mobility management network element according to an embodiment of this application.

For example, the communication apparatus is the mobility management network element in the method embodiments. FIG. 12 is a schematic diagram of a structure of a mobility management network element 120. The mobility management network element 120 includes a transceiver module 1201 and a processing module 1202. The transceiver module 1201 may also be referred to as a transceiver unit, and is configured to implement a transceiver function. For example, the transceiver module 1201 may be a transceiver circuit, a transceiver, or a communication interface.

The processing module 1202 is configured to determine that a first network slice in a visited network of a terminal device can serve a first session of the terminal device. The processing module 1202 is further configured to trigger, through the transceiver module 1201, migration of the first session from a second network slice to the first network slice, where the second network slice is a network slice currently associated with the first session in the visited network.

Optionally, that the processing module 1202 is configured to determine that a first network slice in a visited network of a terminal device can serve a first session of the terminal device includes: The processing module 1202 is configured to determine that the terminal device moves out of a service range of the second network slice and the terminal device is currently located in a service range of the first network slice, where the first network slice has a mapping relationship with a third network slice, and the third network slice is a network slice associated with the first session in a home network of the terminal device.

Optionally, the transceiver module 1201 is further configured to send first indication information to a first session management network element, where the first indication information indicates the first session management network element to initiate a modification procedure of the first session; the transceiver module 1201 is further configured to receive first information and second information from the first session management network element, where the first information includes an identifier of the first session and S-NSSAI of the first network slice, and the second information includes the identifier of the first session, the S-NSSAI of the first network slice, and S-NSSAI of the third network slice; and the transceiver module 1201 is further configured to: send the first information to a first access network device, and send the second information to the terminal device, where the first information and the second information are for an update of S-NSSAI corresponding to the first session in the visited network.

Optionally, that the processing module 1202 is configured to determine that a first network slice in a visited network of a terminal device can serve a first session of the terminal device includes: The processing module 1202 is configured to receive second indication information from a first access network device through the transceiver module 1201, where the second indication information indicates that the first network slice supported by the first access network device can serve the first session.

Optionally, the processing module 1202 is further configured to determine that the first session is associated with another network slice other than the second network slice in the visited network, where the another network slice has a mapping relationship with a third network slice, the another network slice includes the first network slice, and the third network slice is a network slice associated with the first session in a home network of the terminal device; and the transceiver module 1201 is further configured to send single network slice selection assistance information S-NSSAI of the another network slice to a second access network device, where the second access network device is an access network device that supports the second network slice.

Optionally, the transceiver module 1201 is further configured to send third indication information to the terminal device, where the third indication information indicates the terminal device to initiate a service request procedure associated with the first session, the service request procedure is for establishment of an air interface resource of the first session, and the air interface resource is associated with the first network slice.

Optionally, the transceiver module 1201 is further configured to send a first message to a first session management network element, where the first message requests the first session management network element to establish an air interface resource of the first session, and the air interface resource is associated with the first network slice.

Optionally, the transceiver module 1201 is further configured to send, to the terminal device, S-NSSAI of the first network slice and S-NSSAI of the third network slice that correspond to an identifier of the first session, where the third network slice is a network slice associated with the first session in the home network of the terminal device.

Optionally, that the processing module 1202 is configured to trigger, through the transceiver module 1201, migration of the first session from a second network slice to the first network slice includes: The processing module 1202 is configured to send a second message to the first session management network element through the transceiver module 1201, where the second message requests to establish a user plane resource between a first user plane network element and a third user plane network element, the first session management network element is a session management network element that serves the first session in the first network slice, the first user plane network element is a user plane network element that serves the first session in the first network slice, the third user plane network element is a user plane network element that serves the first session in the third network slice, and the third network slice is a network slice associated with the first session in the home network of the terminal device.

Optionally, that the processing module 1202 is configured to trigger, through the transceiver module 1201, migration of the first session from a second network slice to the first network slice includes: The processing module 1202 is configured to: obtain context information of the first session in the third network slice, where the third network slice is a network slice associated with the first session in the home network of the terminal device; and send a third message to the first session management network element through the transceiver module 1201, where the third message includes the context information of the first session in the third network slice, the third message requests to establish a user plane resource between a first user plane network element and a third user plane network element, the first session management network element is a session management network element that serves the first session in the first network slice, the first user plane network element is a user plane network element that serves the first session in the first network slice, and the third user plane network element is a user plane network element that serves the first session in the third network slice.

Optionally, that the processing module 1202 is configured to obtain context information of the first session in the third network slice includes: The processing module 1202 is configured to: send a fourth message to a second session management network element through the transceiver module 1201, where the fourth message requests the context information of the first session in the third network slice, and the second session management network element is a session management network element that serves the first session in the second network slice; and receive the context information of the first session in the third network slice from the second session management network element through the transceiver module 1201.

Optionally, the transceiver module 1201 is further configured to send, to the terminal device, updated allowed NSSAI and a mapping relationship between the S-NSSAI of the first network slice and the S-NSSAI of the third network slice, where the updated allowed NSSAI includes the S-NSSAI of the first network slice, and the third network slice is a network slice associated with the first session in the home network of the terminal device.

In another embodiment:

The processing module 1202 is configured to determine information about a first network slice and information about a second network slice, where the second network slice has a mapping relationship with the first network slice. The transceiver module 1201 is configured to send mapping information between the first network slice and the second network slice to an access network device.

Optionally, the processing module 1202 is configured to: determine the information about the first network slice; and determine the information about the second network slice based on the information about the first network slice and the mapping information between the second network slice and the first network slice.

Optionally, the first network slice is a network slice supported by the access network device, the first network slice is a network slice associated with a session of a terminal device, or the first network slice is a network slice indicated by allowed NSSAI of a terminal device.

All related content of the steps in the foregoing method embodiments may be cited in function descriptions of corresponding function modules. Details are not described herein again.

In this embodiment, the mobility management network element 120 is presented in a form of function modules obtained through division in an integrated manner. The "module" herein may be an ASIC, a circuit, a processor executing one or more software or firmware programs, a memory, an integrated logic circuit, and/or another component that can provide the foregoing functions. In a simple embodiment, a person skilled in the art may figure out that the mobility management network element 120 may be in a form of the communication device 400 shown in FIG. 4.

For example, the processor 401 in the communication device 400 shown in FIG. 4 may invoke the computer-executable instructions stored in the memory 403, to enable the communication device 400 to perform the network slice selection methods in the foregoing method embodiments.

Functions/implementation processes of the transceiver module 1201 and the processing module 1202 in FIG. 12 may be implemented by the processor 401 in the communication device 400 shown in FIG. 4 by invoking the computer-executable instructions stored in the memory 403. Alternatively, a function/an implementation process of the processing module 1202 in FIG. 12 may be implemented by the processor 401 in the communication device 400 shown in FIG. 4 by invoking the computer-executable instructions stored in the memory 403. A function/an implementation process of the transceiver module 1201 in FIG. 12 may be implemented by using the communication interface 404 in the communication device 400 shown in FIG. 4.

Because the mobility management network element 120 provided in this embodiment may perform the foregoing network slice selection methods, for a technical effect that can be achieved by the mobility management network element 120, refer to the foregoing method embodiments. Details are not described herein again.

Figure 13:
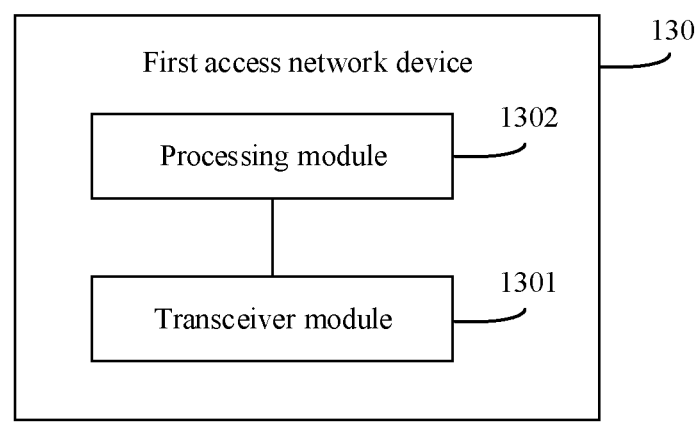
FIG. 13 is a diagram of a first access network device according to an embodiment of this application.

For example, the communication apparatus is the first access network device in the foregoing method embodiments. FIG. 13 is a schematic diagram of a structure of a first access network device 130. The first access network device 130 includes a transceiver module 1301 and a processing module 1302. The transceiver module 1301 may also be referred to as a transceiver unit, and is configured to implement a transceiver function. For example, the transceiver module 1301 may be a transceiver circuit, a transceiver, a transceiver, or a communication interface.

The transceiver module 1301 is configured to receive S-NSSAI of a first network slice and S-NSSAI of a second network slice from a second access network device, where the first network slice and the second network slice are network slices that are associated with a first session of a terminal device in a visited network of the terminal device and that each have a mapping relationship with a third network slice, the second network slice is a network slice currently associated with the first session in the visited network, and the third network slice is a network slice associated with the first session in a home network of the terminal device. The processing module 1302 is configured to determine that the second network slice is not supported but the first network slice is supported. The transceiver module 1301 is further configured to send second indication information to a mobility management network element, where the second indication information indicates that the first network slice can serve the first session.

In another embodiment:

The transceiver module 1301 is configured to receive information about a first network slice from a second access network device, where the first network slice is a network slice associated with a session of a terminal device. The processing module 1302 is configured to determine that the first access network device does not support the first network slice. The processing module 1302 is further configured to determine a second network slice, where the first access network device supports the second network slice, and the second network slice has a mapping relationship with the first network slice. The transceiver module 1301 is further configured to send indication information to a session management network element, where the indication information indicates that the second network slice can serve the session.

Optionally, that the processing module 1302 is configured to determine a second network slice includes: The processing module 1302 is configured to determine the second network slice based on the information about the first network slice and mapping information between the second network slice and the first network slice.

Optionally, the transceiver module 1301 is further configured to send information about the second network slice to a mobility management network element; and the transceiver module 1301 is further configured to receive the mapping information between the second network slice and the first network slice from the mobility management network element.

In still another embodiment:

The transceiver module 1301 is configured to receive information about a first network slice and information about a second network slice from a second access network device, where the first network slice is a network slice associated with a session of a terminal device, and the second network slice has a mapping relationship with the first network slice. The processing module 1302 is configured to determine that the first access network device does not support the first network slice but supports the second network slice. The transceiver module 1301 is further configured to send indication information to a session management network element, where the indication information indicates that the second network slice can serve the session.

All related content of the steps in the foregoing method embodiments may be cited in function descriptions of corresponding function modules. Details are not described herein again.

In this embodiment, the first access network device 130 is presented in a form of function modules obtained through division in an integrated manner. The "module" herein may be an ASIC, a circuit, a processor executing one or more software or firmware programs, a memory, an integrated logic circuit, and/or another component that can provide the foregoing functions. In a simple embodiment, a person skilled in the art may figure out that the first access network device 130 may be in a form of the communication device 400 shown in FIG. 4.

For example, the processor 401 in the communication device 400 shown in FIG. 4 may invoke the computer-executable instructions stored in the memory 403, to enable the communication device 400 to perform the network slice selection methods in the foregoing method embodiments.

Functions/implementation processes of the transceiver module 1301 and the processing module 1302 in FIG. 13 may be implemented by the processor 401 in the communication device 400 shown in FIG. 4 by invoking the computer-executable instructions stored in the memory 403. Alternatively, a function/an implementation process of the processing module 1302 in FIG. 13 may be implemented by the processor 401 in the communication device 400 shown in FIG. 4 by invoking the computer-executable instructions stored in the memory 403. A function/an implementation process of the transceiver module 1301 in FIG. 13 may be implemented by using the communication interface 404 in the communication device 400 shown in FIG. 4.

Because the first access network device 130 provided in this embodiment may perform the foregoing network slice selection methods, for a technical effect that can be achieved by the first access network device 130, refer to the foregoing method embodiments. Details are not described herein again.

Figure 25:
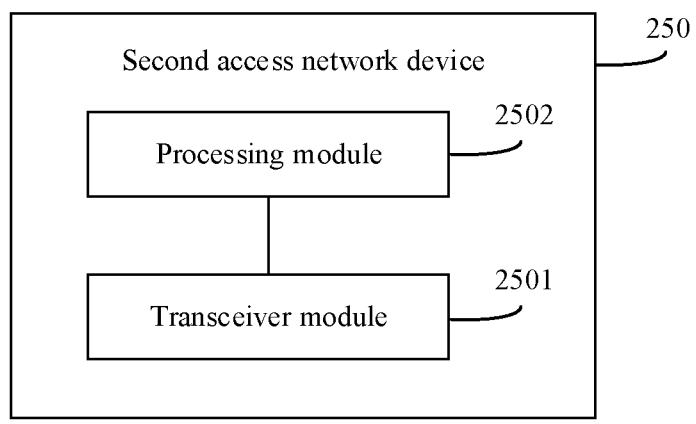
FIG. 25 is a diagram of a second access network device according to an embodiment of this application.

For example, the communication apparatus is the second access network device in the foregoing method embodiments. FIG. 25 is a schematic diagram of a structure of a second access network device 250. The second access network device 250 includes a transceiver module 2501 and a processing module 2502. The transceiver module 2501 may also be referred to as a transceiver unit, and is configured to implement a transceiver function. For example, the transceiver module 2501 may be a transceiver circuit, a transceiver, a transceiver, or a communication interface.

The processing module 2502 is configured to determine information about a first network slice and information about a second network slice, where the first network slice is a network slice associated with a session of a terminal device, and the second network slice has a mapping relationship with the first network slice. The transceiver module 2501 is configured to send the information about the first network slice and the information about the second network slice to a first access network device.

Optionally, the processing module 2502 is configured to receive the information about the second network slice and the information about the first network slice from a mobility management network element through the transceiver module 2501.

Optionally, the processing module 2502 is configured to: receive the information about the first network slice from a mobility management network element through the transceiver module 2501; and determine the information about the second network slice based on the information about the first network slice and mapping information between the second network slice and the first network slice.

Optionally, the first network slice is a network slice in at least one network slice indicated by allowed NSSAI of the terminal device, and the transceiver module 2501 is further configured to receive the mapping information from the mobility management network element.

All related content of the steps in the foregoing method embodiments may be cited in function descriptions of corresponding function modules. Details are not described herein again.

In this embodiment, the second access network device 250 is presented in a form of function modules obtained through division in an integrated manner. The "module" herein may be an ASIC, a circuit, a processor executing one or more software or firmware programs, a memory, an integrated logic circuit, and/or another component that can provide the foregoing functions. In a simple embodiment, a person skilled in the art may figure out that the second access network device 250 may be in a form of the communication device 400 shown in FIG. 4.

For example, the processor 401 in the communication device 400 shown in FIG. 4 may invoke the computer-executable instructions stored in the memory 403, to enable the communication device 400 to perform the network slice selection methods in the foregoing method embodiments.

Functions/implementation processes of the transceiver module 2501 and the processing module 2502 in FIG. 25 may be implemented by the processor 401 in the communication device 400 shown in FIG. 4 by invoking the computer-executable instructions stored in the memory 403. Alternatively, a function/an implementation process of the processing module 2502 in FIG. 25 may be implemented by the processor 401 in the communication device 400 shown in FIG. 4 by invoking the computer-executable instructions stored in the memory 403. A function/an implementation process of the transceiver module 2501 in FIG. 25 may be implemented by using the communication interface 404 in the communication device 400 shown in FIG. 4.

Because the second access network device 250 provided in this embodiment may perform the foregoing network slice selection methods, for a technical effect that can be achieved by the second access network device 250, refer to the foregoing method embodiments. Details are not described herein again.

It should be noted that one or more of the foregoing modules or units may be implemented by using software, hardware, or a combination thereof. When any one of the foregoing modules or units is implemented by using software, the software exists in a form of computer program instructions, and is stored in a memory. A processor may be configured to execute the program instructions to implement the foregoing method procedures. The processor may be built into a system-on-a-chip (SOC) or an ASIC, or may be an independent semiconductor chip. In addition to a core configured to execute software instructions to perform an operation or processing, the processor may further include a necessary hardware accelerator, such as a field programmable gate array (FPGA), a programmable logic device (PLD), or a logic circuit that implements a dedicated logic operation.

When the foregoing modules or units are implemented by using hardware, the hardware may be any one or any combination of a CPU, a microprocessor, a digital signal processing (DSP) chip, a microcontroller unit (MCU), an artificial intelligence processor, an ASIC, a SoC, an FPGA, a PLD, a dedicated digital circuit, a hardware accelerator, or a non-integrated discrete device, and the hardware may run necessary software or does not depend on software to perform the foregoing method procedures.

Optionally, an embodiment of this application further provides a communication apparatus (for example, the communication apparatus may be a chip or a chip system). The communication apparatus includes a processor, configured to implement the method in any one of the foregoing method embodiments. In an embodiment, the communication apparatus further includes a memory. The memory is configured to store necessary program instructions and data. The processor may invoke program code stored in the memory, to instruct the communication apparatus to perform the method in any one of the foregoing method embodiments. Certainly, the memory may alternatively not be in the communication apparatus. When the communication apparatus is a chip system, the communication apparatus may include a chip, or may include a chip and another discrete component. This is not specifically limited in this embodiment of this application.

All or some of the foregoing embodiments may be implemented by using software, hardware, firmware, or any combination thereof. When a software program is used to implement the embodiments, all or some of the embodiments may be implemented in a form of a computer program product. The computer program product includes one or more computer instructions. When the computer program instructions are loaded and executed on a computer, all or some of the procedures or functions according to embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

Although this application is described with reference to the embodiments, in a process of implementing this application that claims protection, a person skilled in the art may understand and implement other variations of the disclosed embodiments by viewing the accompanying drawings, disclosed content, and the appended claims. In the claims, "comprising" does not exclude another component or another step, and "a" or "one" does not exclude a case of "a plurality of". A single processor or another unit may implement several functions enumerated in the claims. Some measures are recorded in dependent claims that are different from each other, but this does not mean that the measures cannot be combined to produce a good effect.

Although this application is described with reference to specific features and the embodiments thereof, it is clear that various modifications and combinations may be made to them without departing from the spirit and scope of this application. Correspondingly, this specification and the accompanying drawings are merely example descriptions of this application defined by the appended claims, and are considered as any of or all modifications, variations, combinations or equivalents that cover the scope of this application. It is clear that a person skilled in the art can make various modifications and variations to this application without departing from the spirit and scope of this application. This application is intended to cover the modifications and variations of this application provided that they fall within the scope of the claims of this application and their equivalent technologies.

What is claimed is:

1. A network slice selection method, the method comprising:
   determining, by a mobility management network element, that a session associated with a second network slice is to be migrated to a first network slice, wherein the first network slice and the second network slice are network slices of a visited network of a terminal device, the visited network is different from a home network of the terminal device, and the second network slice has a mapping relationship with the first network slice;
   sending, by the mobility management network element to a session management network element of the session in response to the determination, first indication information indicating the session management network element to initiate a modification procedure of the session of the terminal device;
   receiving, by the mobility management network element from the session management network element, a session modification command message that comprises an identifier of the session and first single network slice selection assistance information (S-NSSAI) of the first network slice in the visited network; and
   sending, by the mobility management network element, the session modification command message to the terminal device.

2. The method according to claim 1, wherein the second network slice has the mapping relationship with the first network slice comprises:
the first network slice and the second network slice provide services of a same type; or
the first network slice and the second network slice share a network slice instance.

3. The method according to claim 1, wherein the session modification command message further comprises an S-NSSAI of the home network of the terminal device.

4. The method according to claim 1, the method further comprising:
sending, by the mobility management network element to the terminal device when the second network slice in the visited network is to be migrated to the first network slice in the visited network, mapping information between the first S-NSSAI of the first network slice in the visited network and a second S-NSSAI of the second network slice in the visited network.

5. The method according to claim 4, wherein the step of sending, by the mobility management network element to the session management network element, the first indication information is performed after the step of sending, by the mobility management network element to the terminal device, the mapping information between the first S-NSSAI of the first network slice in the visited network and the second S-NSSAI of the second network slice in the visited network.

6. The method according to claim 1, further comprising:
receiving, by the mobility management network element from the session management network element, first information that comprises the identifier of the session and the first S-NSSAI of the first network slice; and
sending, by the mobility management network element, the first information to an access network device.

7. An apparatus for network slice selection, comprising:
a processor; and
a non-transitory memory storing a program code for execution by the processor, the program code including instructions for:
determining that a session associated with a second network slice is to be migrated to a first network slice, wherein the first network slice and the second network slice are network slices of a visited network of a terminal device, the visited network is different from a home network of the terminal device, and the second network slice has a mapping relationship with the first network slice;
sending, from a mobility management network element to a session management network element of the session in response to the determination, first indication information indicating the session management network element to initiate a modification procedure of the session of the terminal device;
receiving, from the session management network element, a session modification command message that comprises an identifier of the session and first single network slice selection assistance information (S-NSSAI) of the first network slice in the visited network; and
sending the session modification command message to the terminal device.

8. The apparatus according to claim 7, wherein the second network slice has the mapping relationship with the first network slice comprises:
the first network slice and the second network slice provide services of a same type; or
the first network slice and the second network slice share a network slice instance.

9. The apparatus according to claim 7, wherein the session modification command message further comprises an S-NSSAI of the home network of the terminal device.

10. The apparatus according to claim 9, the program code further comprising instructions for:
sending, from the mobility management network element to the terminal device when the second network slice in the visited network is to be migrated to the first network slice in the visited network, mapping information between the first S-NSSAI of the first network slice in the visited network and a second S-NSSAI of the second network slice in the visited network.

11. The apparatus according to claim 10, wherein the step of sending the first indication information is performed after the step of sending the mapping information between the first S-NSSAI of the first network slice in the visited network and the second S-NSSAI of the second network slice in the visited network.

12. The apparatus according to claim 7, the program code further comprising instructions for:
receiving, from the session management network element, first information that comprises the identifier of the session and the first S-NSSAI of the first network slice; and
sending the first information to an access network device.

13. A non-transitory computer readable medium storing a program code executable by a processor, the program code including instructions for:
determining that a session associated with a second network slice is to be migrated to a first network slice, wherein the first network slice and the second network slice are network slices of a visited network of a terminal device, the visited network is different from a home network of the terminal device, and the second network slice has a mapping relationship with the first network slice;
sending, from a mobility management network element to a session management network element of the session in response to the determination, first indication information indicating the session management network element to initiate a modification procedure of the session of the terminal device;
receiving, from the session management network element, a session modification command message that comprises an identifier of the session and first single network slice selection assistance information (S-NSSAI) of the first network slice in the visited network; and
sending the session modification command message to the terminal device.

14. The non-transitory computer readable medium according to claim 13, wherein the second network slice has the mapping relationship with the first network slice comprises:
the first network slice and the second network slice provide services of a same type; or
the first network slice and the second network slice share a network slice instance.

15. The non-transitory computer readable medium according to claim 13, wherein the session modification command message further comprises an S-NSSAI of the home network of the terminal device.

16. The non-transitory computer readable medium according to claim 13, the program code further comprising instructions for:

sending, from the mobility management network element to the terminal device when the second network slice in the visited network is to be migrated to the first network slice in the visited network, mapping information between the first S-NSSAI of the first network slice in the visited network and a second S-NSSAI of the second network slice in the visited network.

17. The non-transitory computer readable medium according to claim 16, wherein the step of sending the first indication information is performed after the step of sending the mapping information between the first S-NSSAI of the first network slice in the visited network and the second S-NSSAI of the second network slice in the visited network.

18. The non-transitory computer readable medium according to claim 13, the program code further comprising instructions for:
- receiving, from the session management network element, first information that comprises the identifier of the session and the first S-NSSAI of the first network slice; and
- sending the first information to an access network device.

* * * * *